United States Patent
Ozawa et al.

(10) Patent No.: US 10,690,824 B2
(45) Date of Patent: *Jun. 23, 2020

(54) OPTICAL LAMINATE

(71) Applicant: Sumitomo Chemical Company, Limited, Tokyo (JP)

(72) Inventors: Shoichi Ozawa, Niihama (JP); Yosuke Ota, Osaka (JP); Daichi Fujimoto, Osaka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 176 days.

This patent is subject to a terminal disclaimer.

(21) Appl. No.: 15/391,052

(22) Filed: Dec. 27, 2016

(65) Prior Publication Data
US 2017/0184766 A1 Jun. 29, 2017

(30) Foreign Application Priority Data
Dec. 28, 2015 (JP) .................. 2015-256949

(51) Int. Cl.
| G02B 5/22 | (2006.01) |
| C09J 133/08 | (2006.01) |
| G02B 5/30 | (2006.01) |
| C08F 2/50 | (2006.01) |
| C08F 222/32 | (2006.01) |
| C08K 5/3417 | (2006.01) |
| C08K 5/3415 | (2006.01) |
| C08F 220/30 | (2006.01) |
| C08F 220/28 | (2006.01) |

(52) U.S. Cl.
CPC .............. *G02B 5/223* (2013.01); *C08F 2/50* (2013.01); *C08F 222/32* (2013.01); *C09J 133/08* (2013.01); *G02B 5/305* (2013.01); *G02B 5/3016* (2013.01); *B32B 2457/20* (2013.01); *B32B 2457/202* (2013.01); *B32B 2457/206* (2013.01); *C08F 2220/281* (2013.01); *C08F 2220/282* (2013.01); *C08F 2220/283* (2013.01); *C08F 2220/301* (2013.01); *C08F 2220/302* (2013.01); *C08F 2220/303* (2013.01); *C08F 2222/328* (2013.01); *C08K 5/3415* (2013.01); *C08K 5/3417* (2013.01); *C09J 2203/318* (2013.01); *Y10T 428/1059* (2015.01); *Y10T 428/1077* (2015.01); *Y10T 428/1082* (2015.01)

(58) Field of Classification Search
CPC ...... G02B 5/223; G02B 5/3016; G02B 5/305; G02B 5/3083; C08F 222/32; C08F 2/50; C08F 2220/303; C08F 2220/283; C08F 2220/282; C08F 2220/281; C08F 2220/301; C08F 2220/302; C08F 2222/328; C09J 133/08; C09J 2203/318; C08K 5/3415; C08K 5/3417; Y10T 428/1059; Y10T 428/1077; Y10T 428/1082; B32B 2457/20; B32B 2457/202; B32B 2457/206
See application file for complete search history.

(56) References Cited

U.S. PATENT DOCUMENTS

| 5,401,438 A * | 3/1995 | Otsuka ............... A61K 8/492 252/301.31 |
| 10,029,982 B2 * | 7/2018 | Miyazaki ............ C07D 207/20 |
| 2014/0178608 A1 * | 6/2014 | Yoon ..................... G02B 5/30 428/1.55 |
| 2015/0218454 A1 * | 8/2015 | Kobayashi ........... G02B 5/3016 349/194 |

FOREIGN PATENT DOCUMENTS

| DE | 10109243 A1 * | 9/2002 | ......... C09B 23/0091 |
| JP | 2006308936 A | 11/2006 | |
| JP | 2008056859 A | 3/2008 | |

* cited by examiner

Primary Examiner — Eli D. Strah
(74) Attorney, Agent, or Firm — Panitch Schwarze Belisario & Nadal LLP

(57) ABSTRACT

Provided is an optical laminate which has high absorption selectivity to short-wavelength visible light having wavelengths around 400 nm and hence high light fastness and can impart better display characteristics when used for a display device. The optical laminate comprises at least one polarizing plate and at least one pressure-sensitive adhesive layer and satisfying the following formulae (1) and (2):

$$A(400) \geq 0.5 \quad (1)$$

$$A(420)/A(400) \leq 0.3 \quad (2)$$

where A(400) represents the absorbance of the optical laminate at a wavelength of 400 nm in the transmission direction of the polarizing plate and A(420) represents the absorbance of the optical laminate at a wavelength of 420 nm in the transmission direction of the polarizing plate.

8 Claims, No Drawings

OPTICAL LAMINATE

BACKGROUND OF THE INVENTION

Field of the Invention

The present invention relates to an optical laminate and a display device including the optical laminate.

Description of the Related Art

Various members including display elements such as organic EL elements and liquid crystal cells and optical films such as polarizing plates are used in display devices (FPD: flat panel displays) such as organic EL display devices and liquid crystal display devices. Organic EL compounds and liquid crystal compounds to be used in these members tend to give rise to a problem concerning deteriorations caused by ultraviolet rays (UV) because these compounds are organic compounds. Measures are taken such as addition of a UV absorber to a protection film of a polarizing plate used in display devices to solve such a problem. For example, Patent Literature 1 (JP-A-2006-308936) discloses a polarizing plate added with a UV absorber which has excellent ability of absorbing ultraviolet rays having a wavelength of 370 nm or less but is reduced in absorption of visible light having a wavelength of 400 nm or more to avoid an adverse influence on liquid crystal displays.

Also, optical films provided with no protection film are known in recent years with development of thinner display devices. In optical films like those mentioned above, components that have been added so far to protection films must be added to separate members. For example, there is an idea that a UV absorption function is imparted to a pressure-sensitive adhesive layer to be laminated on an optical film. Patent Literature 2 (JP-A-2008-56859) discloses a pressure-sensitive adhesive sheet in which a UV absorbable resin composition synthesized from a monomer mixture containing a UV absorbing monomer is applied to one surface of the substrate thereof.

CITATION LIST

Patent Literature

Patent Literature 1: JP-A-2006-308963
Patent Literature 2: JP-A-2008-56859

SUMMARY OF THE INVENTION

Though it has been considered so far that various types of members constituting display devices are deteriorated by ultraviolet rays having a wavelength of 380 nm or less, it has been clarified that besides ultraviolet rays, even short wavelength visible light promotes performatory deterioration. This is the reason why optical films such as polarizing films are required to have absorption characteristics for light having wavelengths close to 400 nm besides ultraviolet rays. These optical films, on the other hand, need not to have the absorption characteristics for visible light (for example, blue light) having a wavelength exceeding 430 nm to impart better display characteristics to display devices and it is therefore important that these films have high absorption selectivity to short wavelength visible light having wavelengths close to 400 nm. However, the polarizing plate described in the above Patent Document 1 is inferior in the absorption of visible light having wavelengths close to 400 nm and is therefore not necessarily satisfied in light fastness. Moreover, when a UV absorber is formulated in a pressure-sensitive adhesive layer to provide sufficient UV absorption characteristics and to attain the development of a thinner optical film to cope to the demand for the development of a thinner display device, the UV absorber needs to have high solubility in a pressure-sensitive adhesive composition or pressure-sensitive adhesive coating solution which forms a pressure-sensitive adhesive layer. At this time, insufficiency in the solubility sometimes brings about breed-out of the UV absorber with time after the pressure-sensitive adhesive layer is formed and it is therefore difficult to obtain an optical film that is thin while it has highlight fastness without damaging the pressure-sensitive function of the pressure-sensitive adhesive layer.

It is an object of the present invention to provide an optical laminate which has high absorption selectivity to short-wavelength visible light having wavelengths close to 400 nm and hence high light fastness and can impart better display characteristics when used for a display device.

The present invention provides the following preferred aspects 1 to 10.

[1] An optical laminate comprising at least one polarizing plate and at least one pressure-sensitive adhesive layer and satisfying the following formulae (1) and (2):

$$A(400) \geq 0.5 \tag{1}$$

$$A(420)/A(400) \leq 0.3 \tag{2}$$

where A(400) represents the absorbance of the optical laminate at a wavelength of 400 nm in the transmission direction of the polarizing plate and A(420) represents the absorbance of the optical laminate at a wavelength of 420 nm in the transmission direction of the polarizing plate.

[2] The optical laminate according to the above [1], wherein;

the pressure-sensitive adhesive layer includes a pressure-sensitive adhesive composition containing:

(A) an acrylic resin which is a copolymer having a weight average molecular weight of 500000 to 2000000 and including, as structural components;

(A-1) 50 to 99.9% by mass of a (meth)acrylate monomer represented by the formula (A-1):

[Chem. 1]

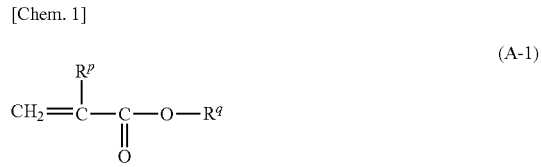

wherein $R^p$ represents a hydrogen atom or a methyl group, $R^q$ represents an alkyl group having 1 to 20 carbon atoms or an aralkyl group in which hydrogen atoms constituting the alkyl group or aralkyl group are optionally substituted with —O—$(C_2H_4O)_n$—$R^r$ (n denotes an integer from 0 to 4 and $R^r$ represents an alkyl group having 1 to 12 carbon atoms or an aryl group having 1 to 12 carbon atoms); and (A-2) 0.1 to 50% by mass of an unsaturated monomer having a polar functional group, based on the total solid content of the acrylic resin;

(B) 0.01 to 10 parts by mass of a crosslinking agent based on 100 parts by mass of the acrylic resin; and (C) a light-selective absorption compound satisfying the following formula (3):

$$\varepsilon(420)/\varepsilon(400) \leq 0.3 \tag{3}$$

where ε(400) represents a gram absorption coefficient at a wavelength of 400 nm and ε(420) represents a gram absorption coefficient at a wavelength of 420 nm.

[3] The optical laminate according to the above [1] or [2], the optical laminate including a light-selective absorption compound satisfying the above formula (3) and the following formulae (4) and (5):

$$\lambda max < 420 \text{ nm} \quad (4)$$

$$\varepsilon(400) \geq 40 \quad (5)$$

where λmax represents the maximum absorption wavelength of the light-selective absorption compound and ε(400) represents a gram absorption coefficient at a wavelength of 400 nm.

[4] The optical laminate according to the above [2] or [3], wherein the light-selective absorption compound is contained in an amount of 0.01 to 10 parts by mass based on 100 parts by mass of the acrylic resin (A).

[5] The optical laminate according to any one of the above [2] to [4], wherein;
the light-selective absorption compound contains at least one type selected from the group consisting of;
compounds represented by the formula (I):

[Chem. 2]

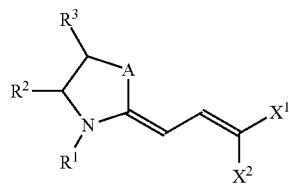

(I)

wherein;
$R^1$ represents a hydrogen atom or an alkyl group having 1 to 10 carbon atoms provided that when the alkyl group has at least one methylene group, at least one of these methylene groups is optionally substituted with an oxygen atom or a sulfur atom, and $R^2$ and $R^3$ independently from each other represent a hydrogen atom or an alkyl group having 1 to 12 carbon atoms; and A represents a methylene group, a secondary amino group, an oxygen atom, or a sulfur atom; and $X^1$ and $X^2$ independently from each other represent an electron attractive group provided that $X^1$ and $X^2$ may be combined to form a ring structure; and compounds represented by the formula (II):

[Chem. 3]

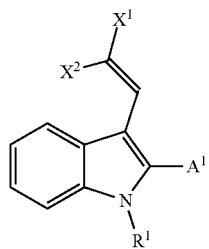

(II)

wherein $A^1$ represents a hydrogen atom, an alkyl group having 1 to 6 carbon atoms, an aromatic hydrocarbon group, or aromatic heterocyclic group provided that when the alkyl group has at least one methylene group, at least one of these methylene groups is optionally substituted with a secondary amino group, an oxygen atom or a sulfur atom, and the aromatic hydrocarbon group and aromatic heterocyclic group may respectively have a substituent; and
$R^1$, $X^1$, and $X^2$ respectively have the same meaning as above.

[6] The optical laminate according to any one of the above [2] to [5], wherein;
the light-selective absorption compound contains at least one type selected from the group consisting of compounds represented by the formula (I-II):

[Chem. 4]

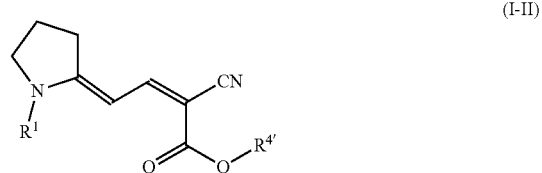

(I-II)

wherein $R^{4'}$ represents a hydrogen atom or an alkyl group having 2 to 20 carbon atoms provided that when the alkyl group has at least one methylene group, at least one of these methylene groups is optionally substituted with an oxygen atom and $R^1$ has the same meaning as above; and
compounds represented by the above formula (II-I):

[Chem. 5]

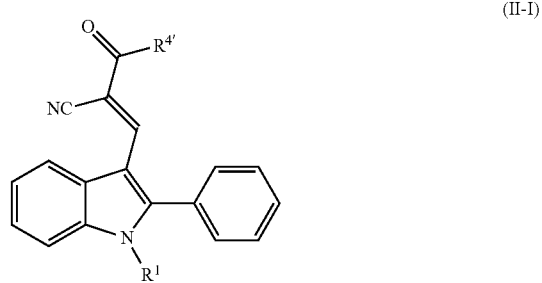

(II-I)

wherein $R^1$ and $R^{4'}$ respectively have the same meaning as above.

[7] The optical laminate according to any one of the above [1] to [6], the optical laminate comprising at least one retardation film.

[8] The optical laminate according to the above [7], wherein the retardation film is a layer constituted of a polymer of a polymerizable liquid crystal compound kept in an orientation state.

[9] The optical laminate according to any one of the above [1] to [8], the optical laminate having a thickness of 50 to 900 μm.

[10] A display device comprising the optical laminate according to any one of the above [1] to [9].

The present invention can provide an optical laminate which has high absorption characteristics for short-wavelength visible light having wavelengths close to 400 nm and hence high light fastness and can impart better display characteristics when used for a display device.

DETAILED DESCRIPTION OF THE PREFERRED EMBODIMENTS

The embodiments of the present invention will be explained in detail. It is to be noted that the scope of the present invention is not limited to the embodiments explained here and may be variously modified without departing from the range of the spirit of the present invention.

The optical laminate of the present invention contains at least one polarizing plate, at least one pressure-sensitive adhesive layer, and preferably at least one retardation film and satisfying the following formulae (1) and (2):

$$A(400) \geq 0.5 \quad (1)$$

$$A(420)/A(400) \leq 0.3 \quad (2)$$

In the formulae (1) and (2), $A(400)$ represents the absorbance of the optical laminate at a wavelength of 400 nm in the transmission direction of the polarizing plate and $A(420)$ represents the absorbance of the optical laminate at a wavelength of 420 nm in the transmission direction of the polarizing plate. When the formulae (1) and (2) are satisfied, the optical laminate has high absorption selectivity at wavelengths close to 400 nm and can therefore be reduced in deterioration caused by short wavelength visible light having wavelengths close to 400 nm, ensuring that when the optical laminate is incorporated into a display device, it can impart better display characteristics to the display device.

Absorption at a wavelength of 400 nm is increased with increase in the value of $A(400)$. When this value is less than 0.5, absorption at a wavelength of 400 nm is low and it is therefore difficult to secure sufficiently high light fastness against short wavelength visible light having wavelengths close to 400 nm. Therefore, the value of $A(400)$ of the optical laminate of the present invention is preferably 0.7 or more, more preferably 0.8 or more, and even more preferably 1.0 or more. The value of $A(400)$ is preferably 5.0 or less to avoid breed-out of the light-selective absorption compound with time from the layer containing the compound although no particular limitation is imposed on its upper limit.

The value of $A(420)/A(400)$ indicates the intensity of absorption at a wavelength of 420 nm in contrast to the intensity of absorption at a wavelength of 400 nm. More specific absorption is observed at a wavelength range around 400 nm with decrease in this value. The optical laminate becomes a less yellowish and more transparent one with decrease in this value. When this value exceeds 0.30, light having wavelengths close to 400 nm can be insufficiently absorbed and also, blue light having a wavelength around 420 nm which is emitted from a display device such as an organic EL device is resultantly absorbed. Therefore, when an optical laminate having a such value is used for a display device, better color expression is inhibited and the display characteristics of the display device tends to be deteriorated. Accordingly, the value of $A(420)/A(400)$ of the optical laminate of the present invention is preferably 0.27 or less, more preferably 0.25 or less, even more preferably 0.23 or less, and particularly preferably 0.2 or less. The value of $A(420)/A(400)$ is preferably 0.01 or more from the viewpoint of light fastness though no particular limitation is imposed on its lower limit. The value of $A(420)/A(400)$ in a preferred embodiment of the present invention is 0.01 to 0.27.

The absorption characteristics of the optical laminate which satisfies the above formulae (1) and (2) can be controlled by formulating a compound having absorption selectivity to a wavelength range around 400 nm. Examples of the compound having absorption selectivity to a wavelength range around 400 nm include compounds satisfying the following formula.

$$\varepsilon(420)/\varepsilon(400) \leq 0.3 \quad (3)$$

In the formula (3), $\varepsilon(400)$ represents a gram absorption coefficient at a wavelength of 400 nm and $\varepsilon(420)$ represents a gram absorption coefficient at a wavelength of 420 nm, wherein the unit of the gram absorption coefficient is expressed by L/(g·cm).

The value of $\varepsilon(420)/\varepsilon(400)$ indicates the intensity of absorption at a wavelength of 420 nm in contrast to the intensity of absorption at a wavelength of 400 nm. More specific absorption is observed at a wavelength range around 400 nm with decrease in this value. High absorption selectivity to a wavelength range around 400 nm can be imparted to the optical laminate by formulating the compound having such absorption characteristics in the optical laminate. Accordingly, the value of $\varepsilon(420)/\varepsilon(400)$ is preferably 0.27 or less, more preferably 0.25 or less, even more preferably 0.23 or less, and particularly preferably 0.2 or less. The value of $\varepsilon(420)/\varepsilon(400)$ is preferably 0.005 or more from the viewpoint of light fastness though no particular limitation is imposed on its lower limit. The value of $\varepsilon(420)/\varepsilon(400)$ in a preferred embodiment of the present invention is 0.005 to 0.27.

Accordingly, in a preferred embodiment of the present invention, the optical laminate preferably includes a light-selective absorption compound satisfying the above formula (3). In the present invention, the compound having absorption characteristics satisfying the above formula (3) is called "light-selective absorption compound" as the compound having high absorption selectivity to a wavelength range around 400 nm.

Light-Selective Absorption Compound

In the present invention, the optical laminate fulfills, besides the above formula (3), the following formulae (4) and (5).

$$\lambda max < 420 \text{ nm} \quad (4)$$

$$\varepsilon(400) \geq 40 \quad (5)$$

In the above formula (4), $\lambda max$ represents a maximum absorption wavelength of the light-selective absorption compound and in the above formula (5), $\varepsilon(400)$ represents a gram absorption coefficient at a wavelength of 400 nm. The unit of the gram absorption coefficient is expressed by L/(g·cm).

When the above formulae (4) and (5) are satisfied, the light-selective absorption compound may be said to be a compound which has a maximum absorption at a wavelength shorter than 420 nm and also, has high absorption at wavelengths close to 400 nm. When such a light-selective absorption compound is contained, an optical laminate having high light fastness is obtained without any adverse influence on display characteristics. Also, this is advantageous in the point that the compound can produce a high absorption effect in a small amount. In the present invention, the maximum absorption $\lambda max$ of the light-selective absorption compound is more preferably 410 nm or less and even more preferably 400 nm or less. Also, the maximum absorption of the compound preferably exists at a wavelength of 370 nm or more and more preferably at a wavelength of 380 nm or more from the viewpoint of light-selective absorptivity. The value of $\varepsilon(400)$ is more preferably 60 or more, even more preferably 80 or more, and even more preferably 100 or more. The value of ε(400) is usually 500 or less although no particular limitation is imposed on its upper limit.

There is no particular limitation to the light-selective absorption compound which may be contained in the optical laminate of the present invention as long as it is a compound having absorption characteristics like those mentioned above and the light-selective absorption compound may be, for example, a known UV absorber. Examples of the known UV absorber include KEMISORB 111, KEMISORB 73 (both manufactured by Chemipro Kaseikaisha Ltd), SUMISORB 300 (manufactured by Sumitomo Chemical Co., Ltd.)

The optical laminate of the present invention preferably contains at least one type selected from the group consisting of compounds represented by the following formulae (I) and (II) from the viewpoint of light absorption selectivity and easiness of addition to the optical laminate.

[Chem. 6]

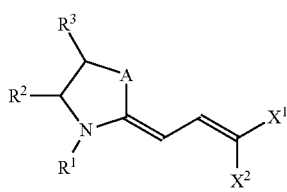

(I)

[Chem. 7]

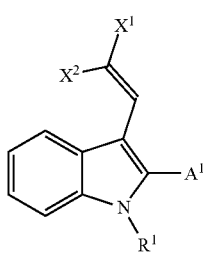

(II)

In the above formulae (I) and (II), $R^1$ represents a hydrogen atom or an alkyl group having 1 to 10 carbon atoms and is preferably an alkyl group having preferably 1 to 8, more preferably 1 to 5, and even more preferably 1 to 3 carbon atoms from the viewpoint of high light absorption selectivity. Here, when the alkyl group has at least one methylene group, at least one of these methylene groups is optionally substituted with an oxygen atom or sulfur atom. Examples of the alkyl group include a methyl group, ethyl group, n-propyl group, isopropyl group, n-butyl group, tert-butyl group, n-hexyl group, n-octyl group, n-decyl group, methoxy group, ethoxy group, and isopropoxy group.

In the above formula (I), $R^2$ and $R^3$ independently from each other represent a hydrogen atom or an alkyl group having 1 to 12 carbon atoms and is preferably a hydrogen atom or an alkyl group having 1 to 10 carbon atoms, more preferably a hydrogen atom or an alkyl group having 1 to 8 carbon atoms, even more preferably a hydrogen atom or an alkyl group having 1 to 5 carbon atoms, particularly preferably a hydrogen atom or an alkyl group having 1 to 3 carbon atoms, and very preferably a hydrogen atom from the viewpoint of high light absorption selectivity.

In the above formulae (I) and (II), $X^1$ and $X^2$ independently from each other represent an electron attractive group. Examples of the electron attractive group include —CN (cyano group), —$NO_2$ (nitro group), halogen atom, alkyl groups substituted with a halogen atom, and —$Y^1$—$R^4$ (in the formula, $R^4$ represents a hydrogen atom, an alkyl group having 2 to 50 carbon atoms, or an alkyl group having at least one methylene group and 2 to 50 carbon atoms, provided that at least one methylene group is substituted with an oxygen atom and a substituent may be combined with a carbon atom on the alkyl group and $Y^1$ represents —CO—, —COO—, —OCO—, $NR^5CO$—, or —$CONR^6$ ($R^5$ and $R^6$ independently represent a hydrogen atom, an alkyl group having 1 to 6 carbon atoms, or a phenyl group)). $X^1$ and $X^2$ may be combined with each other to form a ring structure. Examples of the ring structure formed by $X^1$ and $X^2$ include a Meldrum's acid structure, barbituric acid structure, and dimedone structure.

$X^1$ and $X^2$ are independently preferably —CN (cyano group), —$NO_2$ (nitro group), and —Y'—$R^4$ in which $Y^1$ is —CO—, —COO—, or —OCO and more preferably —CN (cyano group), and —Y'—$R^4$ in which $Y^1$ is —COO— from the viewpoint of light absorption selectivity and compatibility with an acrylic acid composition to be used for the pressure-sensitive adhesive. $X^1$ and $X^2$ are also preferably those which are combined to form a ring structure.

In the above formula (I), A represents a methylene group, a secondary amino group, an oxygen atom, or a sulfur atom and preferably represents a methylene group or an oxygen atom from the viewpoint of developing light selective absorptivity.

In the above formula (II), $A^1$ represents a hydrogen atom, an alkyl group having 1 to 6 carbon atoms, an aromatic hydrocarbon group, or an aromatic heterocyclic group. Here, when the alkyl group has at least one methylene group, at least one of these methylene groups is optionally substituted with a secondary amino group, an oxygen atom, or a sulfur atom. Examples of such an alkyl group include a methyl group, ethyl group, n-propyl group, isopropyl group, n-butyl group, tert-butyl group, n-hexyl group, methoxy group, ethoxy group, and isopropoxy group.

The aromatic hydrocarbon group and aromatic heterocyclic group represented by $A^1$ in the above formula (II) may independently have a substituent. Examples of the substituent include a halogen atom, alkyl group having 1 to 6 carbon atoms, cyano group, nitro group, methoxy group, ethoxy group, and isopropoxy group. The aromatic hydrocarbon group like this is preferably aromatic hydrocarbon groups having 3 to 9 carbon atoms and examples of the aromatic hydrocarbon group include a phenyl group and naphthyl group. Also, the aromatic heterocyclic group is preferably aromatic heterocyclic groups having 3 to 9 carbon atoms and examples of the aromatic heterocyclic group include a pyrrolyl group, pyridyl group, quinolyl group, thienyl group, imidazolyl group, oxazolyl group, and thiazolyl group. $A^1$ is preferably a phenyl group or naphthyl group and more preferably a phenyl group from the viewpoint of production easiness.

Examples of the light-selective absorption compound represented by the above formula (I) include the following compounds:

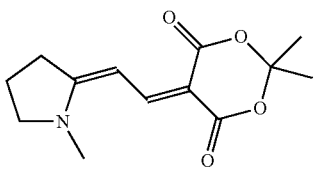

Compounds represented by the following formula (I-I):

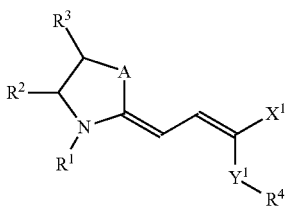

(I-I)

In the formula (I-I), A, $R^1$ to $R^4$, $X^1$ and $Y^1$ independently have the same meaning as above.

Particularly, the optical laminate preferably contains a light-selective absorption compound represented by the formula (I-I) from the viewpoint of compatibility with the acrylic acid composition to be used for the pressure-sensitive adhesive when the light-selective absorption compound is contained in the pressure-sensitive adhesive layer.

The alkyl group having 2 to 50 carbon atoms as $R^4$ in the formula (I-I) preferably has 2 to 30 carbon atoms, more preferably 2 to 20 carbon atoms, and even more preferably 2 to 10 carbon atoms from the viewpoint of solubility in a hydrophobic material or hydrophobic solvent and from the economical point of view.

The alkyl group having at least one methylene group and 2 to 50 carbon atoms as $R^4$ represents an alkyl group having preferably 2 to 40 carbon atoms, more preferably 2 to 30 carbon atoms, even more preferably 2 to 20 carbon atoms, particularly preferably 2 to 10 carbon atoms, and even more preferably 4 to 10 carbon atoms from the viewpoint of solubility in a hydrophobic material and hydrophobic solvent and from the economical point of view. Here, in the alkyl group having at least one methylene group and 2 to 50 carbon atoms, at least one of these methylene groups is substituted with an oxygen atom. Examples of the alkyl group include a methoxy group, ethoxy group, propoxy group, 2-methoxyethoxymethyl group, diethylene glycol group, triethylene glycol group, dipropylene glycol group, and tripropylene glycol group.

Also, a substituent may be combined with a carbon atom on the alkyl group of $R^4$. Examples of the substituent include a halogen atom, alkyl group having 1 to 6 carbon atoms, cyano group, nitro group, alkylsulfinyl group having 1 to 6 carbon atoms, alkylsulfonyl group having 1 to 6 carbon atoms, carboxyl group, fluoroalkyl group having 1 to 6 carbon atoms, alkoxy group having 1 to 6 carbon atoms, alkylthio group having 1 to 6 carbon atoms, N-alkylamino group having 1 to 6 carbon atoms, N,N-dialkylamino group having 2 to 12 carbon atoms, N-alkylsulfamoyl group having 1 to 6 carbon atoms, and N,N-dialkylsulfamoyl group having 2 to 12 carbon atoms.

Particularly, when $R^4$ is an alkyl group having 3 to 50 carbon atoms, $R^4$ is more preferably an alkyl group having a branched structure and 3 to 12 carbon atoms and even more preferably an alkyl group having a branched structure and 6 to 10 carbon atoms.

Here, the alkyl group having a branched structure represents an alkyl group in which at least one of the carbon atoms which the alkyl group has is tertiary carbon or quaternary carbon. Examples of the alkyl group having a branched structure and 3 to 12 carbon atoms include alkyl groups having the following structures.
[Chem. 10]

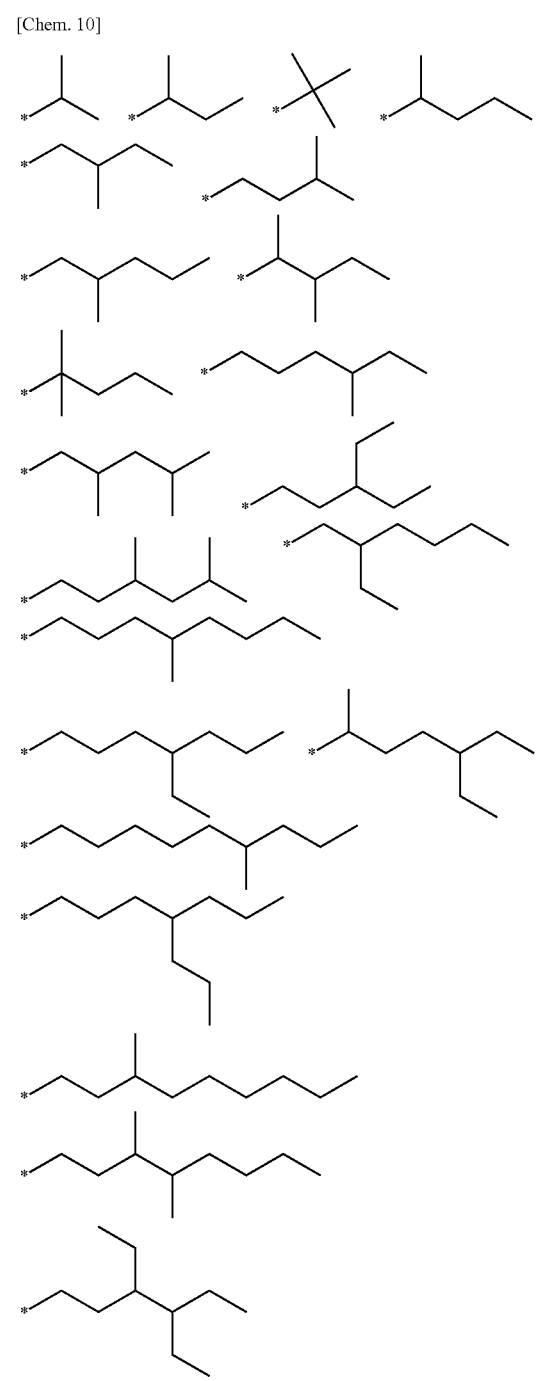

-continued

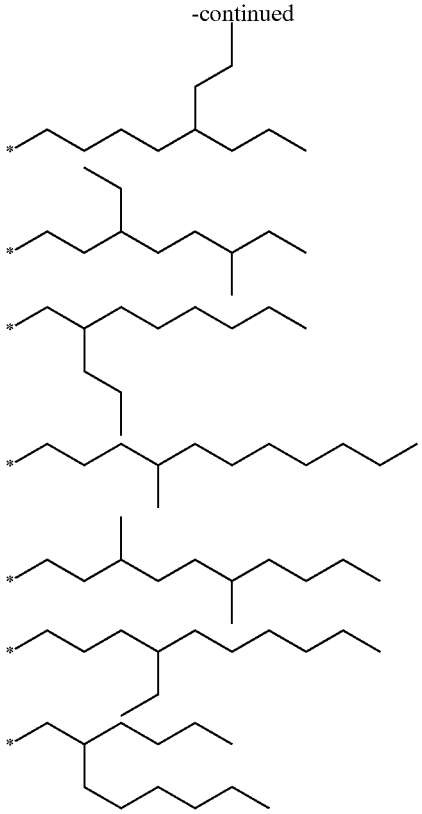

wherein * represents a connecting part.

$Y^1$ in the formula (I-I) is preferably —CO—, —COO—, or —OCO— from the viewpoint of light absorption selectivity and compatibility with the acrylic acid composition to be used for the pressure-sensitive adhesive.

Examples of the compound represented by the above formula (I-I) include compounds represented by the following formula (I-II):

[Chem. 11]

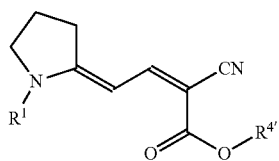

(I-II)

Because compounds represented by the formula (I-II) have high light absorption selectivity and high compatibility with the acrylic acid composition to be used for the pressure-sensitive adhesive when the light-selective absorption compound is contained in the pressure-sensitive adhesive layer, the optical laminate preferably contains a light-selective absorption compound represented by the formula (I-II).

$R^1$ in the formula (I-II) has the same meaning as above. $R^{4'}$ represents a hydrogen atom or an alkyl group having 2 to 20 carbon atoms wherein, when the alkyl group has at least one methylene group, at least one of these methylene groups is optionally substituted with an oxygen atom. Examples of such an alkyl group include those exemplified for $R^4$ in the above formula (I-I). Particularly, $R^{4'}$ is preferably an alkyl group which is optionally substituted with an oxygen atom and has 3 to 18 carbon atoms and more preferably an alkyl group which is optionally substituted with an oxygen atom and has 5 to 15 carbon atoms from the viewpoint of the capability of imparting high fastness to the optical laminate.

Examples of the compound represented by the above formula (I-II) include compounds represented by the following formula (I-III):

[Chem. 12]

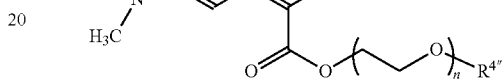

(I-III)

In the above formula, $R^{4''}$ represents an alkyl group having 1 to 6 carbon atoms and n denotes an integer from 1 to 10. The light-selective absorption compound represented by the formula (I-III) has high absorption selectivity to a wavelength range around 400 nm and high solubility in various solvents and/or excellent affinity to various types of compounds. Therefore, it can be easily dissolved in various types of solvents usually used in the art, is also resistant to the occurrence of breed-out, and can impart high light fastness to the optical laminate. Therefore, the light-selective absorption compound represented by the formula (I-III) is one of the particularly preferable light-selective absorption compounds in the present invention.

In the formula (I-III), $R^{4''}$ is preferably an alkyl group having 2 to 5 carbon atoms and more preferably an alkyl group having 3 or 4 alkyl groups. Also, n is an integer of preferably 1 to 8 and more preferably 1 to 6 and for example, an integer of 1 to 4, and particularly an integer of 1 to 3. When n falls in the above range, the light-selective absorption compound can be easily dissolved in various types of hydrophobic solvents used to dissolve, for example, a pressure-sensitive adhesive composition because it has high solubility in a hydrophobic solvent.

Examples of the compound represented by the formula (I-III) include the following compounds.

[Chem. 13]

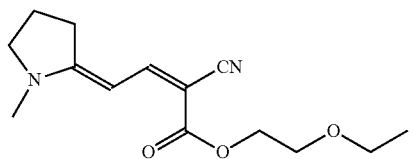

Examples of the light-selective absorption compound represented by the above formula (II) include the following compounds represented by the following formulae:

[Chem. 14]

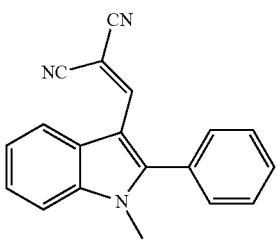

and

[Chem. 15]

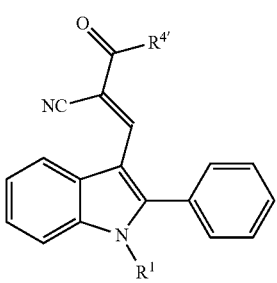

(II-I)

In the formulae, $R^1$ and $R^{4'}$ respectively have the same meaning as those represented in the above formula (I-II).

Particularly, the light-selective absorption compound represented by the formula (II) is preferably compounds represented by the formula (II-I) from the viewpoint of production easiness, preferably compounds represented by the formula (II-I) in which $R^{4'}$ is an alkyl group which has 2 to 20 carbon atoms and is optionally substituted with an oxygen atom, and more preferably compounds represented by the formula (II-I) in which $R^{4'}$ is an alkyl group which has 5 to 15 carbon atoms and is optionally substituted with an oxygen atom.

Examples of the compound represented by the formula (II-I) include the following compounds.

[Chem. 16]

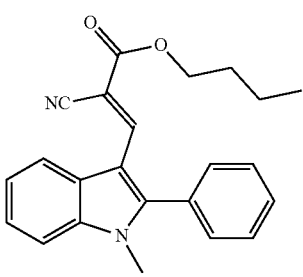

[Chem. 17]

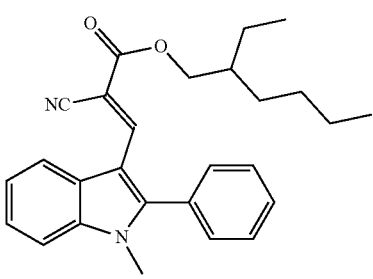

[Chem. 18]

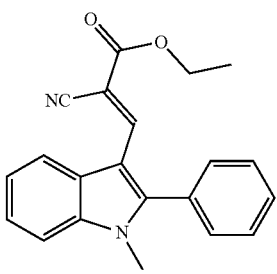

[Chem. 19]

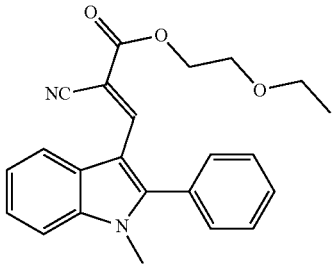

[Chem. 20]

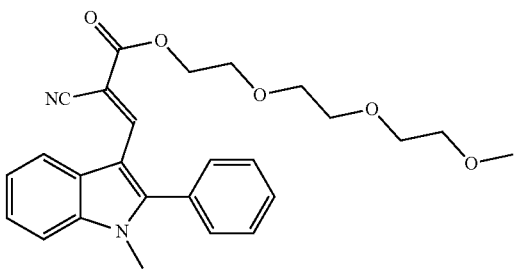

In the present invention, the light-selective absorption compound preferably contains at least one type selected from the group consisting of compounds represented by the formula (I) and compounds represented by the formula (II) and at least one type selected from the group consisting of compounds represented by the formula (I-II) and compounds represented by the formula (II-I). Moreover, compounds represented by the formula (I) are preferable, compounds represented by the formulae (I-I) and (II-I) are more preferable, and compounds represented by the formulae (I-II) and (I-III) are even more preferable. Compounds represented by the formulae (I), (II), (I-I), (II-I), (I-II), and (I-III) may be contained in combinations.

For example, the compound represented by the formula (I-II) may be produced by reacting 2-methylpyrroline with a methylating agent to form a 1,2-dimethylpyrrolinium salt, which is then reacted with N,N'-diphenylformamidine and finally with acetic acid anhydride and active methylene compound in the presence of an amine catalyst. The compounds represented by the above formulae (I), (I-I), and (I-III) may be produced in the same method as in the production of the compound represented by the above formula (I-II). The compounds represented by the formulae (II) and (II-I) may be produced by reacting 3-formylindole with an active methylene compound (Knoevenagel reaction) and in this case, an amine catalyst may be used together in the reaction. When $R^1$ in the formulae (II) and (II-I) is an alkyl group having 1 to 10 carbon atoms, an alkyl halide may be reacted with 3-formylindole in the presence of a base catalyst and then with an active methylene compound to produce a target light-selective absorption compound. Also, materials commercially available as these compounds may be used.

The absorption characteristics of the optical laminate of the present invention can be controlled by compounding the above light-selective absorption compound. The content of the light-selective absorption compound may be properly decided according to, for example, the kinds and combinations of the light-selective absorption compounds to be used, the kind and amount of solvent, the layer in which the light-selective absorption compound is formulated and the thickness of the layer (for example, a pressure-sensitive adhesive layer).

Moreover, the optical laminate of the present invention may contain a known UV absorber which is usually used in the art and exhibits absorption in a wavelength range of about 200 to 400 nm besides the light-selective absorption compound exhibiting absorption in a wavelength range around 400 nm. Examples of the UV absorber include 2-(5-chloro-2H-benzotriazole-2-yl)-6-tert-butyl-4-methyl-phenol, 2-(4,6-diphenyl-1,3,5-triazine-2-yl)-5-[2-(2-ethyl-hexazonoyloxy)ethoxy]phenol, and 2,4,6-tris(2-hydroxy-4-hexyloxy-3-methylphenyl)-1,3,5-triazine. The deterioration caused by ultraviolet rays in the performance of various types of members constituting a display device can be more efficiently reduced and therefore, the light fastness of the optical laminate can be more improved.

Here, no particular limitation is imposed on the structural members constituting the optical laminate of the present invention as long as these members include at least one polarizing plate and at least one pressure-sensitive adhesive layer and are so constituted as to exhibit a desired optical function. For example, an optical laminate including a protection film, retardation film, and the like besides a polarizing plate and pressure-sensitive adhesive layer as the structural members is given as an example of the optical laminate of the present invention. Although no particular limitation is imposed on the layer structure of these various structural members, optical films such as a polarizing plate and a retardation film are applied to a display device with a pressure-sensitive adhesive layer disposed therebetween to constitute an optical laminate in general.

In the optical laminate of the present invention, the light-selective absorption compound may be contained in, for example, the protection film or retardation film. However, particularly, the pressure-sensitive adhesive layer preferably contains the light-selective absorption compound from the viewpoint of developing a thin-layered optical laminate.

The structure of the optical laminate of the present invention in a preferred embodiment of the present invention will be hereinafter explained in detail.

Pressure-Sensitive Adhesive Layer

In the present invention, a pressure-sensitive adhesive having a base polymer such as an acrylic type, rubber type, urethane type, silicone type, and polyvinyl type may be used as the pressure-sensitive adhesive constituting the pressure-sensitive adhesive layer. Among these compounds, the pressure-sensitive adhesive layer constituting the optical laminate of the present invention is preferably formed from a pressure-sensitive adhesive composition having an acrylic resin as the base polymer from the viewpoint of high heat resistance and light fastness.

In a preferred embodiment of the present invention, the pressure-sensitive adhesive layer of the optical laminate is formed from a pressure-sensitive adhesive composition containing;

(A) an acrylic resin which is a copolymer having a weight average molecular weight of 500000 to 2000000 and including, as structural components;

(A-1) 90 to 99.9% by mass of a (meth)acrylate monomer represented by the following formula (A-1):

[Chem. 21]

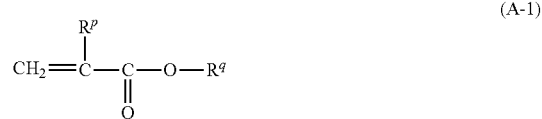

and;

(A-2) 0.1 to 10% by mass of an unsaturated monomer having a polar functional group based on the total solid content of the acrylic resin;

(B) 0.1 to 10 parts by mass of a crosslinking agent based on 100 parts by mass of the acrylic resin; and (C) a light-selective absorption compound satisfying the above formula (3).

In the above formula (A-1), $R^P$ represents a hydrogen atom or a methyl group. $R^q$ represents an alkyl group having 1 to 20 carbon atoms or an aralkyl group and is preferably an alkyl group having 1 to 10 carbon atoms or aralkyl group, in which hydrogen atoms constituting the alkyl group or aralkyl group are optionally substituted with —O—$(C_2H_4O)_n$—$R^r$. Here, n denotes an integer of preferably 0 to 4 and more preferably 0 to 3 and $R^1$ represents an alkyl group having preferably 1 to 12 carbon atoms and more preferably 1 to 5 carbon atoms or an aryl group having preferably 1 to 12 carbon atoms and more preferably 1 to 10 carbon atoms.

Examples of the (meth)acrylate monomer (A-1) (hereinafter referred to as "monomer (A-1)" according to the case) represented by the above formula (A-1) include linear alkyl acrylates such as methyl acrylate, ethyl acrylate, propyl acrylate, n-butyl acrylate, n-octyl acrylate, and lauryl acrylate; branched alkyl acrylates such as isobutyl acrylate, 2-ethylhexylacrylate, and isooctyl acrylate; linear alkyl methacrylates such as methyl methacrylate, ethyl methacrylate, propyl methacrylate, n-butyl methacrylate, n-octyl methacrylate, and lauryl methacrylate; branched alkyl methacrylates such as isobutyl methacrylate, 2-ethylhexyl methacrylate, and isooctyl methacrylate; acrylates having an aromatic group such as phenyl acrylate and benzyl acrylate; and methacrylates having an aromatic group such as phenyl methaacrylate and benzyl methacrylate. These compounds may be used either independently or in combinations of two or more. Among these compounds, n-butyl acrylate is preferable from the viewpoint of developing adhesion.

In the unsaturated monomer (A-2) (hereinafter referred to as "monomer (A-2)" according to the case) having a polar functional group, the polar functional group may be a free carboxyl group, hydroxyl group, amino group, and heterocyclic groups including an epoxy ring. The monomer (A-2) is preferably a (meth)acrylic acid type compound having a polar functional group. Examples of the (meth)acrylic acid type compound include unsaturated monomers having a free carboxyl group, such as acrylic acid, methacrylic acid, and β-carboxyethylacrylate; unsaturated monomers having a hydroxyl group, such as 2-hydroxylethyl (meth)acrylate, 2-hydroxypropyl (meth)acrylate, 2- or 3-chloro-2-hydroxypropyl (meth)acrylate, and diethylene glycol mono(meth)acrylate; unsaturated monomers having a heterocyclic group such as acryloyl morpholine, vinyl caprolactam, N-vinyl-2- pyrrolidone, tetrahydrofurfuryl (meth)acrylate, caprolactone-modified tetrahydrofurfuryl acrylate, 3,4-epoxycyclohexylmethyl (meth)acrylate, glycidyl (meth)acrylate, and 2,5-dihydrofuran; and unsaturated monomers having an amino group different from a heteroring, such as N,N-dimethylaminoethyl (meth)acrylate. These monomers (A-2) may be used either independently or in combinations of two or more.

Among these compounds, an unsaturated monomer having a hydroxyl group is preferably contained as one of the monomers (A-2) constituting the acrylic resin (A) from the viewpoint of improving the adhesion of the pressure-sensitive adhesive layer and more improving durability.

The acrylic resin (hereinafter referred to as "acrylic resin (A)" according to the case) including a monomer (A-1) and a monomer (A-2) as structural components contains a structural unit derived from the monomer (A-1) in an amount of preferably 50 to 99.9% by mass and more preferably 70 to 99.9% by mass based on the total resin solid content. Also, the acrylic resin contains a structural unit derived from the monomer (A-2) in an amount of preferably 0.1 to 50% by mass and more preferably 0.1 to 30% by mass. When the ratios of the monomer (A-1) and the monomer (A-2) fall in the above range, a pressure-sensitive adhesive composition can be obtained which provides a pressure-sensitive adhesive layer superior in processability.

Moreover, the acrylic resin (A) may contain, as a structural component, a monomer (hereinafter referred to as "monomer (A-3)" according to the case) other than the monomers (A-1) and (A-2). Examples of this other monomer may include (meth)acrylates having an alicyclic structure in its molecule, styrene type monomers, vinyl type monomers, monomers each having a plurality of (meth)acryloyl groups in its molecule, and (meth)acrylamide derivatives.

The alicyclic structure means a cycloparaffin structure having usually 5 or more and preferably about 5 to 7 carbon atoms. Examples of the acrylate having an alicyclic structure include isobornyl acrylate, cyclohexyl acrylate, dicyclopentanyl acrylate, cyclododecyl acrylate, methylcyclohexyl acrylate, trimethylcyclohexyl acrylate, tert-butylcyclohexyl acrylate, cyclohexyl α-ethoxyacrylate, and cyclohexylphenyl acrylate. Examples of the methacrylate having an alicyclic structure include isobornyl methacrylate, cyclohexyl methacrylate, dicyclopentanyl methacrylate, cyclododecyl methacrylate, methylcyclohexyl methacrylate, trimethylcyclohexyl methacrylate, tert-butylcyclohexyl methacrylate, and cyclohexylphenyl methacrylate.

Examples of the styrene type monomer may include, besides styrene, alkyl styrene such as methylstyrene, dimethylstyrene, trimethylstyrene, ethylstyrene, diethylstyrene, triethylstyrene, propylstyrene, butylstyrene, hexylstyrene, heptylstyrene, and octylstyrene; halogenated styrene such as fluorostyrene, chlorostyrene, bromostyrene, dibromostyrene, and iodostyrene; and further, nitrostyrene, acetylstyrene, methoxystyrene, and divinylbenzene.

Examples of the vinyl type monomer may include aliphatic acid vinyl esters such as vinyl acetate, vinyl propionate, vinyl butylate, vinyl 2-ethylhexanoate, and vinyl laurate; vinylidene halide such as vinylidene chloride; nitrogen-containing aromatic vinyl such as vinylpyridine, vinylpyrrolidone, and vinylcarbazole; conjugated diene monomers such as butadiene, isoprene, and chloroprene; and further, acrylonitrile, and methacrylonitrile.

Examples of the monomer having a plurality of (meth)acryloyl groups in its molecule may include monomers each having two (meth)acryloyl groups in its molecule, such as 1,4-butanediol di(meth)acrylate, 1,6-hexanediol di(meth)acrylate, 1,9-nonanediol di(meth)acrylate, ethylene glycol di(meth)acrylate, diethylene glycol di(meth)acrylate, tetraethylene glycol di(meth)acrylate, and tripropylene glycol di(meth)acrylate; and monomers having three (meth)acryloyl groups in its molecule, such as trimethylopropane tri(meth)acrylate.

Examples of the (meth)acrylamide derivatives may include N-methylol(meth)acrylamide, 2-hydroxyethyl(meth)acrylamide, 3-hydroxypropyl(meth)acrylamide, 4-hydroxybutyl(meth)acrylamide, 5-hydroxypentyl(meth)acrylamide, 6-hydroxyhexyl(meth)acrylamide, N-methoxymethyl(meth)acrylamide, N-ethoxymethyl(meth)acrylamide, N-propoxymethyl(meth)acrylamide, N-butoxymethyl(meth)acrylamide, N,N-dimethyl(meth)acrylamide, N,N-diethyl(meth)acrylamide, N-isopropyl(meth)acrylamide, N-dimethylaminopropyl(meth)acrylamide, N-(1,1-dimethyl-3oxobutyl) (meth)acrylamide, N-[2-(2-oxo-1-imidazolidinyl)ethyl] (meth)acrylamide, and N-acryloylamino-2-methyl-1-propanesulfonic acid.

The above monomer (A-1), monomer (A-2), and other monomer (A-3) may be used either independently or in combinations of two or more. In the present invention, the structural unit derived from the above monomer (A-3) in the acrylic resin (A) which may be used in the pressure-sensitive adhesive composition is contained in an amount of usually 0 to 20 parts by mass and preferably 0 to 10 parts by mass based on the total solid content of the acrylic resin (A).

In a preferred embodiment of the present invention, the pressure-sensitive adhesive composition may contain one or two or more types of the above acrylic resins (A).

The weight average molecular weight (Mw) of the above acrylic resin (A) measured in terms of standard polystyrene by gel permeation chromatography (GPC) is preferably 500000 to 2000000, more preferably 600000 to 1800000, and even more preferably 700000 to 1700000. When the weight average molecular weight measured in terms of standard polystyrene is 500000 or more, this is desirable because this improves adhesion under high-temperature and high humidity, tends to reduce the possibility of occurrences of lifting and delamination between the glass substrate (image display element) and the pressure-sensitive adhesive layer and also tends to improve reworkability. Also, when this weight average molecular weight is 2000000 or less, this is desirable because even if an optical film or the like is changed in dimension when the pressure-sensitive adhesive layer is applied to the optical film, the pressure-sensitive adhesive sheet changes corresponding to the dimensional change and there is therefore a tendency that a difference in brightness between the peripheral parts and center of an image display element such as a liquid crystal cell is decreased, resulting in the reduction of white voids and color unevenness. The molecular weight distribution expressed by the ratio (Mw/Mn) of the weight average molecular weight (Mw) to the number average molecular weight (Mn) is generally in a range from about 2 to 10.

The aforementioned acrylic resin (A) may be produced by each of the known various methods such as a solution polymerization method, emulsion polymerization method, and suspension polymerization method. In the production of this acrylic resin, a polymerization initiator is usually used. The polymerization initiator is used in an amount of about 0.001 to 5 parts by mass based on 100 parts by mass of all monomers to be used in the production of the acrylic resin.

As the polymerization initiator, a thermopolymerization initiator, photopolymerization initiator, or the like is used. Examples of the photopolymerization initiator may include 4-(2-hydroxyethoxy)phenyl(2-hydroxy-2-propyl)ketone. Examples of the thermopolymerization initiator may include azo type compounds such as 2,2'-azobisisobutyronitrile, 2,2'-azobis(2-methylbutyronitrile), 1,1'-azobis(cyclohexane-1-carbonitrile), 2,2'-azobis(2,4-dimethylvaleronitrile), 2,2'-azobis(2,4-dimethyl-4-methoxyvaleronitrile), dimethyl-2,2'-azobis(2-methylpropionate), and 2,2'-azobis (2-hydroxymethylpropionitrile); organic peroxides such as lauryl peroxide, tert-butyl hydroperoxide, benzoyl peroxide, tert-butylperoxybenzoate, cumene hydroperoxide, diisopropylperoxydicarbonate, dipropylperoxydicarbonate, tert-butylperoxyneodecanoate, tert-butylperoxypivalate, and (3,5, 5-trimethylhexanoyl)peroxide; and inorganic peroxides such as potassium peroxide, ammonium peroxide, and hydrogen peroxide. Also, for example, a redox type initiator using a combination of a peroxide and a reducing agent may be used as the polymerization initiator.

Among the methods shown above, the solution polymerization method is preferable as the method for producing the acrylic resin (A). Taking the solution polymerization method as an example to explain, the following method may be given as the example. Specifically, a desired monomer and organic solvent are mixed with each other and a thermopolymerization initiator is added to the mixture in a nitrogen atmosphere to stir the mixture at a temperature of about 40 to 90° C. and preferably 60 to 80° C. for about 3 to 10 hours. Also, a monomer and a thermopolymerization initiator may be added continuously or intermittently during polymerization or may be added in a solution state where these ingredients are dissolved in an organic solvent to control the reaction. Here, as the organic solvent, aromatic hydrocarbons such as toluene and xylene; esters such as ethyl acetate and butyl acetate; aliphatic alcohols such as propyl alcohol and isopropyl alcohol; and ketones such as acetone, 2-butanone, and methyl isobutyl ketone may be used.

The pressure-sensitive adhesive composition may contain, besides the above acrylic resin (A), an acrylic resin different from this acrylic resin. Examples of the other acrylic resin may include those which each contain, as its major component, a structural unit which is derived from (meth)acrylates (for example, polymethyl (meth)acrylate) and each have such a relatively low molecular weight that its weight average molecular weight is in a range from 50000 to 300000.

When the pressure-sensitive adhesive composition contains an acrylic resin different from the acrylic resin (A), the content of the acrylic resin different from the acrylic resin (A) is usually preferably 50 parts by mass or less and more preferably 30 parts by mass or less based on 100 parts by mass of the acrylic resin (A).

A solution adjusted to a solid concentration of 20% by mass by dissolving the acrylic resin (a mixture of two or more types when they are combined) to be contained in the pressure-sensitive adhesive composition in ethyl acetate preferably has a viscosity of 20 Pa·s or less and more preferably 0.1 to 7 Pa·s at 25° C. When the viscosity is 20 Pa·s or less, this is desirable because adhesion under a high-temperature and high-humidity condition is improved and there is therefore a tendency that the possibility of the occurrences of lifting and delamination between the display device and the pressure-sensitive adhesive layer is reduced and also the reworkability is improved. The viscosity may be measured by a Brookfield viscometer.

In the pressure-sensitive adhesive composition, for example, a compound is used, as the crosslinking agent, which reacts with, particularly, a structural unit derived from an unsaturated monomer having a polar functional group in the acrylic resin (A) to crosslink the acrylic resin (A). Examples of the crosslinking agent include an isocyanate type compound, epoxy type compound, aziridine type compound, and metal chelating type compound. Among these compounds, the isocyanate type compound, epoxy type compound, and aziridine type compound each contain, in its molecule, at least two functional groups which can react with the polar functional group in the acrylic resin (A).

The isocyanate type compound is a compound having at least two isocyanate groups (—NCO) in its molecule and examples of the isocyanate type group include tolylene diisocyanate, hexamethylene diisocyanate, isophorone diisocyanate, xylylene diisocyanate, hydrogenated xylylene diisocyanate, diphenylmethane diisocyanate, hydrogenated diphenylmethane diisocyanate, naphthalene diisocyanate, and triphenylmethane triisocyanate. Also, adducts obtained by reacting polyols such as glycerol and trimethylolpropane with these isocyanate compounds and dimers or trimers of these isocyanate compounds may be used as the crosslinking agent. Two or more types of isocyanate type compounds may be used in combinations.

The epoxy type compound is a compound having at least two epoxy groups in its molecule and examples of the epoxy type compound include a bisphenol A-type epoxy resin, ethylene glycol diglycidyl ether, polyethylene glycol diglycidyl ether, glycerin diglycidyl ether, glycerin triglycidyl ether, 1,6-hexanediol diglycidyl ether, trimethylolpropane triglycidyl ether, N,N-diglycidylaniline, N,N,N',N'-tetraglycidyl-m-xylenediamine, and 1,3-bis(N,N'-diglycidylaminomethyl)cyclohexane. Two or more types of epoxy type compounds may be mixed to use.

The aziridine compound is a compound having, in its molecule, at least two three-membered ring skeletons also called ethyleneimine consisting of one nitrogen and two carbon atoms and examples of the aziridine type compound include diphenylmethane-4,4'-bis(1-aziridinecarboxamide), toluene-2,4-bis(1-aziridinecarboxamide), triethylenemelamine, isophthaloylbis-1-(2-methylaziridine), tris-1-aziridinylphosphine oxide, hexamethylene-1,6-bis(l-aziridinecarboxamide), trimethylolpropane-tri-β-aziridinylpropionate, and tetramethylolmethane-tri-β-aziridinylpropionate.

Examples of the metal chelating compound include compounds in which acetylacetone or ethyl acetoacetate is coordinated with a polyvalent metal such as aluminum, iron, copper, zinc, tin, titanium, nickel, antimony, magnesium, vanadium, chromium, and zirconium.

Among these crosslinking agents, for example, an isocyanate compound and particularly, xylylene diisocyanate, tolylene diisocyanate, or hexamethylene diisocyanate, or adducts obtained by reacting these isocyanate compounds with polyols such as glycerol and trimethylolpropane, a mixture of dimers or trimers of these isocyanate compounds, or a mixture of these isocyanate type compounds are preferably used. Preferred examples of the isocyanate type compound include tolylene diisocyanate, adducts obtained by reacting tolylene diisocyanate with polyols, dimers of tolylene diisocyanate, trimers of tolylene diisocyanate, hexamethylene diisocyanate, adducts obtained by reacting hexamethylene diisocyanate with polyols, dimers of hexamethylene diisocyanate, and trimers of hexamethylene diisocyanate.

In the present invention, the pressure-sensitive adhesive composition contains preferably 0.01 to 10 parts by mass, more preferably 0.01 to 0.08 parts by mass, and even more preferably 0.01 to 0.06 parts by mass of the crosslinking agent based on 100 parts by mass of the solid content of the above acrylic resin (total content of two or more types of acrylic resins when these acrylic resins are used in combinations). When the amount of the crosslinking agent is 0.01 parts by mass or more, this is desirable because there is a tendency that the pressure-sensitive adhesive layer is improved in durability. When the amount of the crosslinking agent is 10 parts by mass or less, this is desirable because white voids are made unnoticeable when a pressure-sensitive adhesive obtained from the pressure-sensitive adhesive composition is applied to a liquid crystal display device.

In a preferred embodiment of the present invention, the pressure-sensitive adhesive composition contains the light-selective absorption compound satisfying the above formula (3). Although, in the optical laminate of the present invention, the light-selective absorption compound may be contained in any structural member (layer) constituting the optical laminate as mentioned above, it is advantageous to contain the light-selective absorption compound in the pressure-sensitive adhesive layer from the viewpoint of developing a thin-layered optical laminate because the optical laminate can be formed without forming any protection film by formulating the light-selective absorption compound in the pressure-sensitive adhesive layer.

Examples of the light-selective absorption compound satisfying the above formula (3) include the same light-selective absorption compounds as those explained above and for example, compounds represented by the formulae (I) and (II) are preferably used. These light-selective absorption compounds may be used either independently or in combinations of two or more. Among these compounds, compounds represented by the formulae (I-I) and (II-I) are more preferable and compounds represented by the formulae (I-II) and (I-III) are particularly preferable from the viewpoint of resistance to breed-out after the pressure-sensitive adhesive layer is formed and also from the viewpoint of widened choices for the solvent because these compounds each have high solubility in various types of solvents to be used to dissolve other components constituting the pressure-sensitive adhesive composition and the pressure-sensitive adhesive composition. Because these compounds can produce high absorption effect in a small amount, a pressure-sensitive adhesive layer can be obtained which has high absorption characteristics, that is high absorption selectivity to a short wavelength range around 400 nm while keeping high adhesion.

The content of the light-selective absorption compound in the pressure-sensitive adhesive composition is preferably 0.01 to 10 parts by mass, more preferably 0.01 parts by mass or more and less than 5 parts by mass, further preferably 0.01 to 7 parts by mass, further more preferably 0.01 to 5 parts by mass, and even more preferably 0.05 to 3 parts by mass based on 100 parts by mass of the solid content of the above acrylic resin (100 parts by mass of the total content of two or more types of acrylic resins when these acrylic resins are used in combinations). When the light-selective absorption compound is contained in an amount falling in the above range, a pressure-sensitive adhesive layer is obtained which has high absorption characteristics, that is high absorption selectivity to a wavelength range around 400 nm, so that high light fastness can be provided.

Also, in the present invention, the pressure-sensitive adhesive composition preferably contains a silane type compound and it is particularly preferable to formulate a silane compound in the acrylic resin before the crosslinking agent is formulated. Because a silane type compound improves adhesion to glass, the adhesion between the display device and pressure-sensitive adhesive layer sandwiched between glass substrates can be improved.

Examples of the silane type compound include vinyltrimethoxysilane, vinyltriethoxysilane, vinyltris(2-methoxyethoxy)silane, N-(2-aminoethyl)-3-aminopropylmethyldimethoxysilane, N-(2-aminoethyl)-3-aminopropyltrimethoxysilane, 3-aminopropyltriethoxysilane, 3-glycidoxypropyltrimethoxysilane, 3-glycidoxypropylmethyldimethoxysilane, 2-(3,4-epoxycyclohexyl)ethyltrimethoxysilane, 3-chloropropylmethyldimethoxysilane, 3-chloropropyltrimethoxysilane, 3-methacryloyloxypropyltrimethoxysilane, 3-mercaptopropyltrimethoxysilane, 3-glycidoxypropyltrimethoxysilane, 3-glycidoxypropyltriethoxysilane, 3-glycidoxypropyldimethoxymethylsilane, and 3-glycidoxypropylethoxydimethylsilane. Two or more types of silane type compounds may be used.

The silane type compound may be a silicone oligomer type. If silicone oligomers are expressed by a (monomer) oligomer form, the following compounds may be given as examples.

Mercaptopropyl group-containing copolymers such as a 3-mercaptopropyltrimethoxysilane-tetramethoxysilane copolymer, 3-mercaptopropyltrimethoxysilane-tetraethoxysilane copolymer, 3-mercaptopropyltriethoxysilane-tetramethoxysilane copolymer, and 3-mercaptopropyltriethoxysilane-tetraethoxysilane copolymer;

Mercaptomethyl group-containing copolymers such as a mercaptomethyltrimethoxysilane-tetramethoxysilane copolymer, mercaptomethyltrimethoxysilane-tetraethoxysilane copolymer, mercaptomethyltriethoxysilane-tetramethoxysilane copolymer, and mercaptomethyltriethoxysilane-tetraethoxysilane copolymer;

Methacryloyloxypropyl group-containing copolymers such as a 3-methacryloyloxypropyltrimethoxysilane-tetramethoxysilane copolymer, 3-methacryloyloxypropyltrimethoxysilane-tetraethoxysilane copolymer, 3-methacryloyloxypropyltriethoxysilane-tetramethoxysilane copolymer, 3-methacryloyloxypropyltriethoxysilane-tetraethoxysilane copolymer, 3-methacryloyloxypropylmethyldimethoxysilane-tetramethoxysilane copolymer, 3-methacryloyloxypropylmethyldimethoxysilane-tetraethoxysilane copolymer, 3-methacryloyloxypropylmethyldiethoxysilane-tetramethoxysilane copolymer, and 3-methacryloyloxypropylmethyldiethoxysilane-tetraethoxysilane copolymer;

Acryloyloxypropyl group-containing copolymers such as a 3-acryloyloxypropyltrimethoxysilane-tetramethoxysilane copolymer, 3-acryloyloxypropyltrimethoxysilane-tetraethoxysilane copolymer, 3-acryloyloxypropyltriethoxysilane-tetramethoxysilane copolymer, 3-acryloyloxypropyltriethoxysilane-tetraethoxysilane copolymer, 3-acryloyloxypropylmethyldimethoxysilane-tetramethoxysilane copolymer, 3-acryloyloxypropylmethyldimethoxysilane-tetraethoxysilane copolymer, 3-acryloyloxypropylmethyldiethoxysilane-tetramethoxysilane copolymer, and 3-acryloyloxypropylmethyldiethoxysilane-tetraethoxysilane copolymer;

Vinyl group-containing copolymers such as a vinyltrimethoxysilane-tetramethoxysilane copolymer, vinyltrimethoxysilane-tetraethoxysilane copolymer, vinyltriethoxysilane-tetramethoxysilane copolymer, vinyltriethoxysilane-tetraethoxysilane copolymer, vinylmethyldimethoxysilane-tetramethoxysilane copolymer, vinylmethyldimethoxysilane-tetraethoxysilane copolymer, vinylmethyldiethoxysilane-tetramethoxysilane copolymer, and vinylmethyldiethoxysilane-tetraethoxysilane copolymer; and Amino group-containing copolymers such as a 3-aminopropyltrimethoxysilane-tetramethoxysilane copolymer, 3-aminopropyltrimethoxysilane-tetraethoxysilane copolymer, 3-aminopropyltriethoxysilane-tetramethoxysilane copolymer, 3-aminopropyltriethoxysilane-tetraethoxysilane copolymer, 3-aminopropylmethyldimethoxysilane-tetramethoxysilane copolymer, 3-aminopropylmethyldimethoxysilane-tetraethoxysilane copolymer, 3-aminopropylmethyldiethoxysilane-tetramethoxysilane copolymer, and 3-aminopropylmethyldiethoxysilane-tetraethoxysilane copolymer.

Many of these silane type compounds are liquids. The amount of the silane type compound to be formulated is usually about 0.01 to 10 parts by mass and preferably 0.01 to 5 parts by mass based on 100 parts by mass of the solid content of the acrylic resin (100 parts by mass of the total content of two or more types of acrylic resins when these acrylic resins are used in combinations). When the amount of the silane type compound is 0.01 parts by mass or more based on 100 parts by mass of the solid content of the acrylic resin, this is desirable because the adhesion of the pressure-sensitive adhesive layer to the display device is improved. Also, when the amount is 10 parts by mass or less, this is desirable because there is a tendency that the breed-out of the silane type compound from the pressure-sensitive adhesive layer is reduced.

The pressure-sensitive adhesive composition may further contain, for example, a crosslinking catalyst, antistatic agent, weathering stabilizer, tackifier, plasticizer, softener, dyes, pigments, inorganic filler, and resins other than the acrylic resin. Also, it is useful that a UV-curable compound is formulated in the pressure-sensitive adhesive composition and ultraviolet rays are applied to cure the composition after the pressure-sensitive adhesive layer is formed, to thereby increase the hardness of the pressure-sensitive adhesive layer. If, particularly, a crosslinking catalyst is formulated together with the crosslinking agent in the pressure-sensitive adhesive composition, this enables the preparation of the pressure-sensitive adhesive layer by aging the pressure-sensitive adhesive layer in a short time, can reduce the occurrences of lifting and delamination between the polarizing plate or protection film and the pressure-sensitive adhesive layer and occurrence of a foaming phenomenon inside the pressure-sensitive adhesive layer, and also sometimes improves reworkability. Examples of the crosslinking catalyst may include amine type compounds such as hexamethylenediamine, ethylenediamine, polyethyleneimine, hexamethylenetetramine, diethylenetriamine, triethylenetetramine, isophoronediamine, trimethylenediamine, polyamino resin, and melamine resin. When an amine type compound is formulated as the crosslinking catalyst in the pressure-sensitive adhesive composition, an isocyanate type compound is preferable as the crosslinking agent.

Each of the aforementioned components constituting the pressure-sensitive adhesive may constitute pressure-sensitive adhesive composition in the condition where it is dissolved in a solvent. Examples of such a solvent include alcohol solvents such as methanol, ethanol, ethylene glycol, isopropyl alcohol, propylene glycol, methyl cellosolve, butyl cellosolve, and propylene glycol monomethyl ether; ester solvents such as ethyl acetate, butyl acetate, ethylene glycol methyl ether acetate, γ-butyrolactone, propylene glycol monomethyl ether acetate, and ethyl lactate; ketone solvents such as acetone, 2-butanone, methyl isobutyl ketone, cyclopentanone, cyclohexanone, methyl amyl ketone, and methyl isobutyl ketone; aliphatic hydrocarbon solvents such as pentane, hexane, and heptane; ether solvents such as tetrahydrofuran and dimethoxyethane; and chlorinated hydrocarbon solvents such as chloroform and chlorobenzene. Among these compounds, 2-butanone, methyl isobutyl ketone, and the like are preferable from the viewpoint of the solubility of each component and also from the viewpoint of reducing environmental loads.

The pressure-sensitive adhesive layer may be formed using, for example, a method in which an organic solvent solution is prepared using the pressure-sensitive adhesive composition and is applied to a film or layer (for example, a polarizing plate and protection film), on which the adhesive layer is to be laminated, by a die coater or gravure coater, followed by drying. Also, the pressure-sensitive adhesive layer may be formed by a method in which a sheet-like pressure-sensitive adhesive formed on a plastic film (called a separate film) which has been subjected to release treatment is transferred to the film or layer to be laminated. The thickness of the pressure-sensitive adhesive layer is generally preferably 30 μm or less and 3 μm or more and more preferably 3 to 20 μm though no particular limitation is imposed on the thickness. When the thickness of the pressure-sensitive adhesive layer is 30 m or less, this is preferable because this improves adhesion under a high-temperature and high-humidity condition, tends to reduce the occurrences of lifting and delamination between the display devices and the pressure-sensitive adhesive layer and also tends to improve reworkability. When this thickness is 3 μm or more, this is desirable because even if an optical film to be applied to the pressure-sensitive adhesive layer is changed its dimension, the pressure-sensitive adhesive sheet changes corresponding to the dimensional change and there is therefore a tendency that a difference in brightness between the peripheral parts and center of a liquid crystal cell (display element) is decreased, resulting in the reduction of white voids and color unevenness.

Optical Film

In the optical laminate of the present invention, for example, the above pressure-sensitive adhesive layer is laminated on an optical film such as a polarizing plate and retardation film and an optical film is applied to a display element via the pressure-sensitive adhesive layer to constitute an optical laminate. Here, the polarizing plate means an optical film having a function of polarizing incident light such as natural light to emit polarized light. Examples of the polarizing plate includes a linearly polarizing plate having the characteristics that it absorbs linearly polarized light which is incident to the surface of a film and has a plane of vibration propagating in a certain direction and transmits linearly polarized light having the plane of vibration perpendicular to the above direction, a polarized beam splitter having the characteristics that it reflects linearly polarized light which is incident to the surface of a film and has a plane of vibration propagating in a certain direction and transmits linearly polarized light having the plane of vibration perpendicular to the above direction, and an elliptically polarizing plate obtained by laminating a polarizing plate and a retardation film which will be explained later. Preferred examples of the polarizing plate and especially, a linearly polarizing plate (also called a polarizer) include those in which a dichroic pigment such as iodine or a dichroic dye is adsorbed to and oriented on a uniaxially stretched polyvinyl alcohol resin film or a polymer of polymerizable liquid crystal compounds.

The retardation film means an optical film exhibiting optical anisotropy and examples of the retardation film include oriented films which obtained by stretching polymer films made from, for example, polyvinyl alcohol, polycarbonate, polyester, polyarylate, polyimide, polyolefin, polycycloolefin, polystyrene, polysulfone, polyether sulfone, polyvinylidene fluoride/polymethylmethacrylate, acetyl cellulose, ethylene-vinyl acetate copolymer saponified product, or polyvinyl chloride at a stretch rate of about 1.01 to 6. Among these films, polymer films obtained by uniaxially or biaxially stretching polycarbonate films or cycloolefin type resin films are preferable.

When the optical laminate of the present invention contains a retardation film, it is preferable to contain a retardation film made to exhibit optical anisotropy by application and orientation of a polymerizable liquid crystal compound from the viewpoint of developing a thinner optical laminate.

Moreover, when the optical laminate of the present invention contains a retardation film, the retardation film preferably has reverse wavelength dispersibility. The reverse wavelength dispersibility means the optical characteristics that the inplane retardation amount at a shorter wavelength is larger than that at a longer wavelength and the retardation film preferably satisfies the following formulae (6) and (7). Here, Re (λ) represents the inplane retardation amount for light having a wavelength of λ nm.

$$Re(450)/Re(550) \leq 1 \quad (6)$$

$$1 \leq Re(630)/Re(550) \quad (7)$$

When the retardation film has reverse wavelength dispersibility in the optical laminate of the present invention, this is desirable because this reduces the coloring level when displaying a black color, and when $0.82 \leq Re(450)/Re(550) \leq 0.93$ in the above formula (6), this is more desirable.

In the optical laminate of the present invention, the retardation film is preferably a layer (hereinafter referred to as "optically anisotropic layer" made from a polymer of a polymerizable liquid crystal compound kept in an orientation state. As the polymerizable liquid crystal compound, the structure represented by the following formula (B-1) is preferable in the point that it enables the development of the aforementioned reverse wavelength dispersibility and also in the point that it has a maximum absorption at a wavelength range from 340 nm to 400 nm. The polymerizable liquid crystal compound can absorb short-wavelength UV light and therefore exhibits more sufficient UV absorption characteristics, enabling reduction in the deterioration of a display device as long as it has the structure represented by the following formula (B-1).

[Chem. 22]

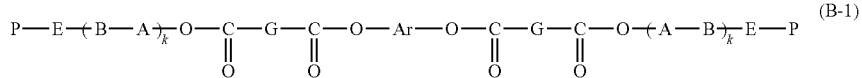

In the formula (B-1);
Ar is a divalent aromatic group and has at least one atom selected from a nitrogen atom, oxygen atom, and sulfur atom;
G represents a divalent alicyclic hydrocarbon group wherein a hydrogen atom contained in the alicyclic hydrocarbon group is optionally substituted with a halogen atom, alkyl group having 1 to 4 carbon atoms, fluoroalkyl group having 1 to 4 carbon atoms, alkoxy group having 1 to 4 carbon atoms, cyano group, or nitro group and —CH$_2$— (methylene group) contained in the alicyclic hydrocarbon group is optionally substituted with —O—, —S—, or —NH—;
B represents a single bond or a divalent connecting group;
A represents a divalent alicyclic hydrocarbon group having 3 to 20 carbon atoms or an aromatic hydrocarbon group having 6 to 20 carbon atoms wherein a hydrogen atom contained in the alicyclic hydrocarbon group and aromatic hydrocarbon group is optionally substituted with an alkyl group which has 1 to 4 carbon atoms and is optionally substituted with a halogen atom, alkoxy group which has 1 to 4 carbon atoms and is optionally substituted with a fluorine atom, cyano group, or nitro group, —CH$_2$— contained in the alicyclic hydrocarbon group is optionally substituted with —O—, —S—, or NR$^1$—, —CH(-)— contained in the alicyclic hydrocarbon group is optionally substituted with —N(-)—, and R$^1$ represents a hydrogen atom or an alkyl group having 1 to 4 carbon atoms;

k denotes an integer from 0 to 3 provided that when k is an integer of 2 or more, two or more As and Bs may be respectively the same or different;

E represents an alkanediyl group having 1 to 17 carbon atoms, wherein a hydrogen atom contained in the alkanediyl group is optionally substituted with a halogen atom and —CH$_2$— contained in the alkanediyl group is optionally substituted with —O— or CO—; and P represents a polymerizable group.

In the formula (B-1), the divalent aromatic group represented by Ar is preferably an aromatic group having a heterocycle from the viewpoint of developing reverse wavelength dispersibility and examples of the aromatic group include aromatic groups containing at least one of a nitrogen atom, oxygen atom, and sulfur atom and having a furan ring, benzofuran ring, pyrrole ring, thiophene ring, pyridine ring, thiazole ring, benzothiazole ring, and phenanthroline ring. Among these compounds, the aromatic group having a heterocycle is more preferably an aromatic group having a benzene ring, thiazole ring, and benzothiazole ring and even more preferably an aromatic group having a benzothiazole group. Also, the nitrogen atom contained in the aromatic ring in Ar preferably has a n-electron.

The total number $N_\pi$ of π-electrons contained in the aromatic ring is preferably 10 or more, more preferably 12 or more, even more preferably 14 or more, preferably 30 or less, and more preferably 25 or less from the viewpoint of developing reverse wavelength dispersibility.

The following groups are exemplified as the aromatic ring represented by Ar.

[Chem. 23]

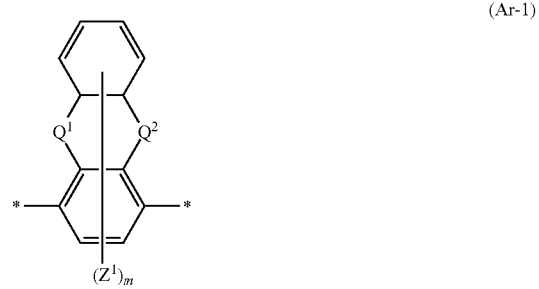

(Ar-1)

-continued
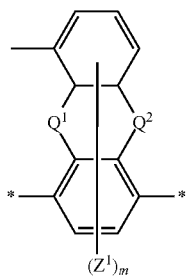 (Ar-2)
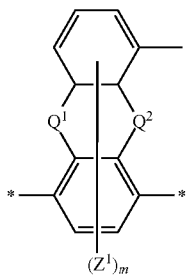 (Ar-3)
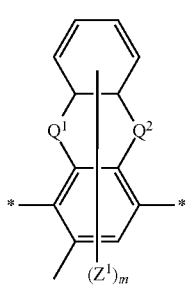 (Ar-4)
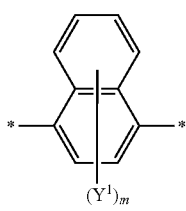 (Ar-5)
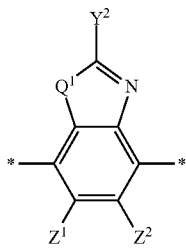 (Ar-6)
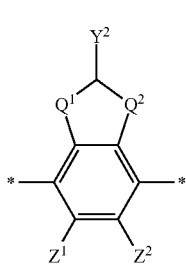 (Ar-7)
-continued
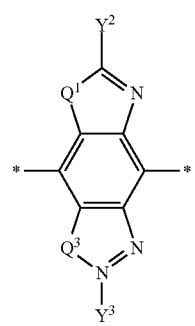 (Ar-8)
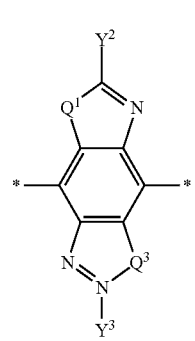 (Ar-9)
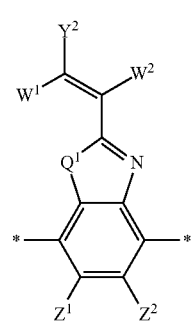 (Ar-10)
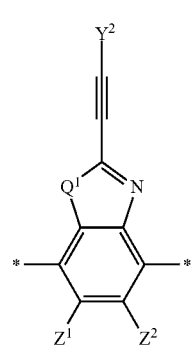 (Ar-11)
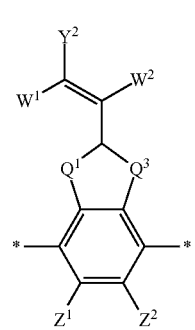 (Ar-12)

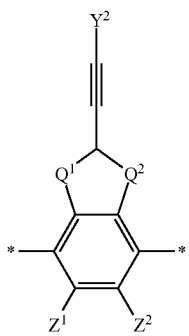
(Ar-13)

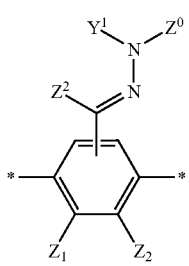
(Ar-14)

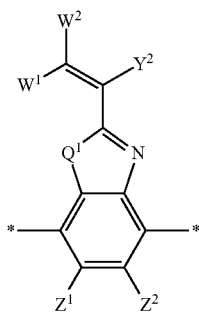
(Ar-15)

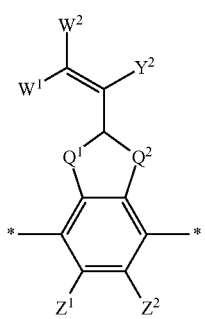
(Ar-16)

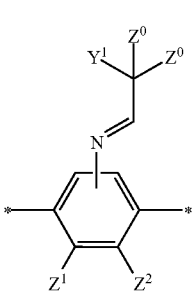
(Ar-17)

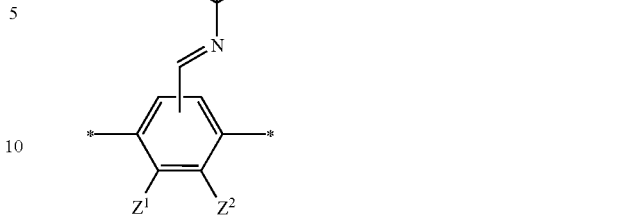
(Ar-18)

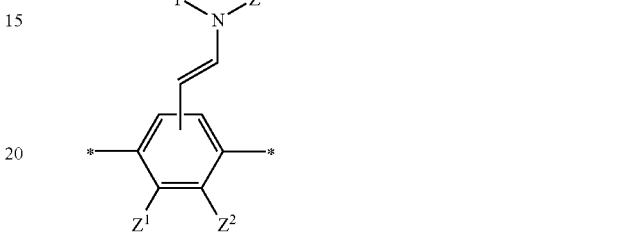
(Ar-19)

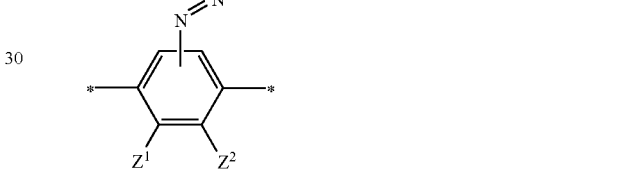
(Ar-20)

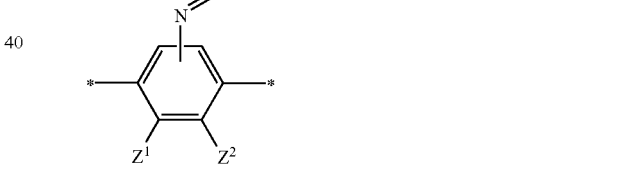
(Ar-21)

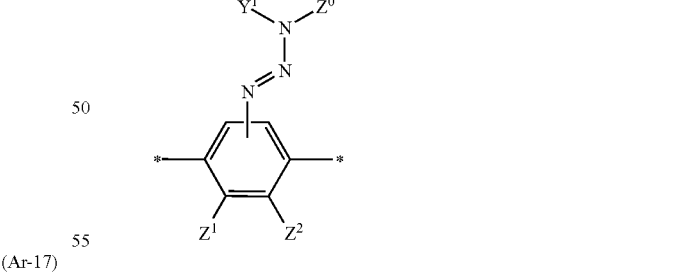
(Ar-22)

In the formulae (Ar-1) to (Ar-22), the mark (*) represents a connecting part, $Z^0$, $Z^1$, and $Z^2$ independently represent a hydrogen atom, a halogen atom, an alkyl group having 1 to 6 carbon atoms, a cyano group, a nitro group, an alkylsulfinyl group having 1 to 6 carbon atoms, an alkylsulfonyl group having 1 to 6 carbon atoms, a carboxyl group, a fluoroalkyl group having 1 to 6 carbon atoms, an alkoxy group having 1 to 6 carbon atoms, an alkylthio group having 1 to 6 carbon atoms, a N-alkylamino group having 1 to 6 carbon atoms, a N,N-dialkylamino group having 2 to 12 carbon atoms, a N-alkylsulfamoyl group having 1 to 6 carbon atoms, or a N,N-dialkylsulfamoyl group having 2 to 12 carbon atoms;

$Q^1$, $Q^2$, and $Q^3$ independently represent —$CR^{2'}R^{3'}$—, —S—, —$NR^{2'}$—, —CO—, or O—;

$R^{2'}$ and $R^{3'}$ independently represent a hydrogen atom or an alkyl group having 1 to 4 carbon atoms;

$Y^1$, $Y^2$, and $Y^3$ independently represent an aromatic hydrocarbon group or aromatic heterocyclic group which is optionally substituted;

$W^1$ and $W^2$ independently represent a hydrogen atom, a cyano group, a methyl group, or a halogen atom; and m denotes an integer from 0 to 6.

Examples of the halogen atom include a fluorine atom, chlorine atom, bromine atom, and iodine atom and a fluorine atom, chlorine atom, or bromine atom is preferable.

Examples of the alkyl group having 1 to 6 carbon atoms include a methyl group, ethyl group, propyl group, isopropyl group, butyl group, isobutyl group, sec-butyl group, tert-butyl group, pentyl group, and hexyl group. An alkyl group having 1 to 4 carbon atoms is preferable, an alkyl group having 1 to 2 carbon atoms is more preferable, and a methyl group is particularly preferable.

Examples of the alkylsulfinyl group having 1 to 6 carbon atoms include a methylsulfinyl group, ethylsulfinyl group, propylsulfinyl group, isopropylsulfinyl group, butylsulfinyl group, isobutylsulfinyl group, sec-butylsulfinyl group, tert-butylsulfinyl group, pentylsulfinyl group, and hexylsulfinyl group. An alkylsulfinyl group having 1 to 4 carbon atoms is preferable, an alkylsulfinyl group having 1 to 2 carbon atoms is more preferable, and a methylsulfinyl group is particularly preferable.

Examples of the alkylsulfonyl group having 1 to 6 carbon atoms include a methylsulfonyl group, ethylsulfonyl group, propylsulfonyl group, isopropylsulfonyl group, butylsulfonyl group, isobutylsulfonyl group, sec-butylsulfonyl group, tert-butylsulfonyl group, pentylsulfonyl group, and hexylsulfonyl group. An alkylsulfonyl group having 1 to 4 carbon atoms is preferable, an alkylsulfonyl group having 1 to 2 carbon atoms is more preferable, and a methylsulfonyl group is particularly preferable.

Examples of the fluoroalkyl group having 1 to 6 carbon atoms include a fluoromethyl group, trifluoromethyl group, fluoroethyl group, pentafluoroethyl group, heptafluoropropyl group, and nonafluorobutyl group. A fluoroalkyl group having 1 to 4 carbon atoms is preferable, a fluoroalkyl group having 1 to 2 carbon atoms is more preferable, and a trifluoromethyl group is particularly preferable.

Examples of the alkoxy group having 1 to 6 carbon atoms include a methoxy group, ethoxy group, propoxy group, isopropoxy group, butoxy group, isobutoxy group, sec-butoxy group, tert-butoxy group, pentyloxy group, and hexyloxy group. An alkoxy group having 1 to 4 carbon atoms is preferable, an alkoxy group having 1 to 2 carbon atoms is more preferable, and a methoxy group is particularly preferable.

Examples of the alkylthio group having 1 to 6 carbon atoms include a methylthio group, ethylthio group, propylthio group, isopropylthio group, butylthio group, isobutylthio group, sec-butylthio group, tert-butylthio group, pentylthio group, and hexylthio group. An alkylthio group having 1 to 4 carbon atoms is preferable, an alkylthio group having 1 to 2 carbon atoms is more preferable, and a methylthio group is particularly preferable.

Examples of the N-alkylamino group having 1 to 6 carbon atoms include an N-methylamino group, N-ethylamino group, N-propylamino group, N-isopropylamino group, N-butylamino group, N-isobutylamino group, N-sec-butylamino group, N-tert-butylamino group, N-pentylamino group, and N-hexylamino group. An N-alkylamino group having 1 to 4 carbon atoms is preferable, an N-alkylamino group having 1 to 2 carbon atoms is more preferable, and an N-methylamino group is particularly preferable.

Examples of the N,N-dialkylamino group having 2 to 12 carbon atoms include an N,N-dimethylamino group, N-methyl-N-ethylamino group, N,N-diethylamino group, N,N-dipropylamino group, N,N-diisopropylamino group, N,N-dibutylamino group, N,N-diisobutylamino group, N,N-dipentylamino group, and N,N-dihexylamino group. An N,N-dialkylamino group having 2 to 8 carbon atoms is preferable, an N,N-dialkylamino group having 2 to 4 carbon atoms is more preferable, and an N,N-dimethylamino group is particularly preferable.

Examples of the N-alkylsulfamoyl group having 1 to 6 carbon atoms include an N-methylsulfamoyl group, N-ethylsulfamoyl group, N-propylsulfamoyl group, N-isopropylsulfamoyl group, N-butylsulfamoyl group, N-isobutylsulfamoyl group, N-sec-butylsulfamoyl group, N-tert-butylsulfamoyl group, N-pentylsulfamoyl group, and N-hexylsulfamoyl group. An N-alkylsulfamoyl group having 1 to 4 carbon atoms is preferable, an N-alkylsulfamoyl group having 1 to 2 carbon atoms is more preferable, and an N-methylsulfamoyl group is particularly preferable.

Examples of the N,N-dialkylsulfamoyl group having 2 to 12 carbon atoms include an N,N-dimethylsulfamoyl group, N-methyl-N-ethylsulfamoyl group, N,N-diethylsulfamoyl group, N,N-dipropylsulfamoyl group, N,N-diisopropylsulfamoyl group, N,N-dibutylsulfamoyl group, N,N-diisobutylsulfamoyl group, N,N-dipentylsulfamoyl group, and N,N-dihexylsulfamoyl group. An N,N-dialkylsulfamoyl group having 2 to 8 carbon atoms is preferable, an N,N-dialkylsulfamoyl group having 2 to 4 carbon atoms is more preferable, and an N,N-dimethylsulfamoyl group is particularly preferable.

$Z^0$, $Z^1$, and $Z^2$ are independently preferably a hydrogen atom, halogen atom, methyl group, cyano group, nitro group, carboxyl group, methylsulfonyl group, trifluoromethyl group, methoxy group, methylthio group, N-methylamino group, N,N-dimethylamino group, N-methylsulfamoyl group, or N,N-dimethylsulfamoyl group.

Examples of the alkyl group having 1 to 4 carbon atoms in $R^{2'}$ and $R^{3'}$ include a methyl group, ethyl group, propyl group, isopropyl group, butyl group, isobutyl group, and tert-butyl group. An alkyl group having 1 to 2 carbon atoms is preferable and a methyl group is more preferable.

$Q^1$ and $Q^2$ are independently preferably —S—, —CO—, —NH—, or —N(CH$_3$)— and $Q^3$ is preferably —S— or —CO—.

Examples of the aromatic hydrocarbon group in $Y^1$, $Y^2$, and $Y^3$ include aromatic hydrocarbon groups having 6 to 20 carbon atoms such as a phenyl group, naphthyl group, anthryl group, phenanthryl group, and biphenyl group. A phenyl group and naphthyl group are preferable and a phenyl group is more preferable. Examples of the aromatic heterocyclic group include aromatic heterocyclic groups containing at least one of hetero atoms such as a nitrogen atom, oxygen atom, and sulfur atom and having 4 to 20 carbon atoms, such as a furyl group, pyrrolyl group, thienyl group, pyridinyl group, thiazolyl group, and benzothiazolyl group. The aromatic hydrocarbon group is preferably a furyl group, pyrrolyl group, thienyl group, pyridinyl group, and thiazolyl group.

Such an aromatic hydrocarbon group or aromatic heterocyclic group may have at least one substituent and examples of the substituent include a halogen atom, alkyl group having 1 to 6 carbon atoms, cyano group, nitro group, alkylsulfinyl group having 1 to 6 carbon atoms, alkylsulfonyl group having 1 to 6 carbon atoms, carboxyl group, fluoroalkyl group having 1 to 6 carbon atoms, alkoxy group having 1 to 6 carbon atoms, alkylthio group having 1 to 6 carbon atoms, N-alkylamino group having 1 to 6 carbon atoms, N,N-dialkylamino group having 2 to 12 carbon atoms, N-alkylsulfamoyl group having 1 to 6 carbon atoms, and N,N-dialkylsulfamoyl group having 2 to 12 carbon atoms. A halogen atom, alkyl group having 1 to 2 carbon atoms, cyano group, nitro group, alkylsulfonyl group having 1 to 2 carbon atoms, fluoroalkyl group having 1 to 2 carbon atoms, alkoxy group having 1 to 2 carbon atoms, alkylthio group having 1 to 2 carbon atoms, N-alkylamino group having 1 to 2 carbon atoms, N,N-dialkylamino group having 2 to 4 carbon atoms, and alkylsulfamoyl group having 1 to 2 carbon atoms are preferable.

Examples of the halogen atom, the alkyl group having 1 to 6 carbon atoms, cyano group, nitro group, alkylsulfinyl group having 1 to 6 carbon atoms, alkylsulfonyl group having 1 to 6 carbon atoms, carboxyl group, fluoroalkyl group having 1 to 6 carbon atoms, alkoxy group having 1 to 6 carbon atoms, alkylthio group having 1 to 6 carbon atoms, N-alkylamino group having 1 to 6 carbon atoms, N,N-dialkylamino group having 2 to 12 carbon atoms, N-alkylsulfamoyl group having 1 to 6 carbon atoms, and N,N-dialkylsulfamoyl group having 2 to 12 carbon atoms include the same ones as those mentioned above.

In the formula (Ar-14), $Y^1$ may be combined with a nitrogen atom connected thereto and $Z^0$ to form an aromatic heterocyclic group. Examples of the aromatic heterocyclic group include a pyrrole ring, imidazole ring, pyridine ring, pyrimidine ring, indole ring, quinoline ring, isoquinoline ring, purine ring, pyrrolidine, ring, and piperidine ring. This aromatic heterocyclic group may have a substituent. Also, $Y^1$ may be combined with a nitrogen atom connected thereto and $Z^0$ to form a polycyclic aromatic hydrocarbon group or polycyclic aromatic heterocyclic group which is optionally substituted as will be mentioned later.

$Y^1$, $Y^2$, and $Y^3$ may be independently a polycyclic aromatic hydrocarbon group or polycyclic aromatic heterocyclic group which is optionally substituted. The polycyclic aromatic hydrocarbon group means a group derived from a condensed polycyclic aromatic hydrocarbon group or aromatic ring family. The polycyclic aromatic heterocyclic group means a group derived from a condensed polycyclic aromatic heterocyclic group or aromatic ring family. For example, $Y^1$, $Y^2$ and $Y^3$ are each independently preferably any of the groups represented by formulae ($Y^1$-1) to ($Y^1$-7), and more preferably any of the groups represented by formulae ($Y^1$-1) to ($Y^1$-4).

[Chem. 24]

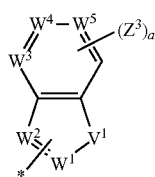

(Y¹-1)

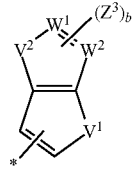

(Y¹-2)

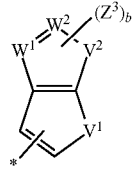

(Y¹-3)

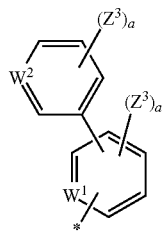

(Y¹-4)

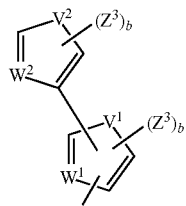

(Y¹-5)

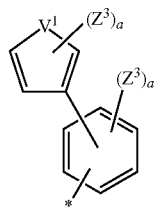

(Y1-6)

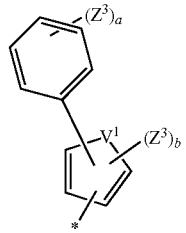

(Y1-7)

In formulae ($Y^1$-1) to ($Y^1$-7), * represents a linking unit, and $Z^3$ independently represents a halogen atom, an alkyl group having 1 to 6 carbon atoms, a cyano group, a nitro group, a nitroxide group, a sulfone group, a sulfoxide group, a carboxyl group, a fluoroalkyl group having 1 to 6 carbon atoms, an alkoxy group having 1 to 6 carbon atoms, a thioalkyl group having 1 to 6 carbon atoms, an N,N-dialkylamino group having 2 to 8 carbon atoms, or an N-alkylamino group having 1 to 4 carbon atoms.

$V^1$ and $V^2$ each independently represent —CO—, —S—, —NR$^4$—, —O—, —Se— or —SO$_2$—.

$W^1$ to $W^5$ each independently represent —C= or —N=, where at least one of $V^1$, $V^2$, and $W^1$ to $W^5$ represents a group containing S, N, O or Se.

$R^4$ represents a hydrogen atom or an alkyl group having 1 to 4 carbon atoms.

a independently represents an integer of 0 to 3.

b independently represents an integer of 0 to 2.

Any of the groups represented by formulae ($Y^1$-1) to ($Y^1$-7) is preferably any of the groups represented by formulae ($Y^2$-1) to ($Y^2$-16), and more preferably any of the groups represented by formulae ($Y^3$-1) to ($Y^3$-6), and especially preferably the group represented by formula ($Y^3$-1) or formula ($Y^3$-3).

In formulae ($Y^2$-1) to ($Y^2$-16), $Z^3$, a, b, $V^1$, $V^2$ and $W^1$ to $W^5$ are the same as defined above.

[Chem. 25]

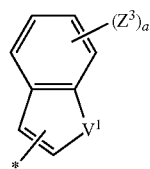
(Y²-1)

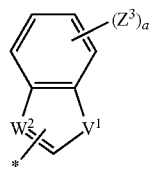
(Y²-2)

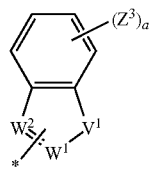
(Y²-3)

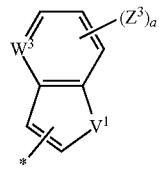
(Y²-4)

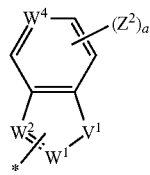
(Y²-5)

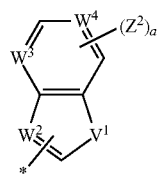
(Y²-6)

-continued

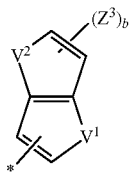
(Y²-7)

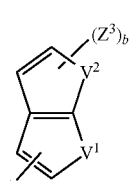
(Y²-8)

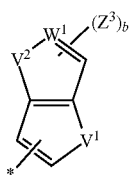
(Y²-9)

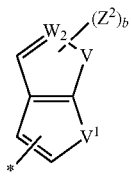
(Y²-10)

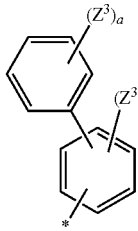
(Y²-11)

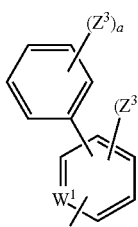
(Y²-12)

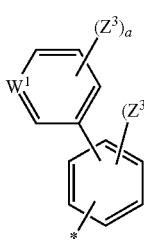
(Y²-13)

-continued (Y²-14) 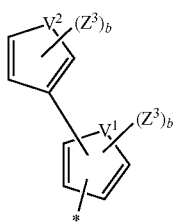

(Y²-15) 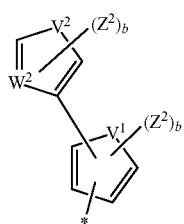

(Y²-16) 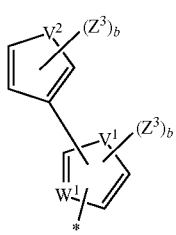

[Chem. 26]

(Y³-1) 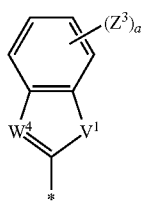

(Y³-2) 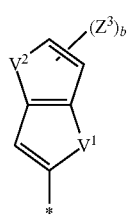

(Y³-3) 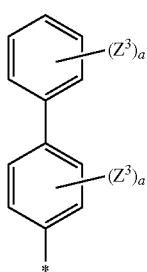

-continued (Y³-4) 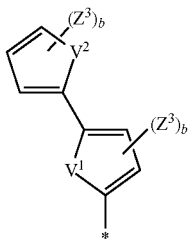

(Y³-5) 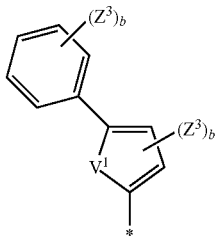

(Y³-6) 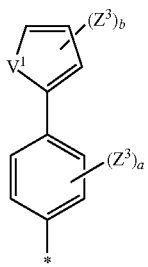

In above formulae (Y³-1) to (Y³-6), Z, a, b, V¹, V² and W¹ are the same as defined above.

Examples of Z³ include a halogen atom, an alkyl group having 1 to 6 carbon atoms, a cyano group, a nitro group, an alkylsulfinyl group having 1 to 6 carbon atoms, an alkylsulfonyl group having 1 to 6 carbon atoms, a carboxyl group, a fluoroalkyl group having 1 to 6 carbon atoms, an alkoxy group having 1 to 6 carbon atoms, an alkylthio group having 1 to 6 carbon atoms, an N-alkylamino group having 1 to 6 carbon atoms, an N,N-dialkylamino group having 2 to 12 carbon atoms, an N-alkylsulfamoyl group having 1 to 6 carbon atoms, and an N,N-dialkylsulfamoyl group having 2 to 12 carbon atoms. Of these, a halogen atom, a methyl group, an ethyl group, an isopropyl group, a sec-butyl group, a cyano group, a nitro group, a sulfone group, a nitroxide group, a carboxyl group, a trifluoromethyl group, a methoxy group, a thiomethyl group, an N,N-dimethylamino group, and an N-methylamino group are preferable; a halogen atom, a methyl group, an ethyl group, an isopropyl group, a sec-butyl group, a cyano group, a nitro group, a trifluoromethyl group are more preferable; and a methyl group, an ethyl group, an isopropyl group, a sec-butyl group, a pentyl group, and a hexyl group are especially preferable.

Examples of the halogen atom, alkyl group having 1 to 6 carbon atoms, alkylsulfinyl group having 1 to 6 carbon atoms, alkylsulfonyl group having 1 to 6 carbon atoms, fluoroalkyl group having 1 to 6 carbon atoms, alkoxy group having 1 to 6 carbon atoms, alkylthio group having 1 to 6 carbon atoms, N-alkylamino group having 1 to 6 carbon atoms, N,N-dialkylamino group having 2 to 12 carbon atoms, N-alkylsulfamoyl group having 1 to 6 carbon atoms, and N,N-dialkylsulfamoyl group having 2 to 12 carbon atoms include the same groups as those described above.

It is preferable that $V^1$ and $V^2$ are each independently —S—, —NR$^4$— or —O—.

It is preferable that $W^1$ to $W^5$ are each independently —C= or —N=.

It is preferable that at least one of $V^1$, $V^2$, and $W^1$ to $W^5$ represents a group containing S, N or O.

It is preferable that a is 0 or 1. It is preferable that b is 0.

In the formula (B-1), G is a divalent alicyclic hydrocarbon group and the number of carbons of G is for example 3 to 30, preferably 3 to 20, more preferably 4 to 15, and even more preferably 5 to 10. Examples of the divalent alicyclic hydrocarbon group include a cycloalkanediyl group. A hydrogen atom contained in the alicyclic hydrocarbon group is optionally substituted with a halogen atom, alkyl group having 1 to 4 carbon atoms, fluoroalkyl group having 1 to 4 carbon atoms, alkoxy group having 1 to 4 carbon atoms, cyano group, or nitro group and —CH$_2$— (methylene group) contained in the alicyclic hydrocarbon group is optionally substituted with —O—, —S—, or NH—.

Examples of the alkyl group having 1 to 4 carbon atoms include a methyl group, an ethyl group, propyl group, isopropyl group, butyl group, isobutyl group, sec-butyl group, and tert-butyl group. An alkyl group having 1 to 3 carbon atoms is preferable, an alkyl group having 1 to 2 carbon atoms is more preferable, and a methyl group is particularly preferable.

Examples of the fluoroalkyl group having 1 to 4 carbon atoms include a fluoromethyl group, trifluoromethyl group, fluoroethyl group, pentafluoroethyl group, heptafluoropropyl group, and nonafluorobutyl group. A fluoroalkyl group having 1 to 3 carbon atoms is preferable, a fluoroalkyl group having 1 to 2 carbon atoms is more preferable, and a trifluoromethyl group is particularly preferable.

Examples of the alkoxy group having 1 to 4 carbon atoms include a methoxy group, ethoxy group, propoxy group, isopropoxy group, butoxy group, isobutoxy group, sec-butoxy group, and tert-butoxy group. An alkoxy group having 1 to 3 carbon atoms is preferable, an alkoxy group having 1 to 2 carbon atoms is more preferable, and a methoxy group is particularly preferable.

Examples of the divalent alicyclic hydrocarbon group include groups represented by the formulae (g-1) to (g-4). Examples of the divalent alicyclic hydrocarbon group obtained when —CH$_2$— contained in the alicyclic hydrocarbon group is replaced with —O—, —S—, or N(R$^{5'}$)— include groups represented by the formulae (g-5) to (g-8). R$^{5'}$ represents a hydrogen atom or an alkyl group having 1 to 4 carbon atoms. Examples of the divalent alicyclic hydrocarbon group obtained when —CH(-)— contained in the alicyclic hydrocarbon group is replaced with —N(-)— include groups represented by the formulae (g-9) to (g-10). The divalent alicyclic hydrocarbon group is preferably a five-membered or six-membered alicyclic hydrocarbon group.

[Chem. 27]

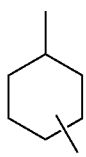

(g-1)

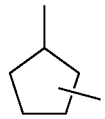

(g-2)

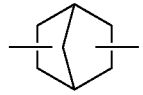

(g-3)

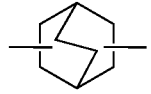

(g-4)

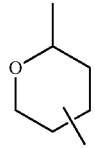

(g-5)

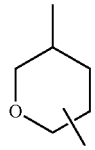

(g-6)

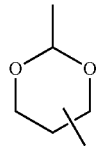

(g-7)

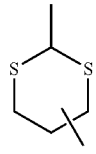

(g-8)

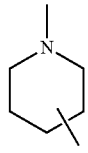

(g-9)

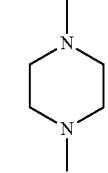

(g-10)

The divalent alicyclic hydrocarbon group is preferably a group represented by the formula (g-1), more preferably a 1,4-cyclohexanediyl group, and particularly preferably a trans-1,4-cyclohexanediyl group.

In the formula (B-1), B is a single bond or divalent connecting group. Examples of the divalent connecting group include —O—, —S—, —CO—O—, —O—CO—, —C(=S)—O—, —O—C(=S)—, —C$^6{}'$R$^{7'}$—, —CR$^6{}'$R$^{7'}$—CR$^8{}'$R$^{9'}$—, —O—CR$^6{}'$R$^{7'}$—, —CR$^6{}'$R$^{7'}$—O—, —CR$^6{}'$R$^{7'}$—O—CR$^8{}'$R$^{9'}$—, —CR$^6{}'$R$^{7'}$—O—CO—, —O—CO—CR$^6{}'$R$^{7'}$—, —CR$^6{}'$R$^{7'}$—O—CO—CR$^8{}'$R$^{9'}$—, —CR$^{6'}$R$^{7'}$—CO—O—CR$^{8'}$R$^{9'}$—, —NR$^{10'}$—CR$^{6'}$R$^{7'}$—, —CR$^{6'}$R$^{7'}$—NR$^{10'}$—, —CO—NR$^{10'}$—, —NR$^{10'}$—CO—, —O—, —S—, —NR$^{10'}$—, and —CR$^{6'}$=CR$^{7'}$—. R$^{6'}$, R$^{7'}$, R$^{8'}$, and R$^{9'}$ independently represent a hydrogen atom, a fluorine atom, or an alkyl group having 1 to 4 carbon atoms. R$^{10'}$ represents a hydrogen atom or an alkyl group having 1 to 4 carbon atoms.

B is preferably —O—, —S—, —O—CO—, —O—C(=S)—, —O—CR$^{6'}$R$^{7'}$—, —NR$^{10'}$—CR$^{6'}$R$^{7'}$—, or NR$^{10'}$—CO—. It is more preferable that D$^1$ and D$^2$ be independently —O—, —S—, —O—CO—, —O—C(=S)—, or NR$^{10}$—CO—. R$^{6'}$, R$^{7'}$, R$^{8'}$, and R$^{9'}$ are independently preferably a hydrogen atom or alkyl group having 1 to 4 carbon atoms and more preferably a hydrogen atom, methyl group, or ethyl group. R$^{10'}$ is preferably a hydrogen atom, methyl group, or ethyl group.

A in the formula (B-1) represents a divalent alicyclic hydrocarbon group having 3 to 20 carbon atoms or a divalent aromatic hydrocarbon group having 6 to 20 carbon atoms, preferably a divalent alicyclic hydrocarbon group having 4 to 15 carbon atoms or a divalent aromatic hydrocarbon group having 6 to 15 carbon atoms, more preferably a divalent alicyclic hydrocarbon group having 5 to 12 carbon atoms or a divalent aromatic hydrocarbon group having 6 to 12 carbon atoms, and even more preferably a divalent alicyclic hydrocarbon group having 6 to 10 carbon atoms or a divalent aromatic hydrocarbon group having 6 to 10 carbon atoms. A is preferably a five-membered or six-membered alicyclic hydrocarbon group.

A hydrogen atom contained in the alicyclic hydrocarbon group and aromatic hydrocarbon group is optionally substituted with a halogen atom such as a fluorine atom, chlorine atom, bromine atom, and iodine atom; alkyl group having 1 to 4 carbon atoms such as a methyl group, ethyl group, isopropyl group, and tert-butyl group; fluoroalkyl group having 1 to 4 carbon atoms such as a trifluoromethyl group; cyano group; nitro group. —CH$_2$— contained in the alicyclic hydrocarbon group is optionally substituted with —O—, —S—, or NR$^{11'}$— and —CH(-)— contained in the alicyclic hydrocarbon group is optionally substituted with —N(-)—, wherein R$^{11'}$ represents a hydrogen atom or an alkyl group having 1 to 4 carbon atoms.

Examples of the divalent alicyclic hydrocarbon group include groups represented by the above formulae (g-1) to (g-10).

The divalent alicyclic hydrocarbon group is preferably a group represented by the above formula (g-1), more preferably a 1,4-cyclohexanediyl group, and particularly preferably a trans-1,4-cyclohexanediyl group.

Examples of the divalent aromatic hydrocarbon group include groups represented by the formulae (a-1) to (a-8).

[Chem. 28]

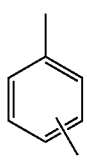
(a-1)

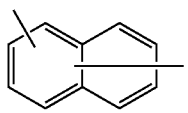
(a-2)

-continued

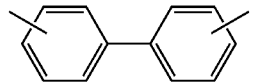
(a-3)

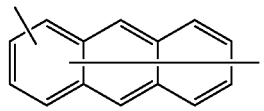
(a-4)

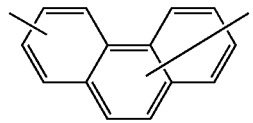
(a-5)

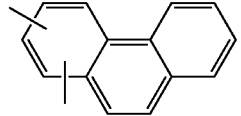
(a-6)

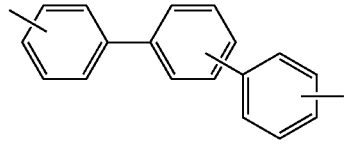
(a-7)

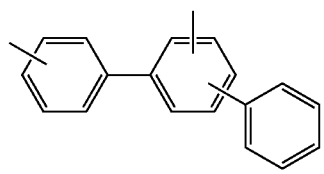
(a-8)

The divalent aromatic hydrocarbon group is preferably a 1,4-phenylene group.

In the formula (B-1), k denotes an integer from 0 to 3, is preferably 1 or 2, more preferably 1. When k is an integer of 2 or more, a plurality of As and Bs may be respectively the same or different. The plurality of As and Bs are respectively preferably the same from the viewpoint of industrially easily producing a polymerizable liquid crystal compound represented by the formula (B-1).

In the formula (B-1), E represents an alkanediyl group having 1 to 17, preferably 2 to 15, more preferably 3 to 12, and even more preferably 4 to 10 carbon atoms. A hydrogen atom contained in the alkanediyl group is optionally substituted with a halogen atom and —CH$_2$— contained in the alkanediyl group is optionally substituted with —O— or CO—.

Examples of the polymerizable liquid crystal compound represented by the formula (B-1) include the following compounds. These polymerizable liquid crystal compounds may be used either independently or in combinations of two or more.

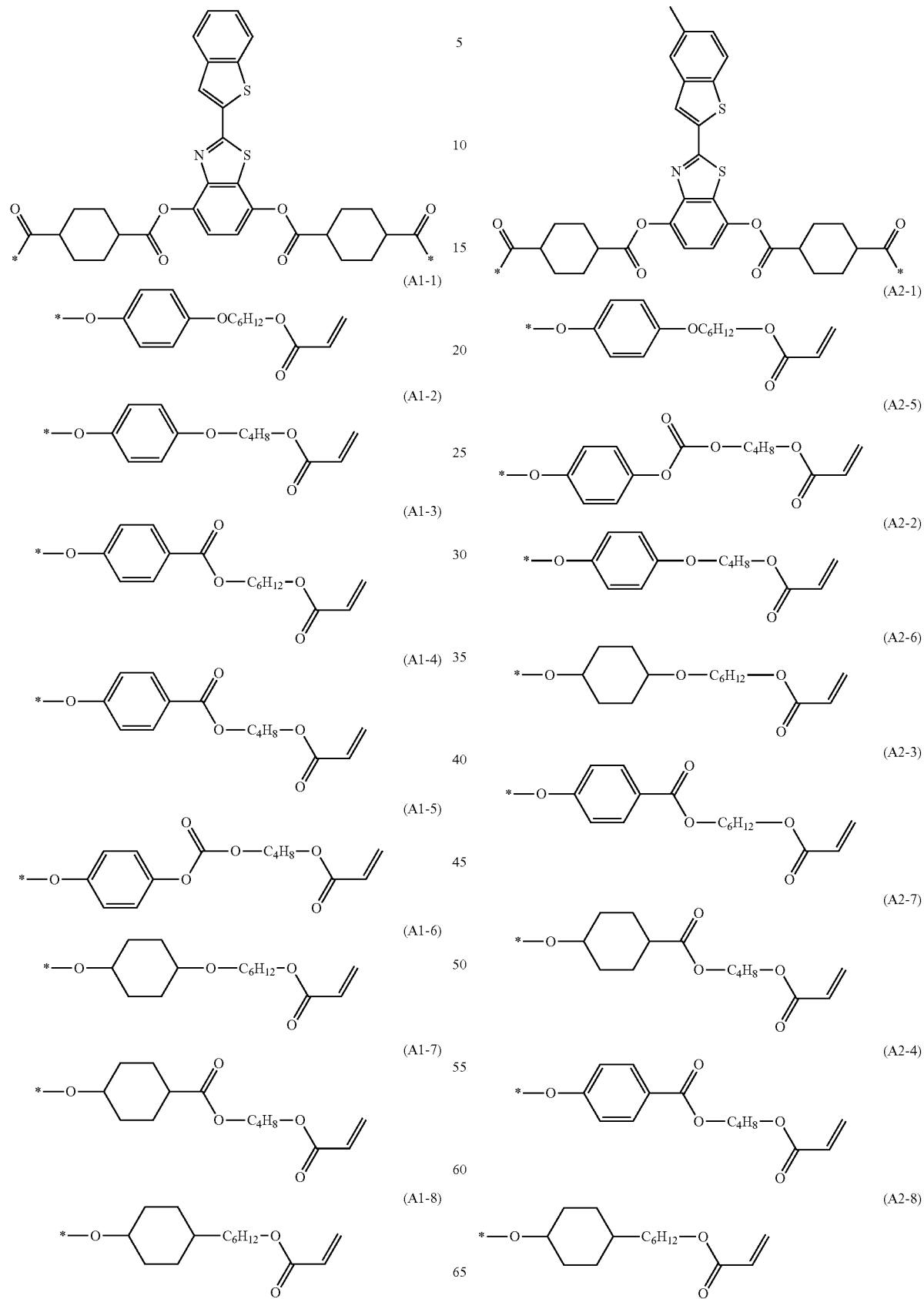

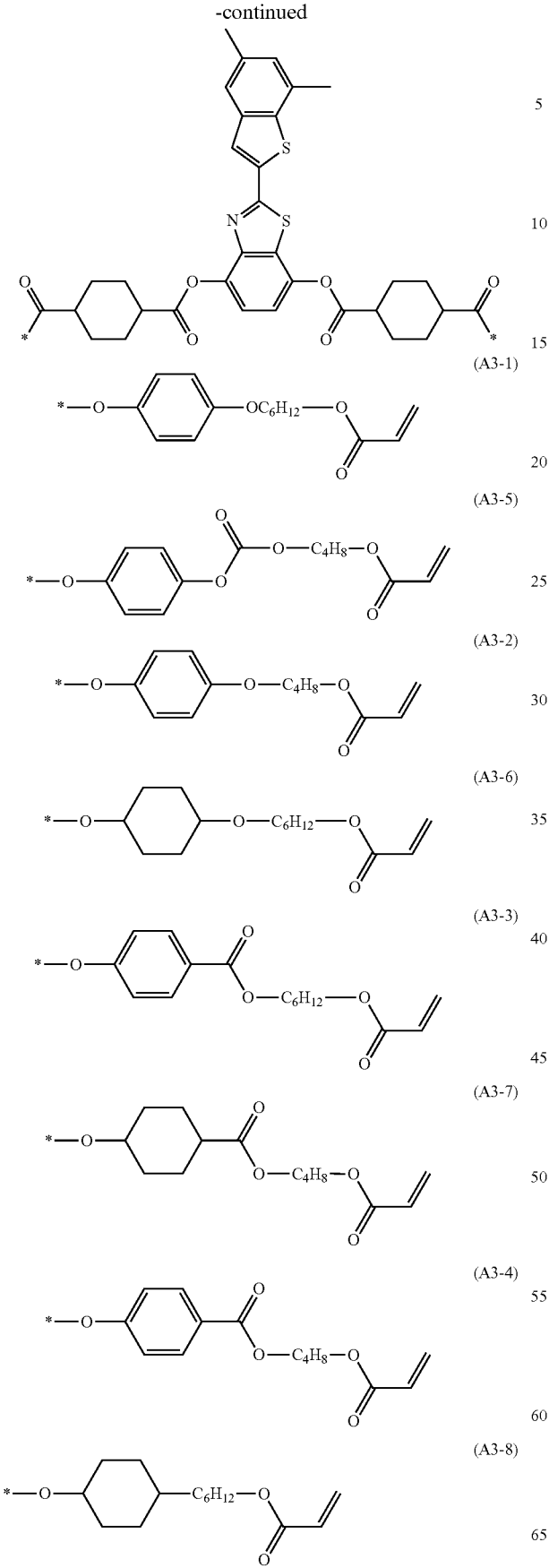
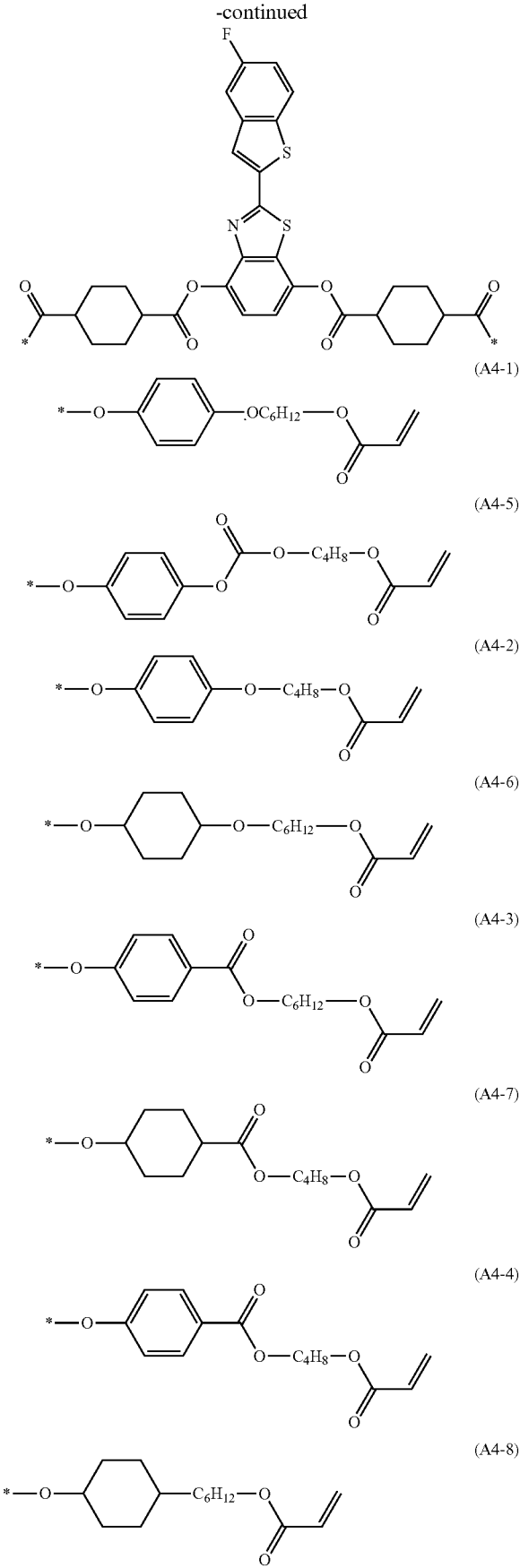

-continued
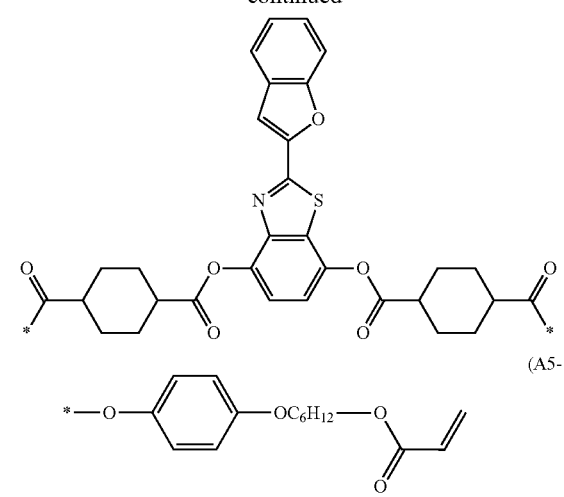
(A5-1)
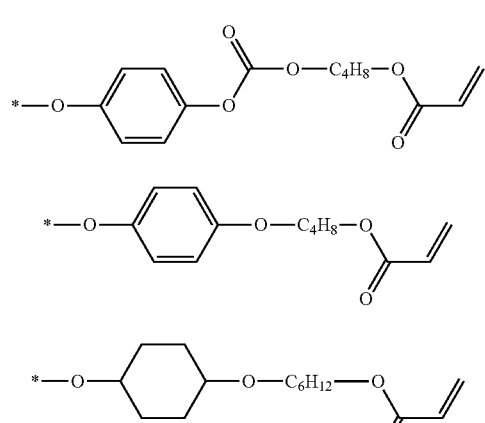
(A5-2)
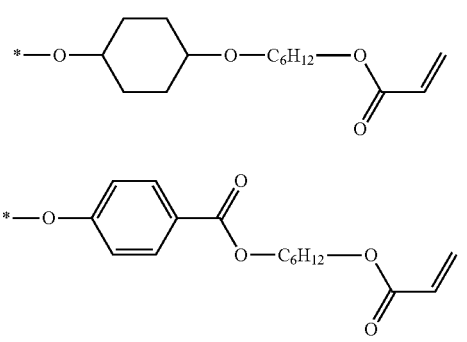
(A5-3)
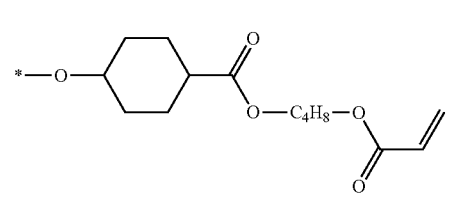
(A5-4)
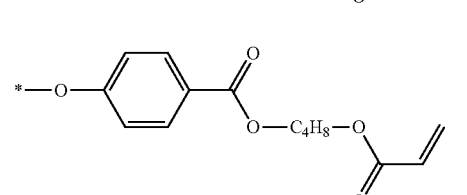
(A5-8)
[Chem. 31]
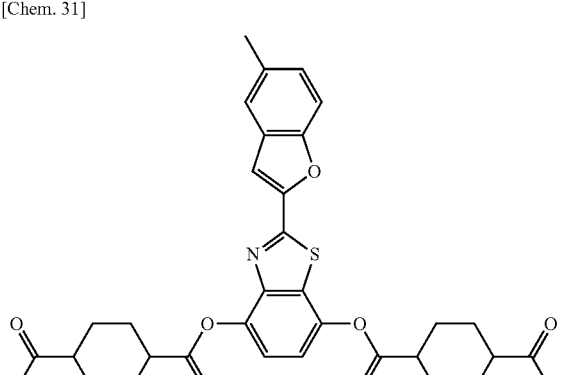
(A6-1)
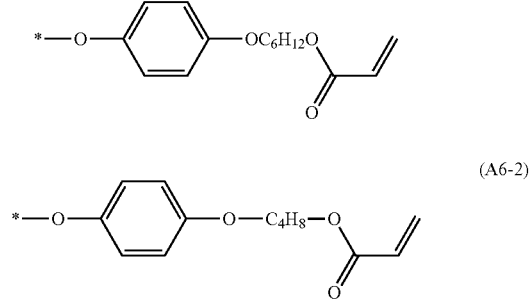
(A6-2)
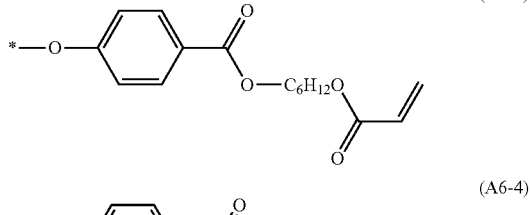
(A6-3)
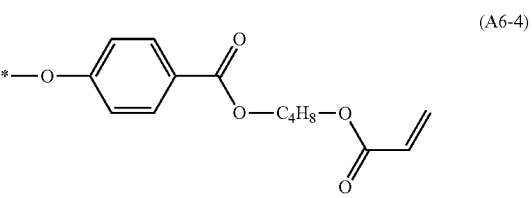
(A6-4)
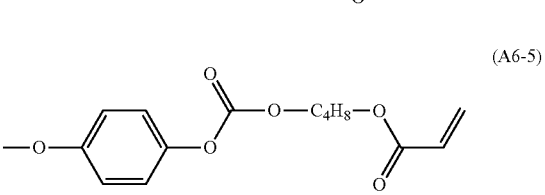
(A6-5)
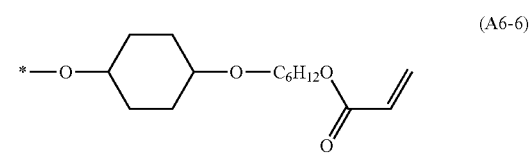
(A6-6)
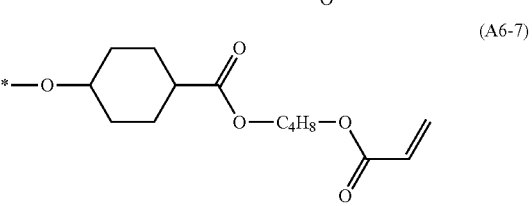
(A6-7)

(A6-8)
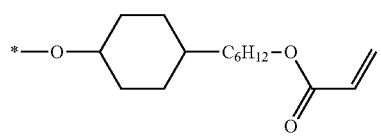
[Chem. 32]
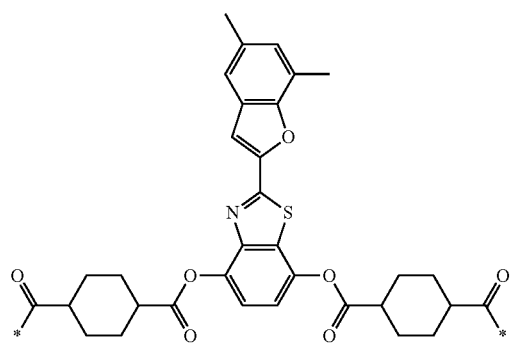
(A7-1)
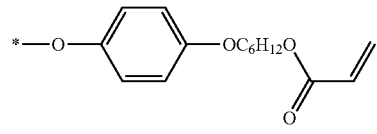
(A7-2)
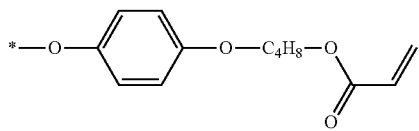
(A7-3)
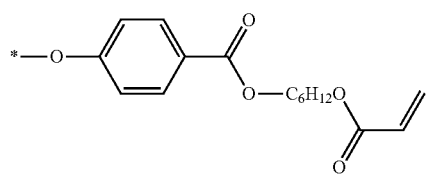
(A7-4)
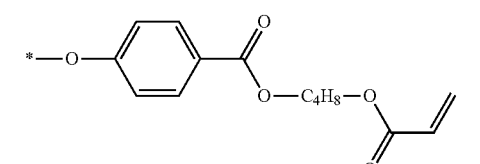
(A7-5)
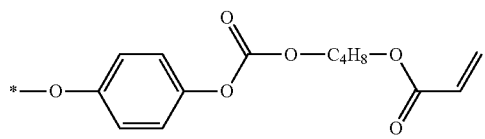
(A7-6)
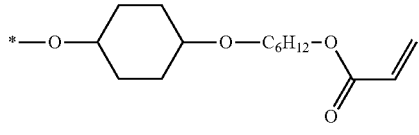
(A7-7)
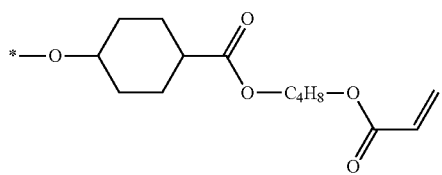
(A7-8)
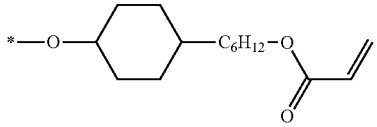
[Chem. 33]
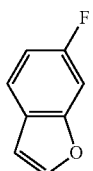
(A8-1)
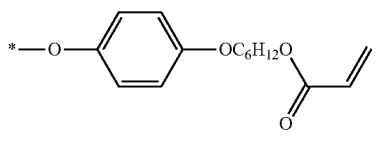
(A8-2)
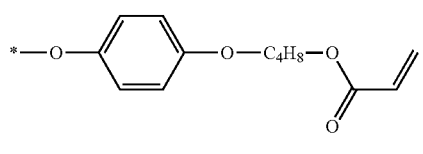
(A8-3)
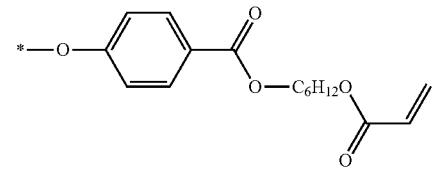
(A8-4)
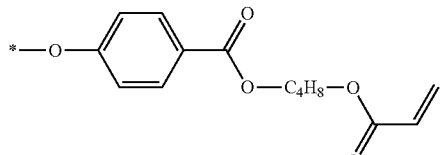
(A8-5)
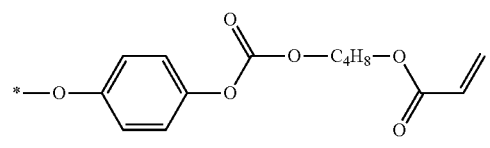

-continued
(A8-6)
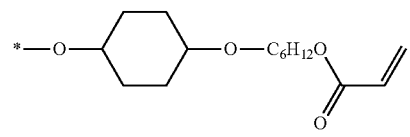
(A8-7)
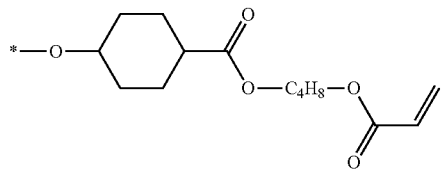
(A8-8)
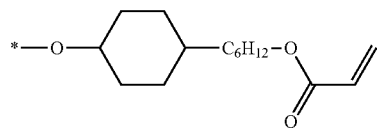
[Chem. 34]
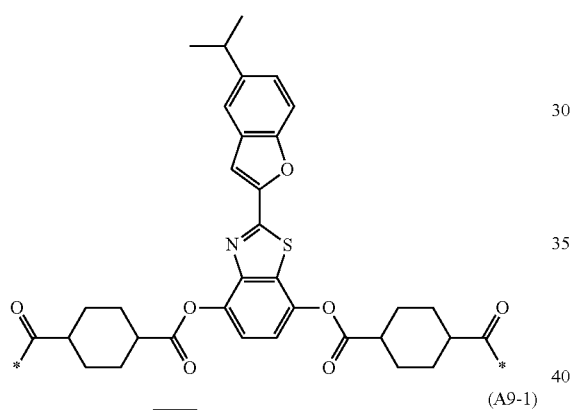
(A9-1)
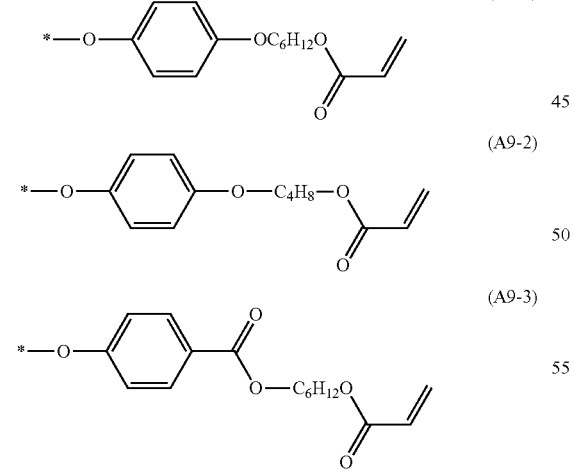
-continued
(A9-5)
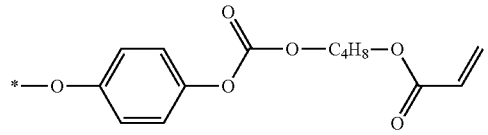
(A9-6)
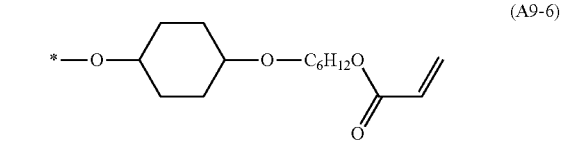
(A9-7)
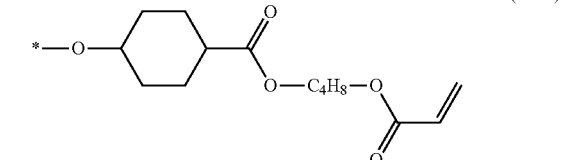
(A9-8)
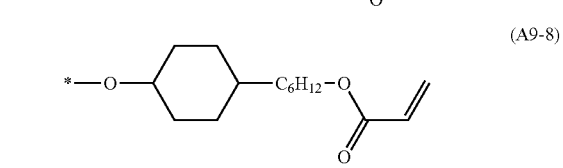
[Chem. 35]
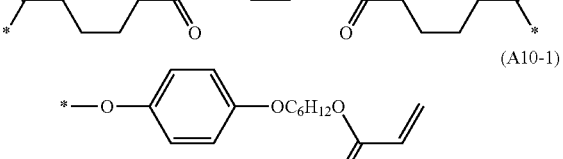
(A10-1)
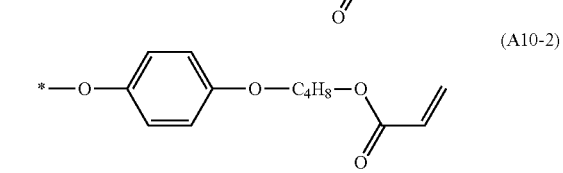
(A10-2)
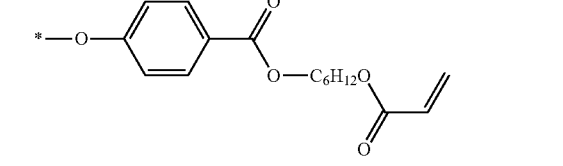
(A10-3)

(A10-4)
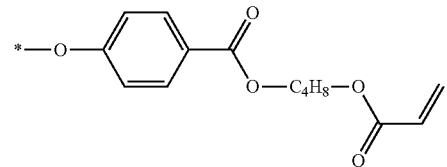
(A10-5)
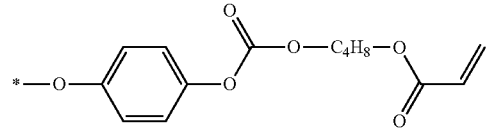
(A10-6)
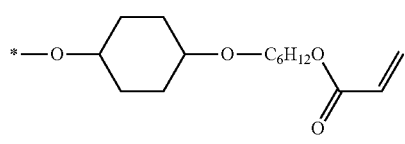
(A10-7)
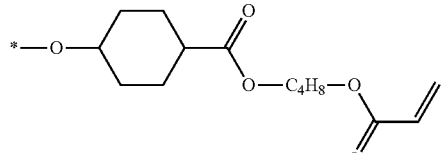
(A10-8)
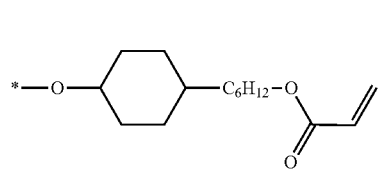
[Chem. 36]
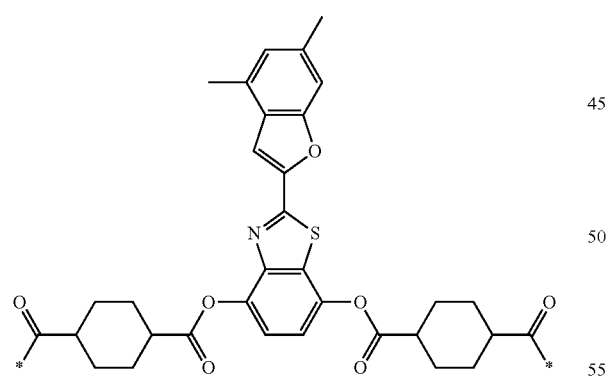
(A11-1)
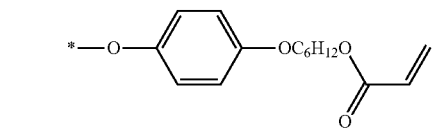
(A11-2)
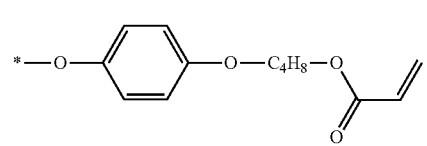
(A11-3)
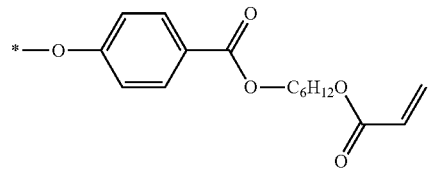
(A11-4)
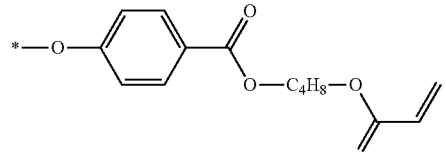
(A11-5)
(A11-6)
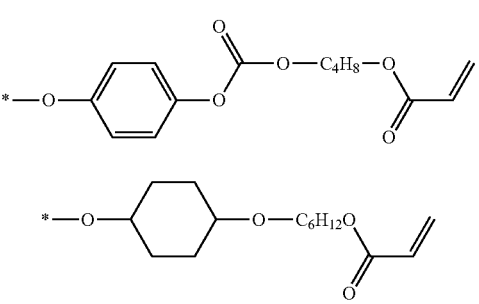
(A11-7)
(A11-8)
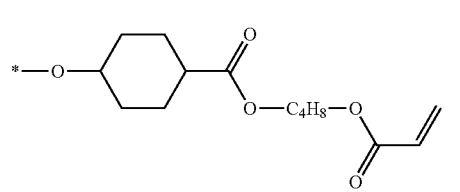
[Chem. 37]
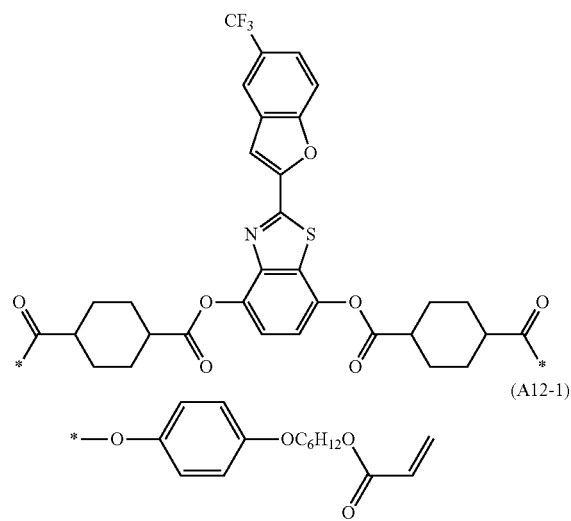
(A12-1)
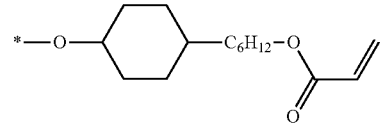

(A12-2) 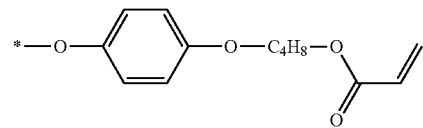
(A12-3) 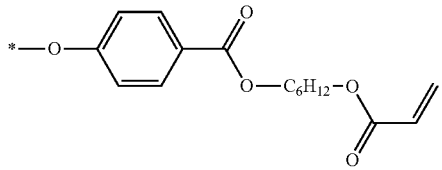
(A12-4) 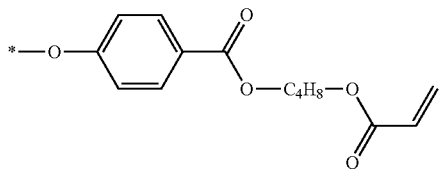
(A12-5) 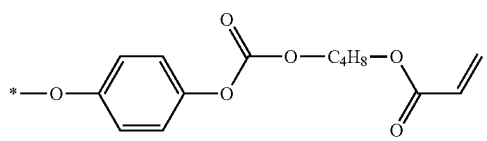
(A12-6) 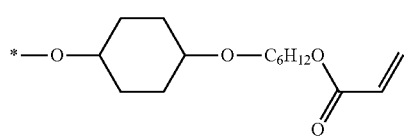
(A12-7) 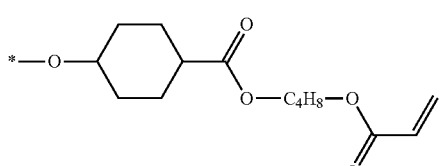
(A12-8) 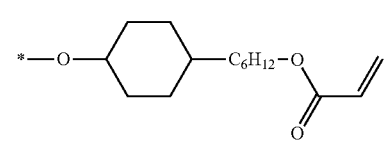
[Chem. 38]
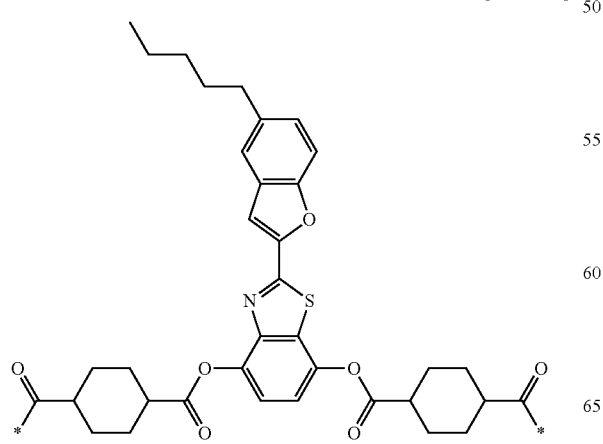
(A13-1) 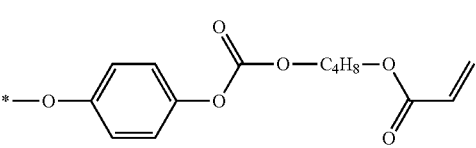
(A13-2) 
(A13-3) 
(A13-4) 
(A13-5) 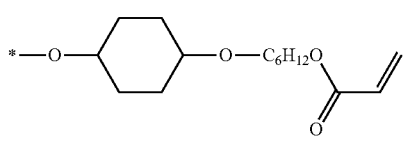
(A13-6) 
(A13-7) 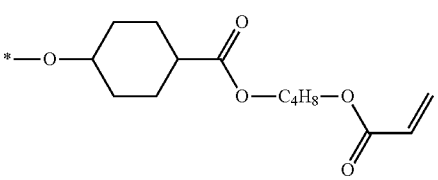

(A13-8)
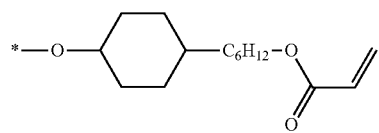
[Chem. 39]
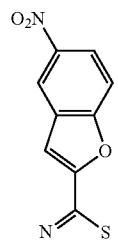
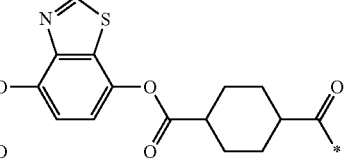
(A14-1)
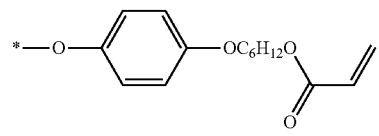
(A14-2)
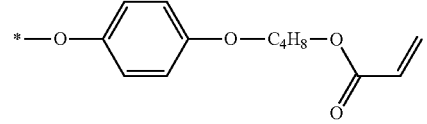
(A14-3)
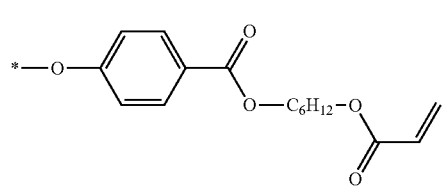
(A14-4)
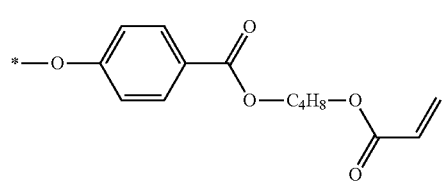
(A14-5)
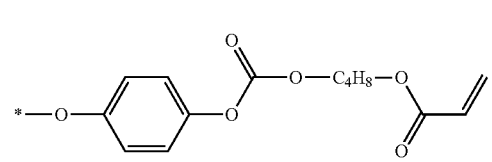
(A14-6)
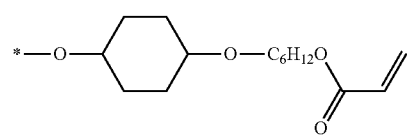
(A14-7)
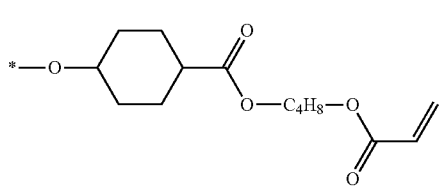
(A14-8)
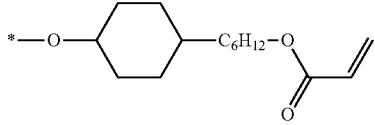
[Chem. 40]
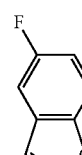
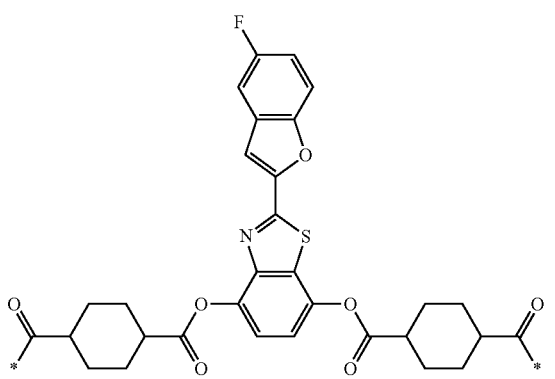
(A15-1)
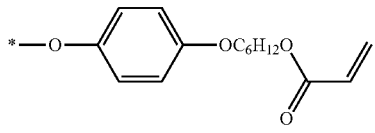
(A15-2)
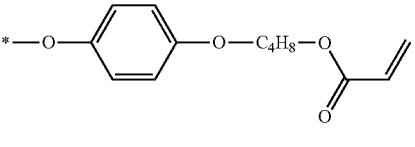
(A15-3)
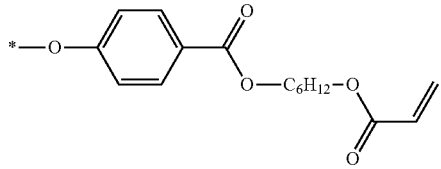
(A15-4)
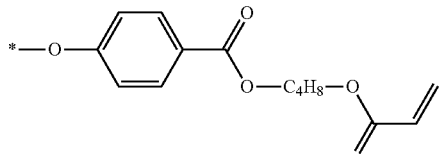
(A15-5)
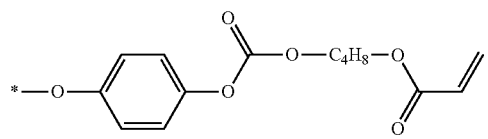

(A15-6)
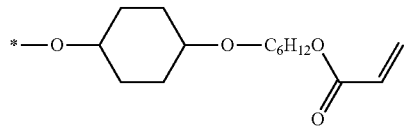
(A15-7)
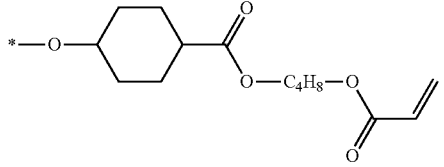
(A15-8)
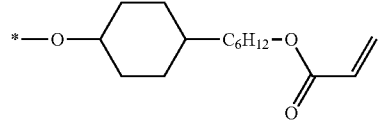
[Chem. 41]
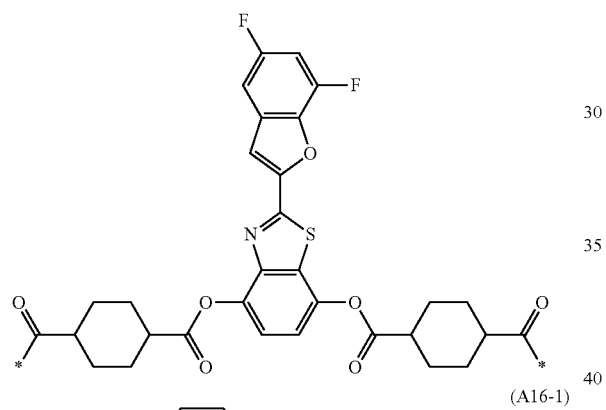
(A16-1)
(A16-2)
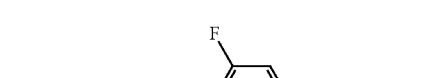
(A16-3)
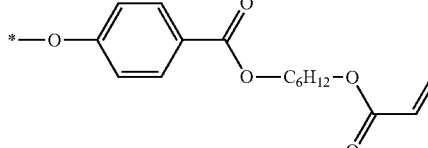
(A16-4)
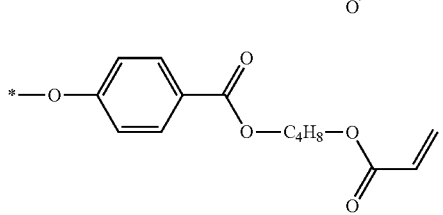
(A16-5)
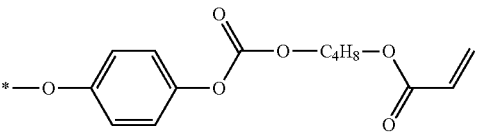
(A16-6)
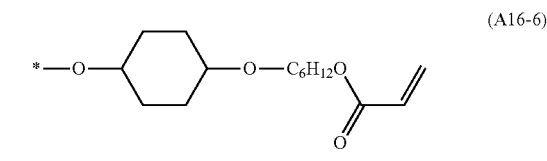
(A16-7)
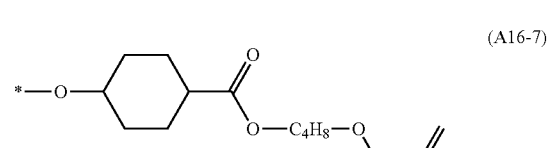
(A16-8)
[Chem. 42]
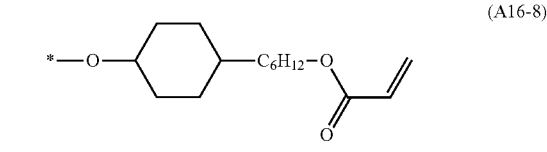
(A17-1)
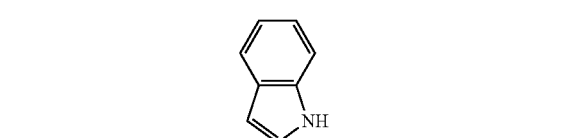
(A17-2)
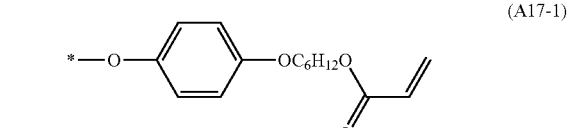
(A17-3)
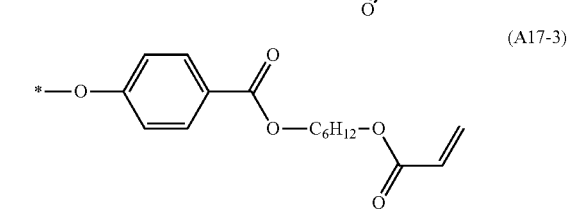

(A17-4)
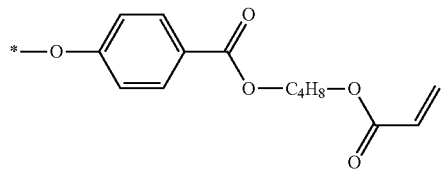
(A17-5)
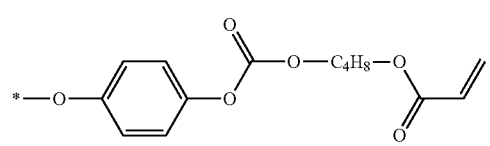
(A17-6)
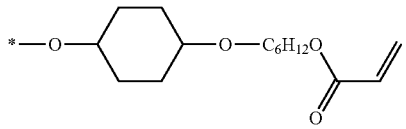
(A17-7)
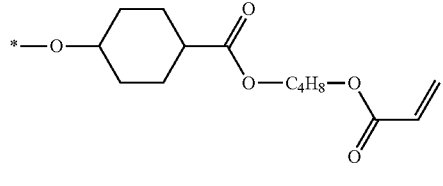
(A17-8)
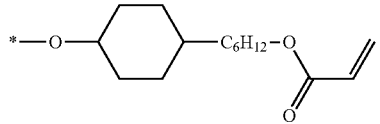
[Chem. 43]
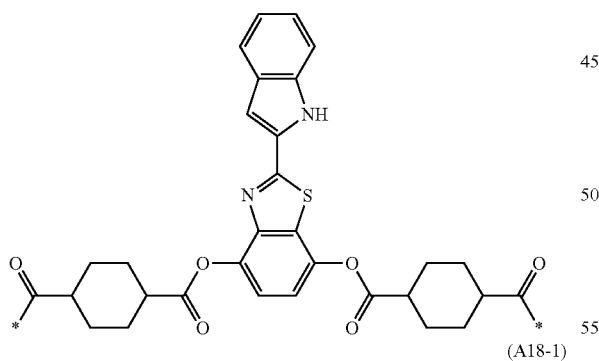
(A18-1)
(A18-2)
(A18-3)
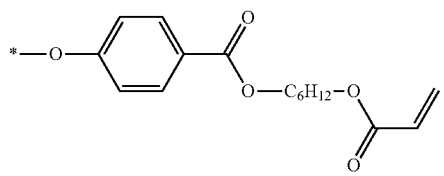
(A18-4)
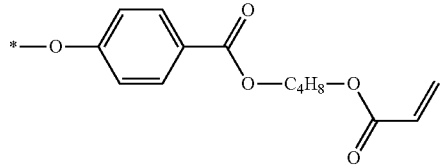
(A18-5)
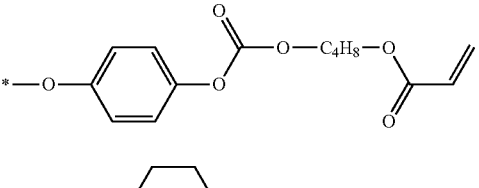
(A18-6)
(A18-7)
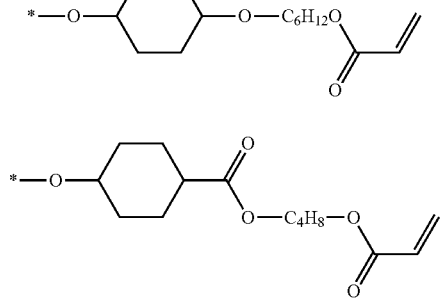
(A18-8)
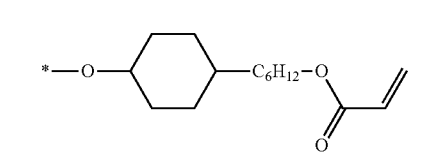
[Chem. 44]
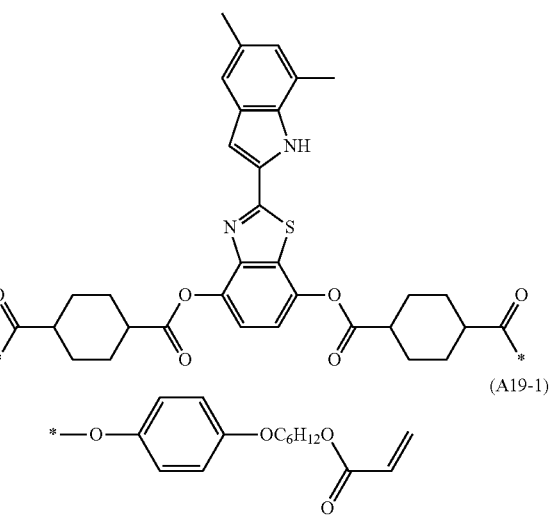
(A19-1)

(A19-2)
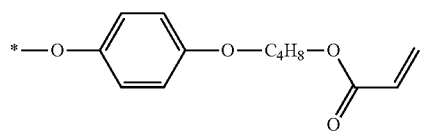
(A19-3)
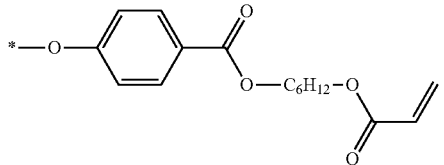
(A19-4)
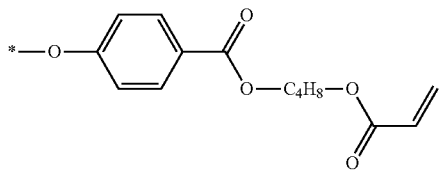
(A19-5)
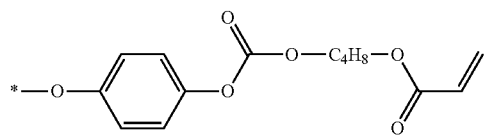
(A19-6)
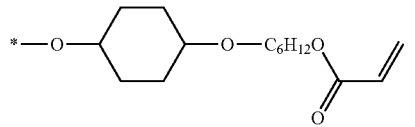
(A19-7)
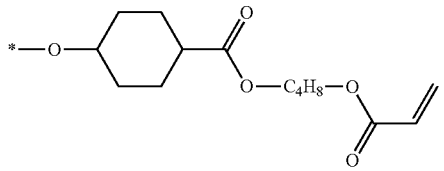
(A19-8)
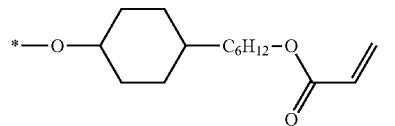
[Chem. 45]
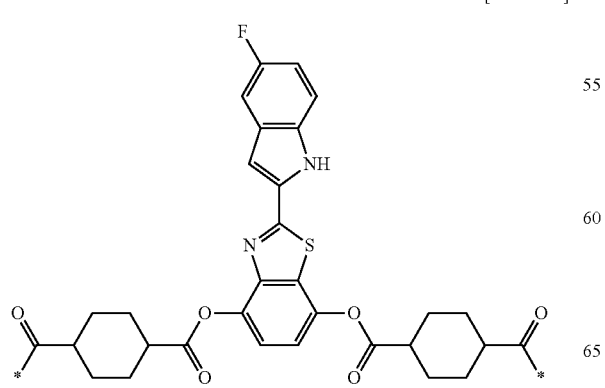
(A20-1)
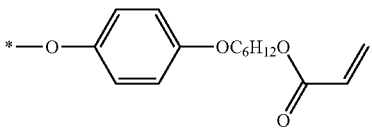
(A20-2)
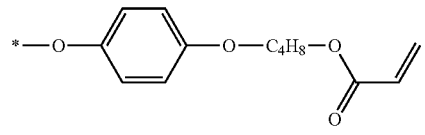
(A20-3)
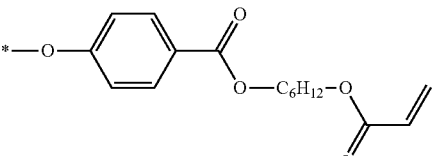
(A20-4)
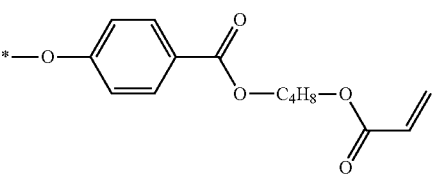
(A20-5)
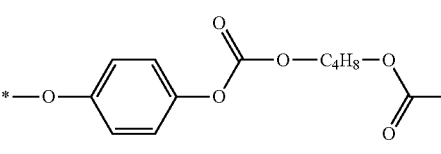
(A20-6)
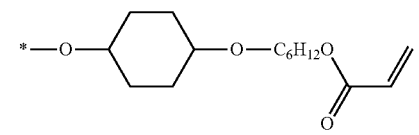
(A20-7)
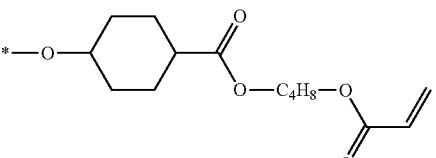
(A20-8)
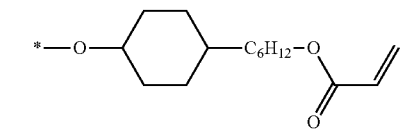

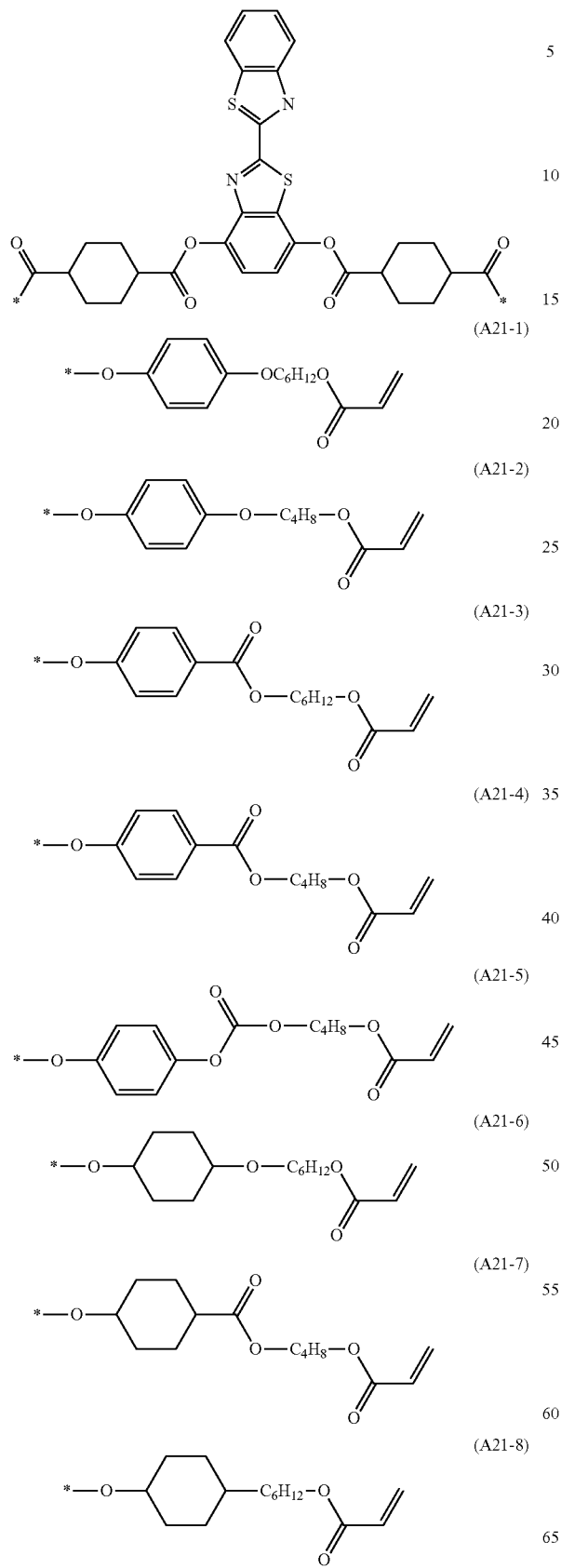
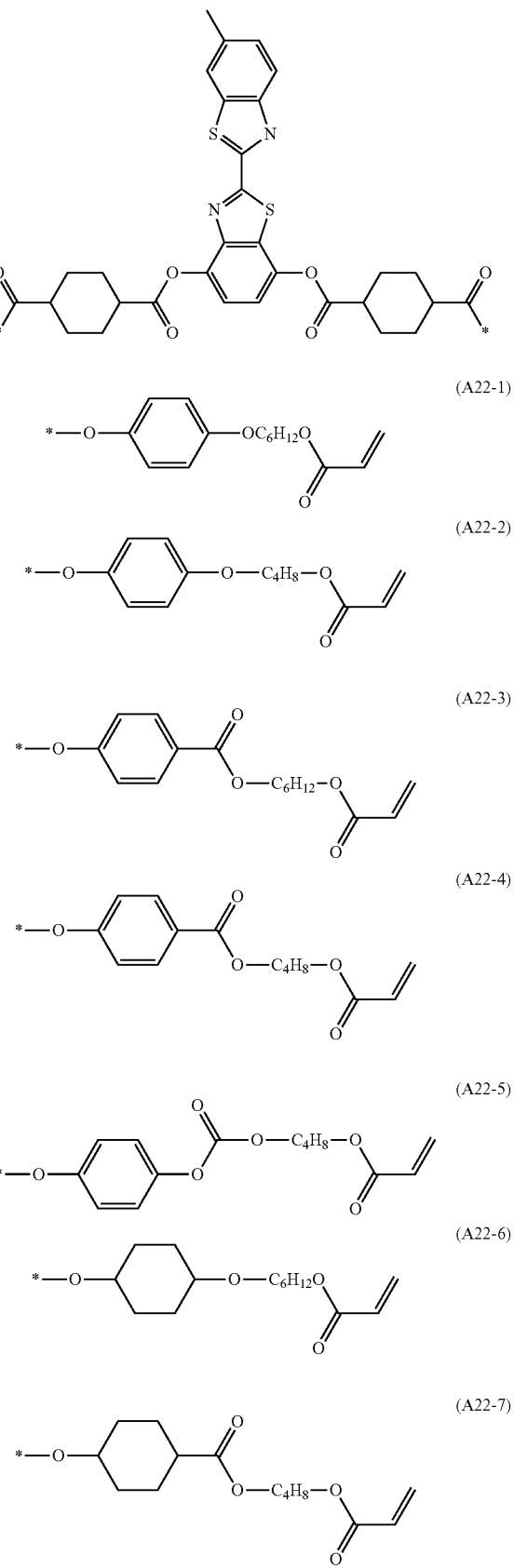

-continued
(A22-8)
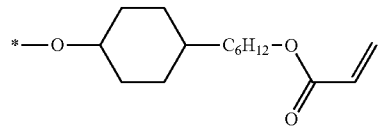
[Chem. 48]
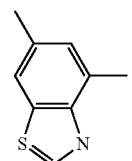
(A23-1)
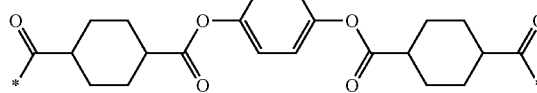
(A23-2)
(A23-3)
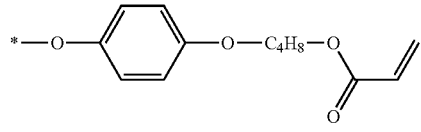
(A23-4)
(A23-5)
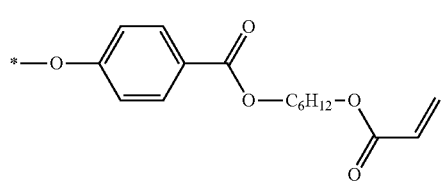
(A23-6)
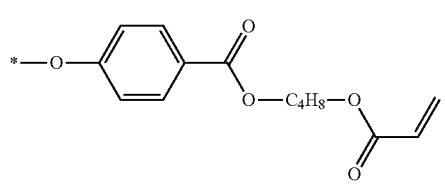
-continued
(A23-7)
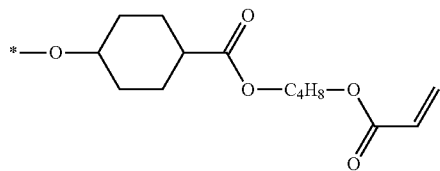
(A23-8)
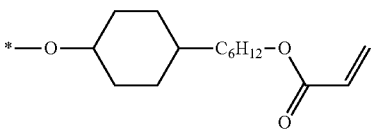
[Chem. 49]
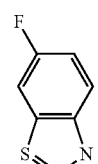
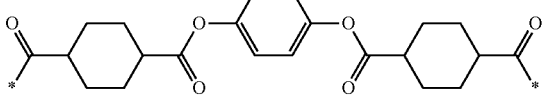
(A24-1)
(A24-2)
(A24-3)
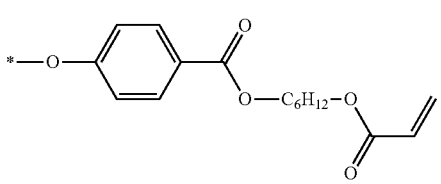
(A24-4)
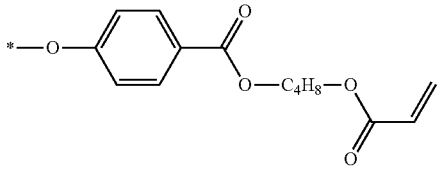
(A24-5)
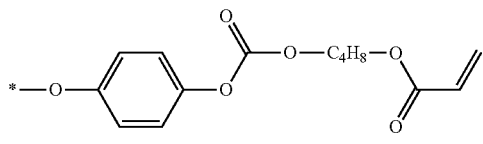

-continued
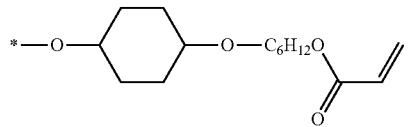
(A24-6)
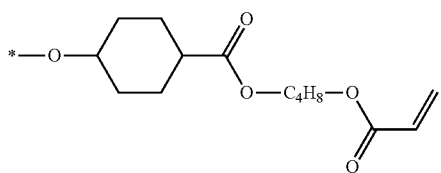
(A24-7)
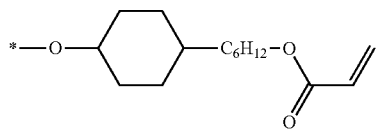
(A24-8)
[Chem. 50]
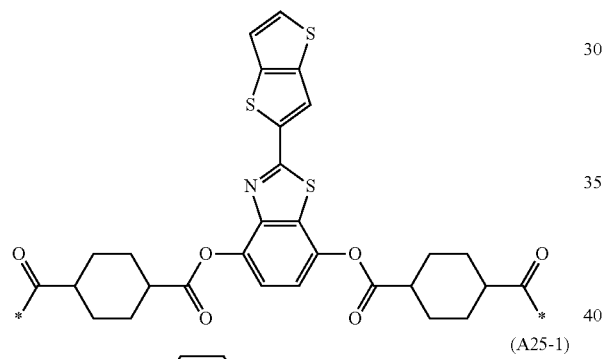
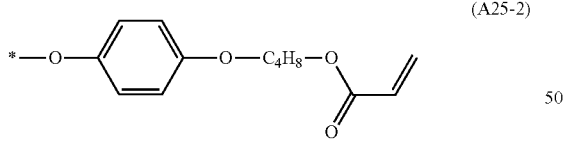
(A25-1)
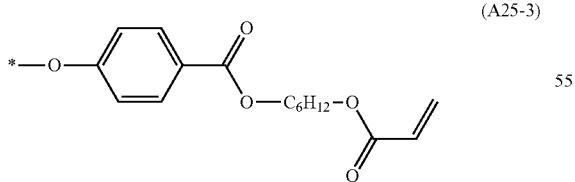
(A25-2)
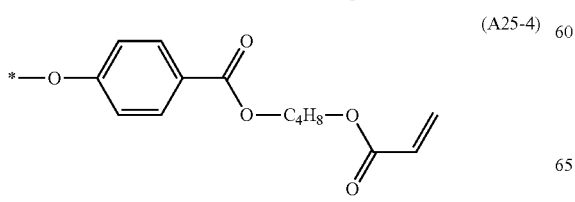
(A25-3)
(A25-4)
-continued
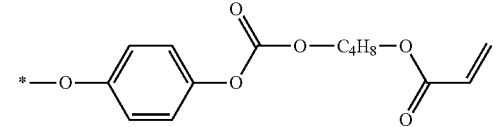
(A25-5)
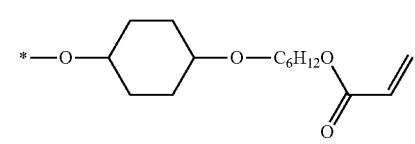
(A25-6)
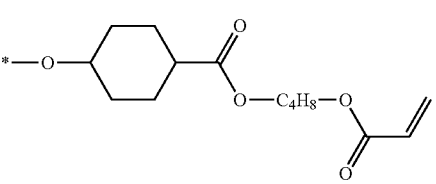
(A25-7)
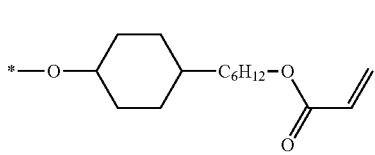
(A25-8)
[Chem. 51]
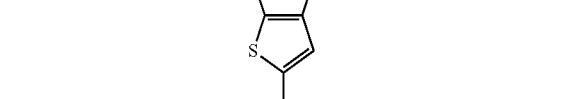
(A26-1)
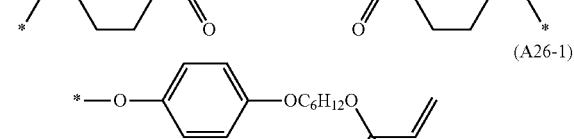
(A26-2)
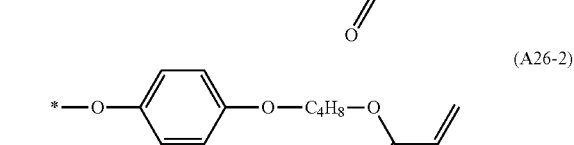
(A26-3)
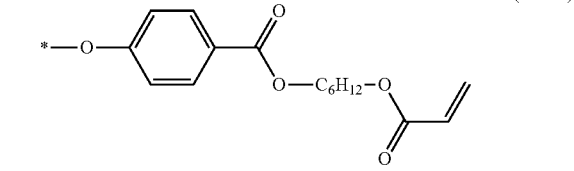

(A26-4)
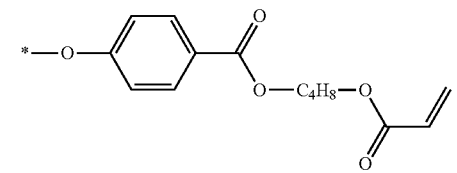
(A26-5)
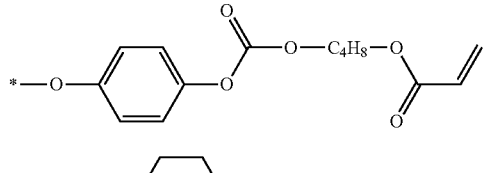
(A26-6)
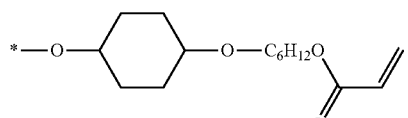
(A26-7)
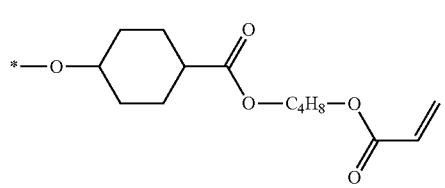
(A26-8)
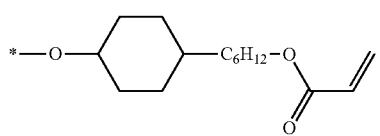
[Chem. 52]
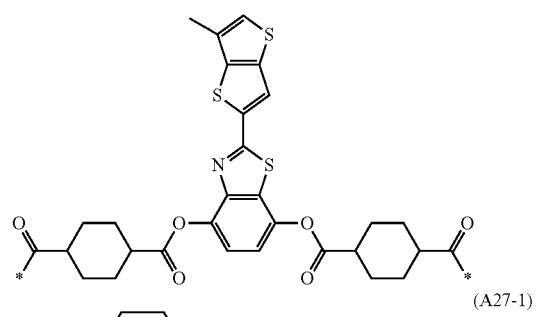
(A27-1)
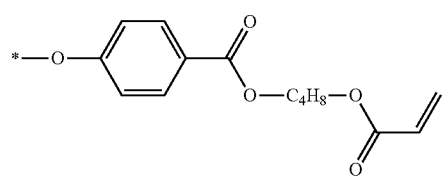
(A27-2)
(A27-3)
(A27-4)
(A27-5)
(A27-6)
(A27-7)
(A27-8)
[Chem. 53]
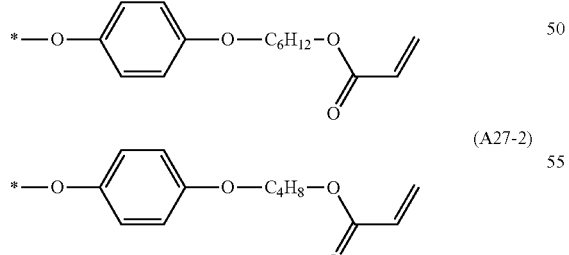
(A28-1)
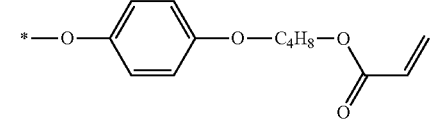
(A28-2)
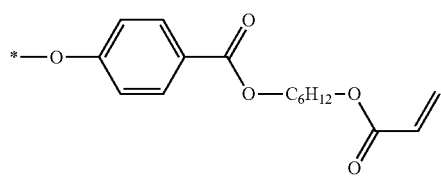

(A28-3)
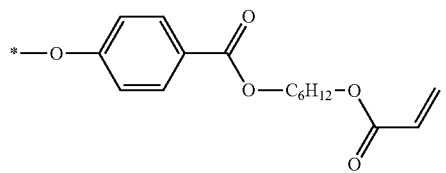
(A28-4)
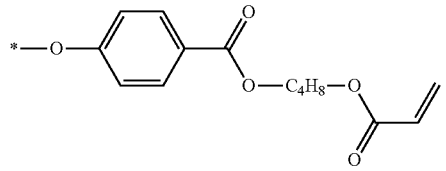
(A28-5)
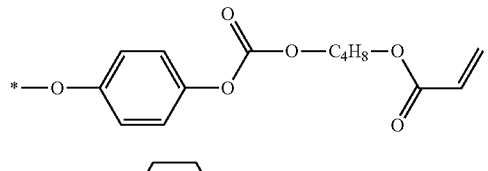
(A28-6)
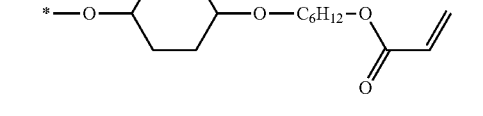
(A28-7)
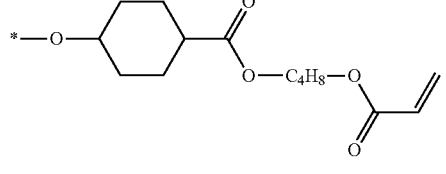
(A28-8)
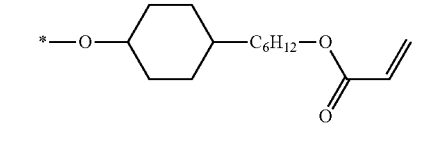
[Chem. 54]
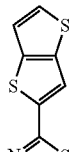
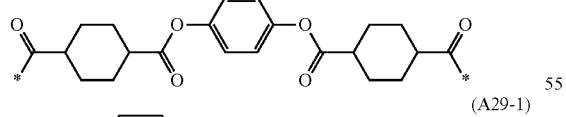
(A29-1)
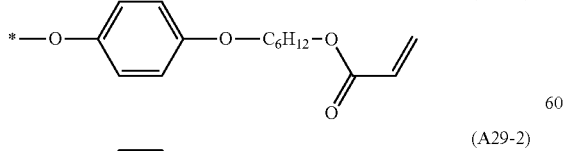
(A29-2)
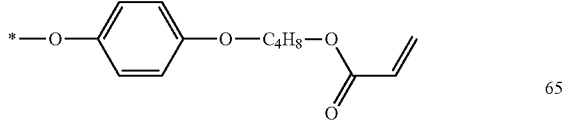
(A29-3)
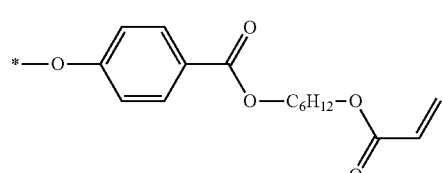
(A29-4)
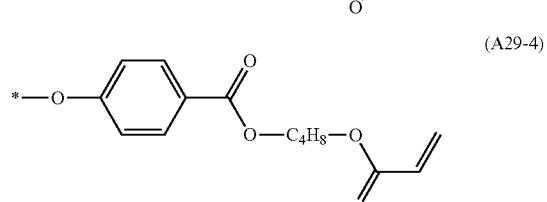
(A29-5)
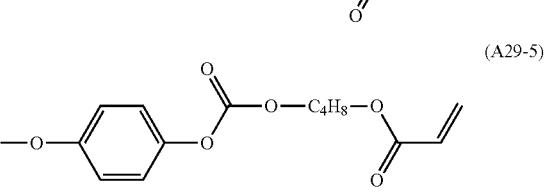
(A29-6)
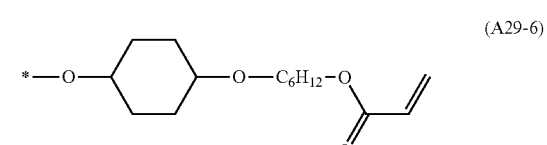
(A29-7)
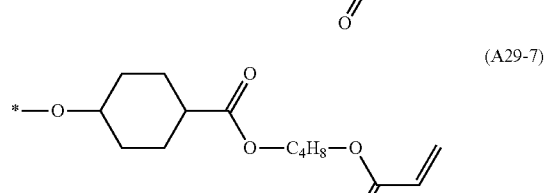
(A29-8)
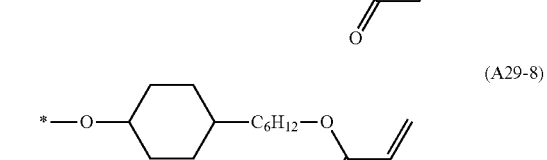
[Chem. 55]
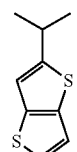
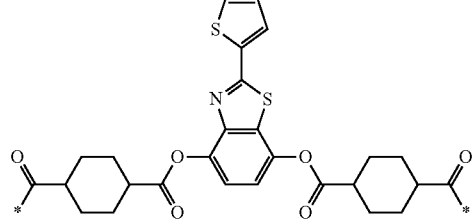
(A30-1)
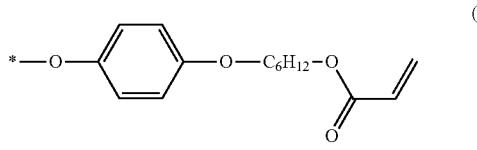

(A30-2)
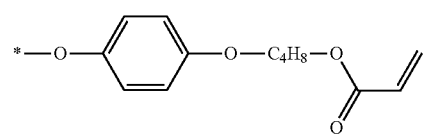
(A30-3)
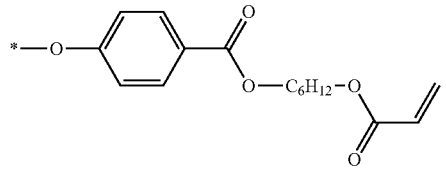
(A30-4)
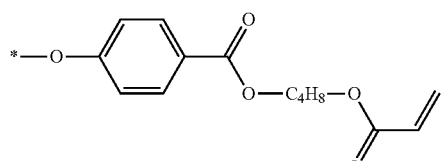
(A30-5)
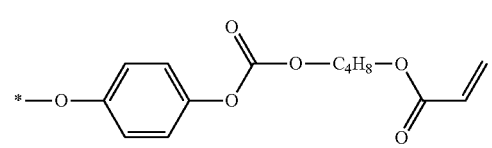
(A30-6)
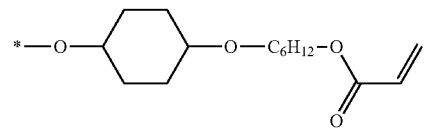
(A30-7)
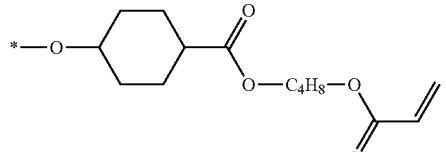
(A30-8)
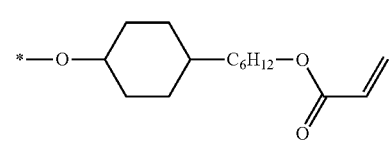
[Chem. 56]
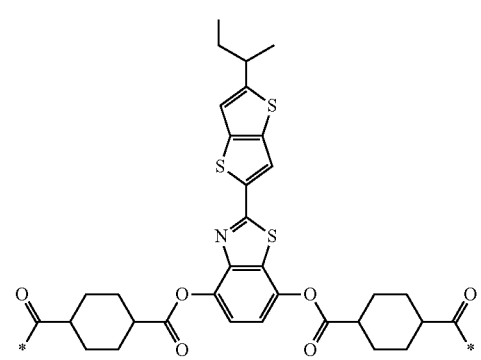
(A31-1)
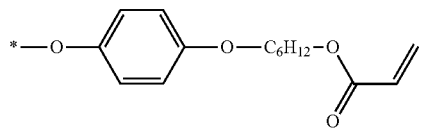
(A31-2)
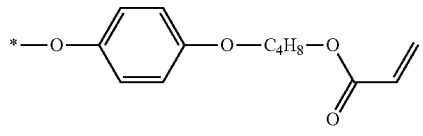
(A31-3)
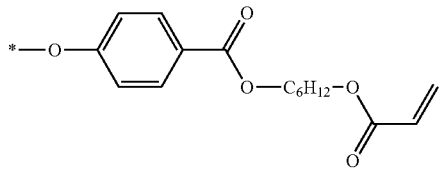
(A31-4)
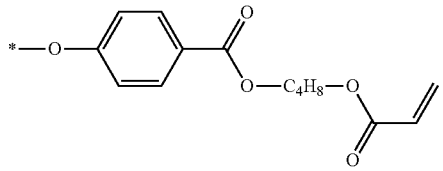
(A31-5)
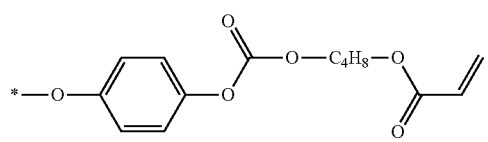
(A31-6)
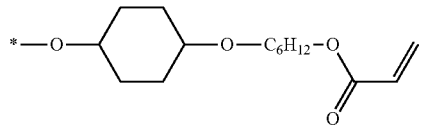
(A31-7)
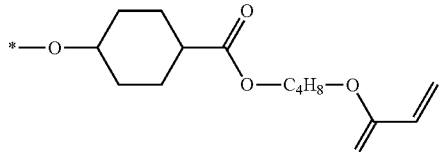

(A31-8)
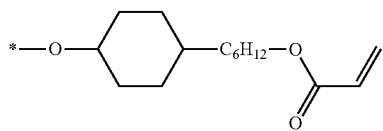
(A32-7)
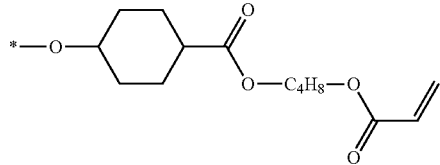
(A32-8)
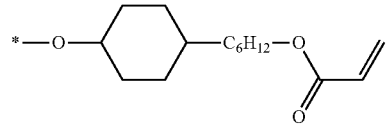
[Chem. 57]
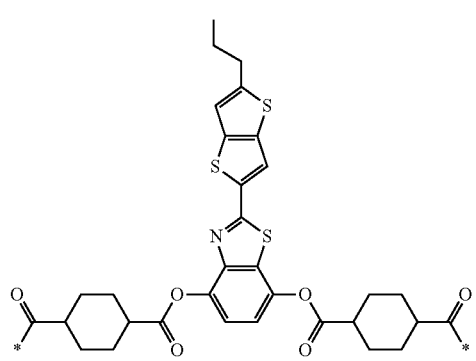
[Chem. 58]
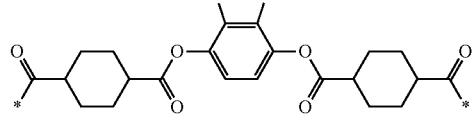
(A32-1)
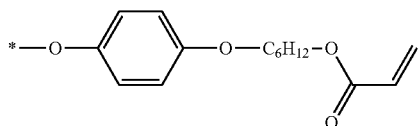
(A33-1)
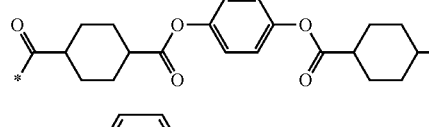
(A32-2)
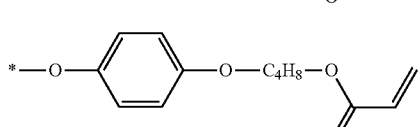
(A33-2)
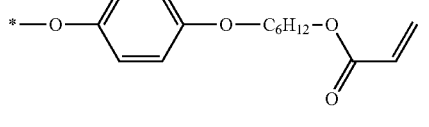
(A32-3)
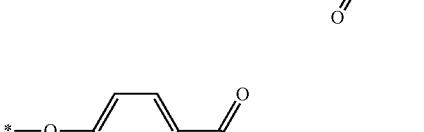
(A33-3)
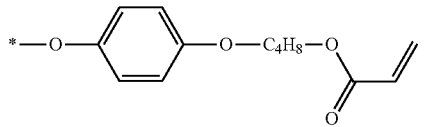
(A32-4)
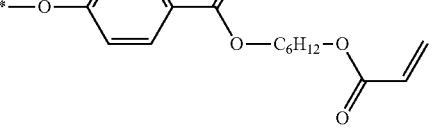
(A33-4)
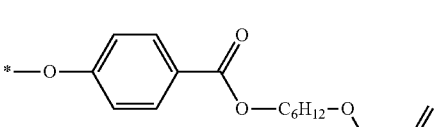
(A32-5)
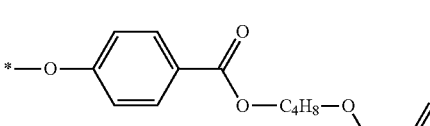
(A33-5)
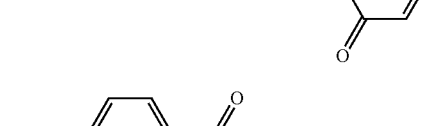
(A32-6)
(A33-6)
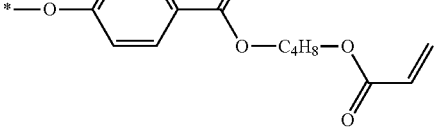

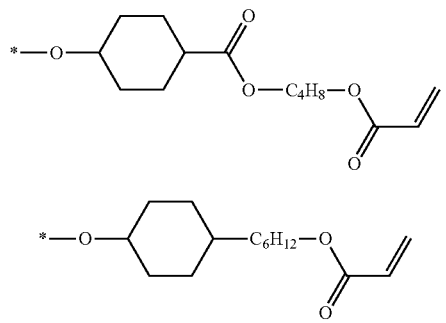
(A33-7)
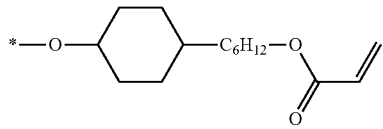
(A33-8)
[Chem. 59]
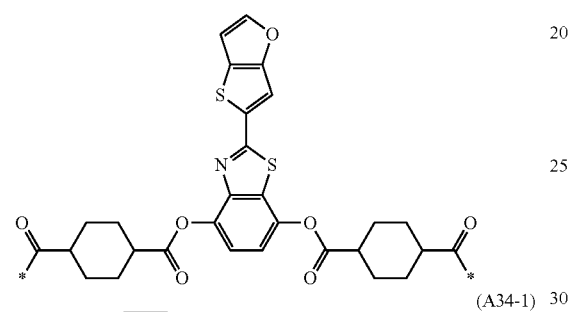
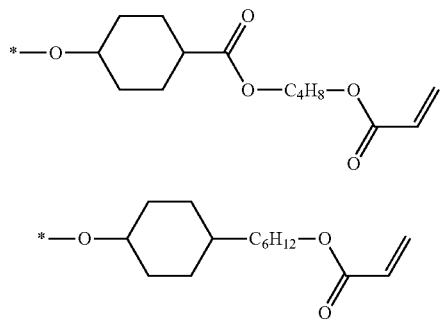
(A34-7)
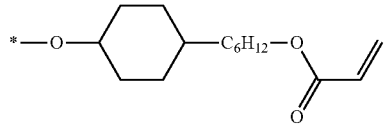
(A34-8)
[Chem. 60]
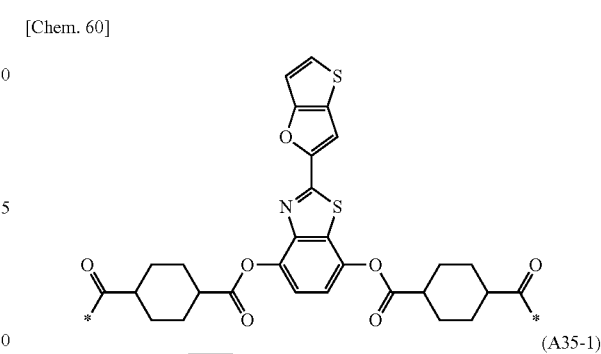
(A34-1)
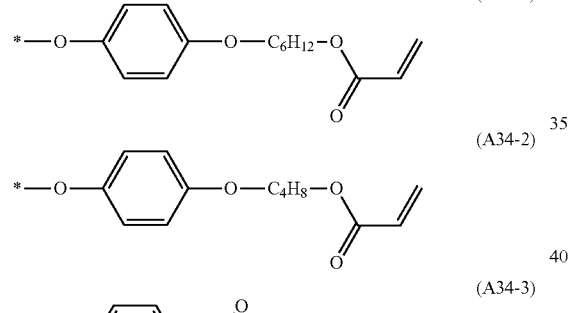
(A34-2)
(A34-3)
(A34-4)
(A34-5)
(A34-6)
(A35-1)
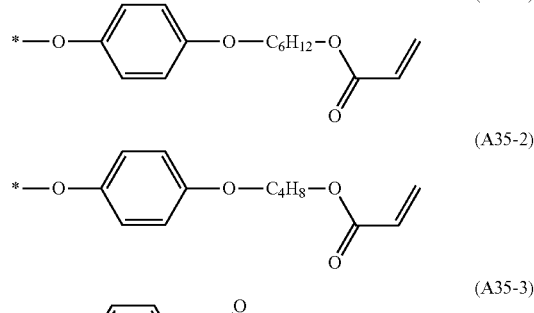
(A35-2)
(A35-3)
(A35-4)
(A35-5)
(A35-6)

(A35-7) 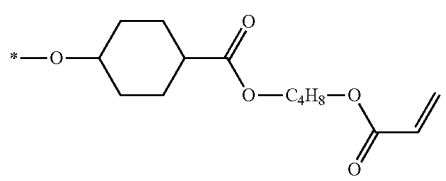
(A35-8) 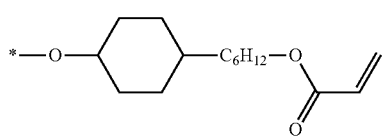
[Chem. 61]
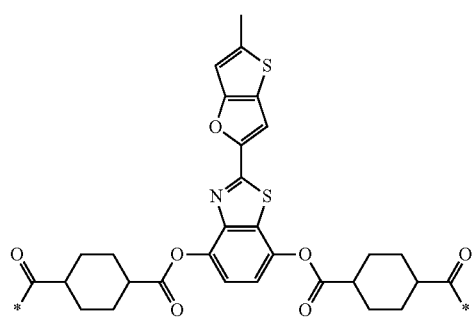
(A36-1) 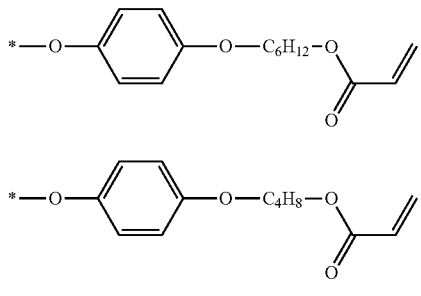
(A36-2)
(A36-3)
(A36-4)
(A36-5) 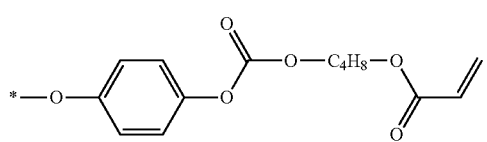
(A36-6) 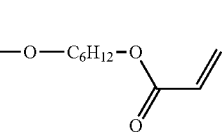
(A36-7) 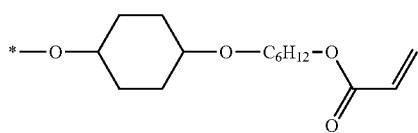
(A36-8) 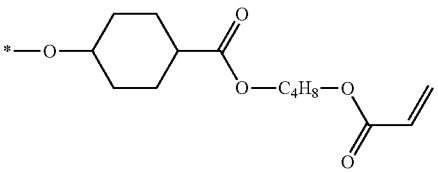
[Chem. 62]
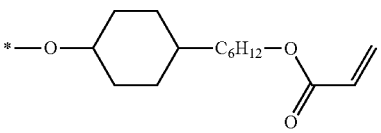
(A37-1) 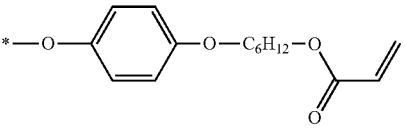
(A37-2)
(A37-3) 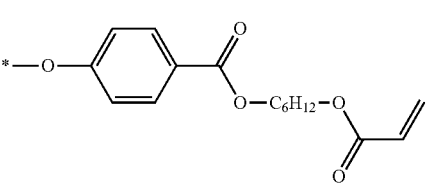
(A37-4) 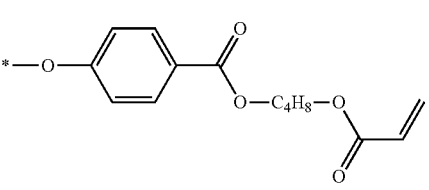

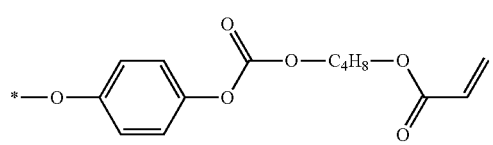 (A37-5)
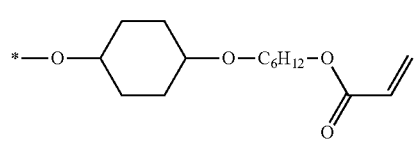 (A37-6)
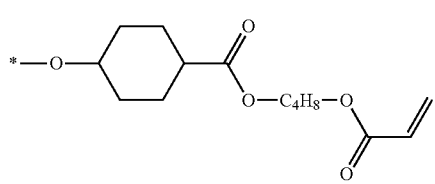 (A37-7)
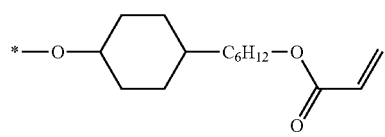 (A37-8)
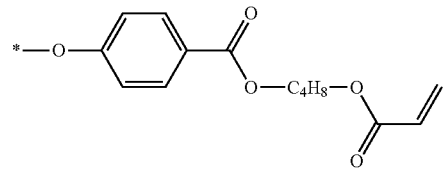 (A38-4)
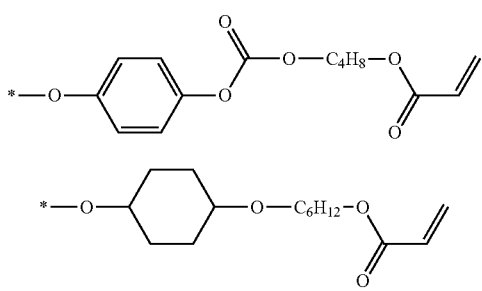 (A38-5)
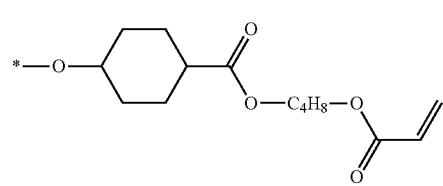 (A38-6)
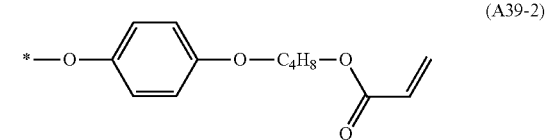 (A38-7)
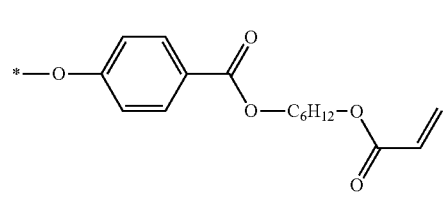 (A38-8)
[Chem. 63]
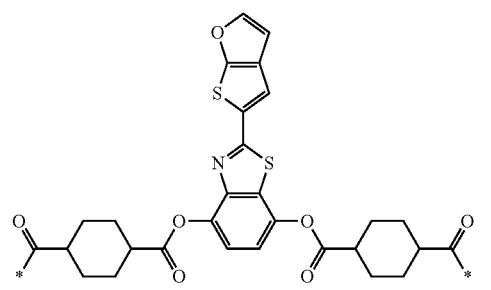
[Chem. 64]
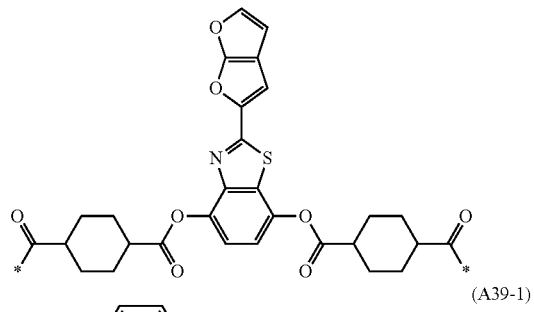
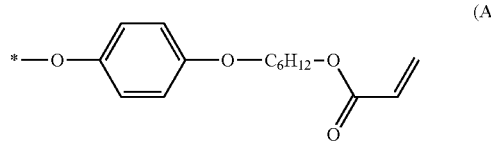 (A38-1), (A39-1)
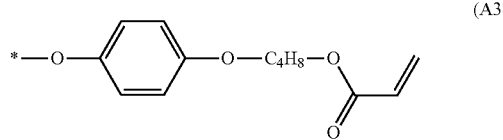 (A38-2), (A39-2)
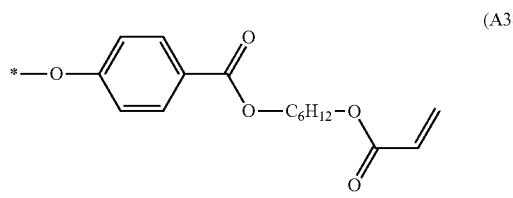 (A38-3), (A39-3)

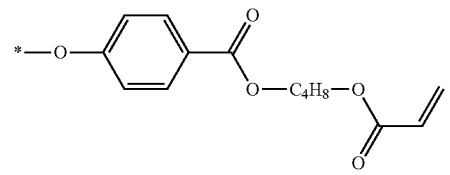
(A39-4)
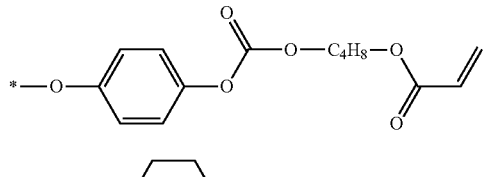
(A39-5)
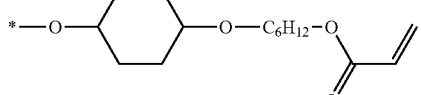
(A39-6)
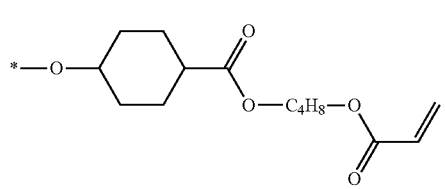
(A39-7)
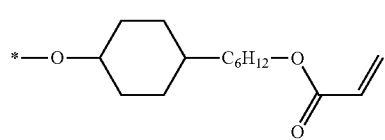
(A39-8)
[Chem. 65]
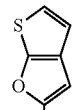
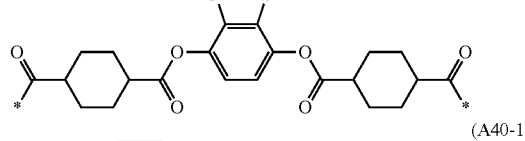//(A40-1)
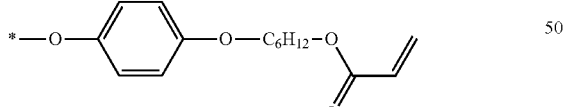//(A40-2)
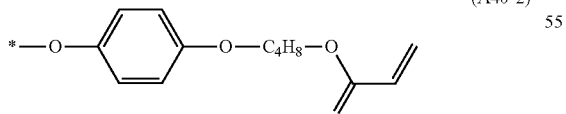//(A40-3)
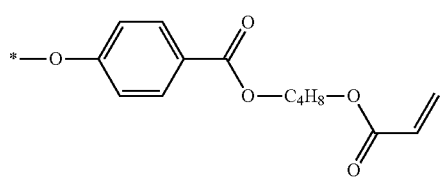
(A40-4)
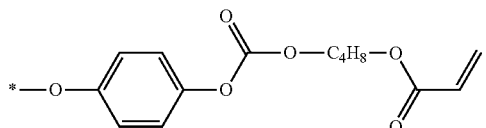
(A40-5)
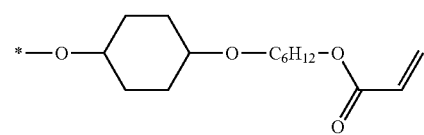
(A40-6)
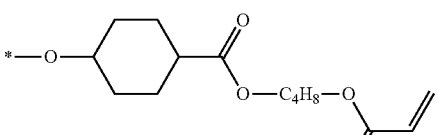
(A40-7)
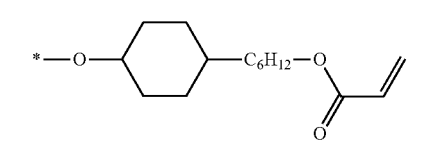
(A40-8)
[Chem. 66]
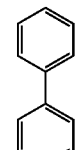
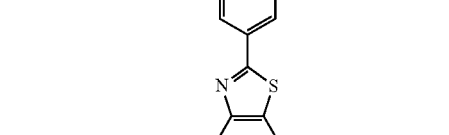
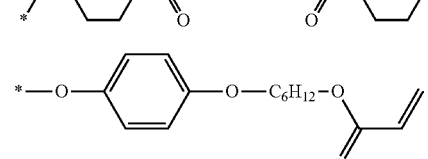
(A41-1)
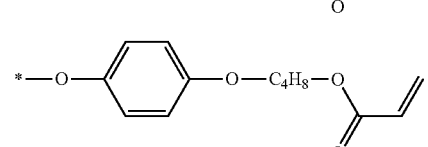
(A41-2)

(A41-3)
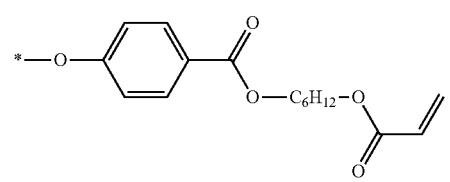
(A41-4)
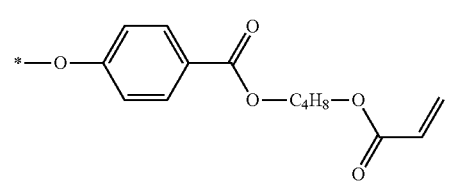
(A41-5)
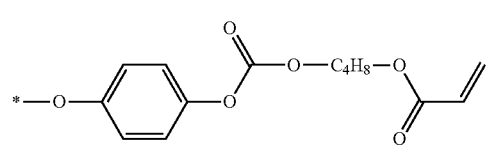
(A41-6)
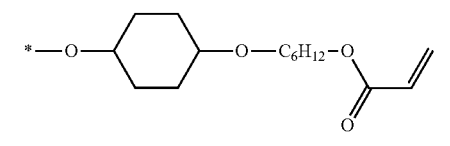
(A41-7)
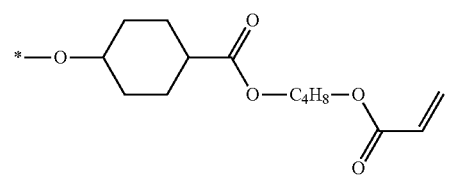
(A41-8)
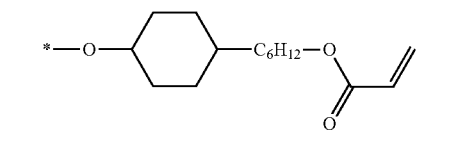
[Chem. 67]
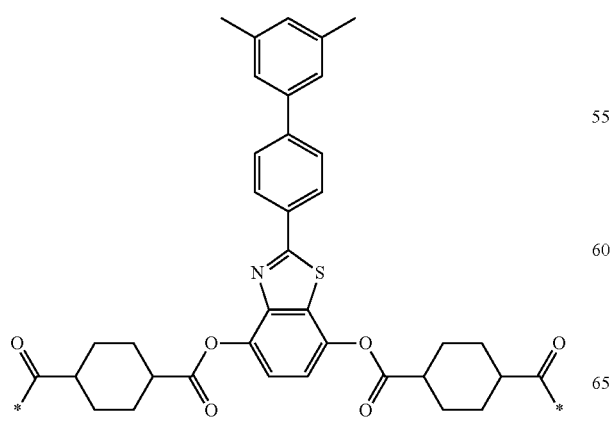
(A42-1)
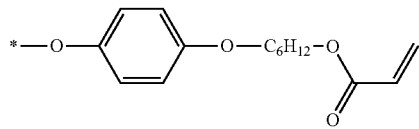
(A42-2)
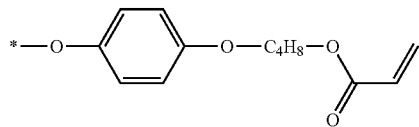
(A42-3)
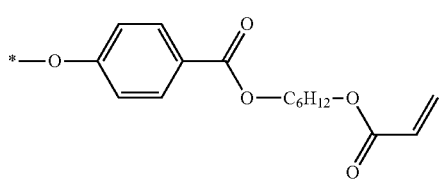
(A42-4)
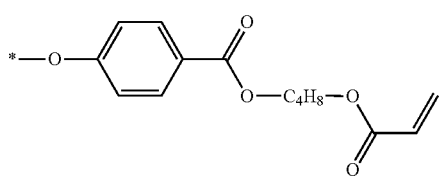
(A42-5)
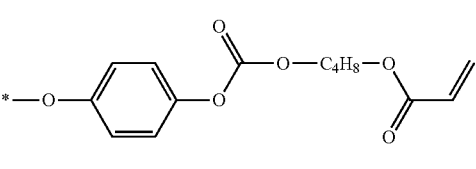
(A42-6)
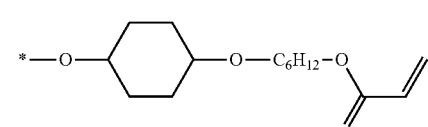
(A42-7)
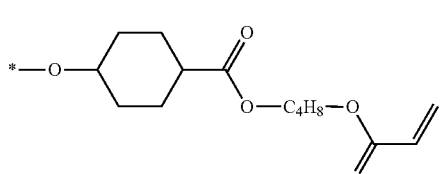
(A42-8)
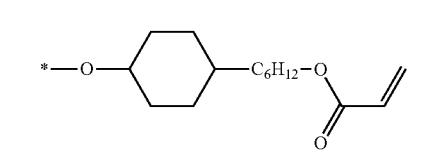

[Chem. 68]
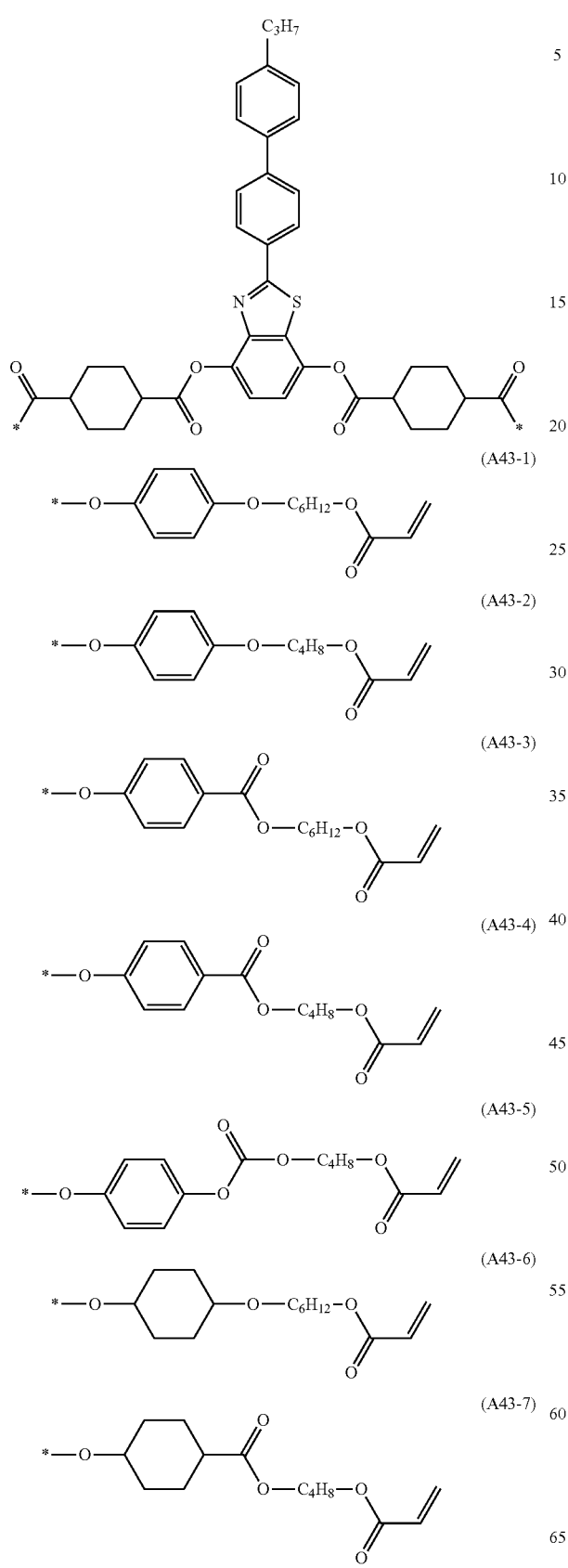
(A43-1)
(A43-2)
(A43-3)
(A43-4)
(A43-5)
(A43-6)
(A43-7)
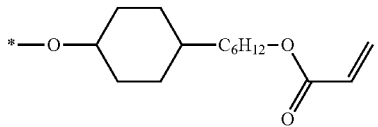
(A43-8)
[Chem. 69]
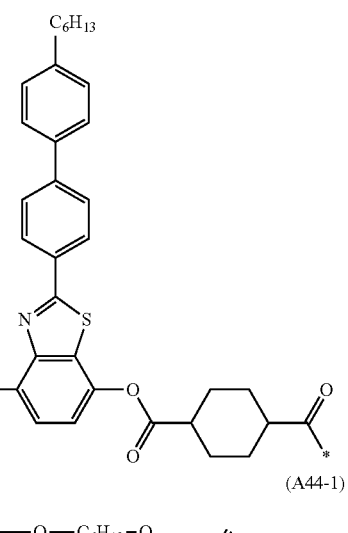
(A44-1)
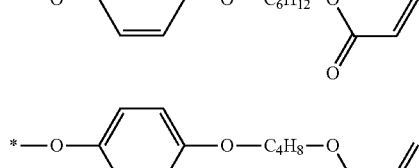
(A44-2)
(A44-3)
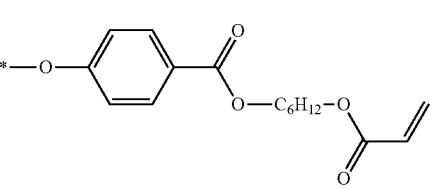
(A44-4)
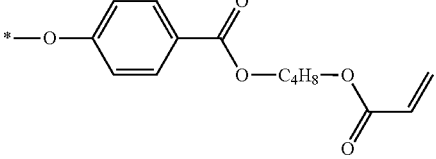
(A44-5)
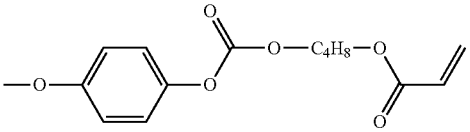
(A44-6)

(A44-7) 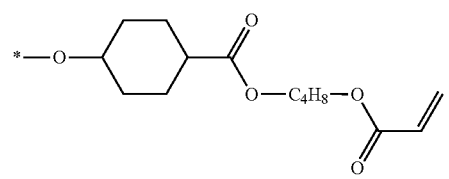
(A44-8) 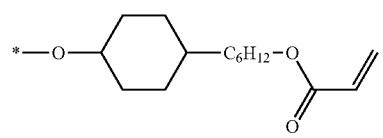
[Chem. 70]
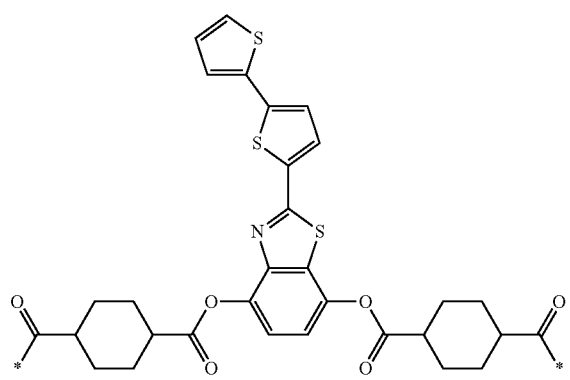
(A45-1) 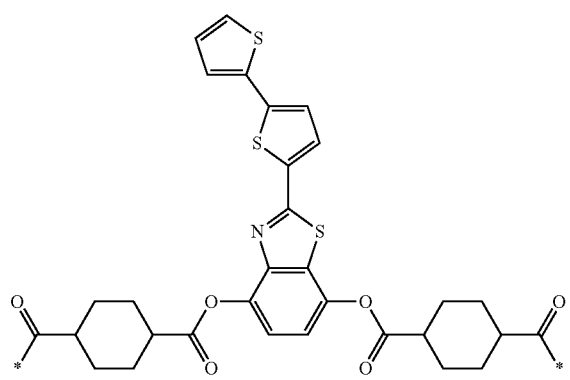
(A45-2)
(A45-3)
(A45-4)
(A45-5) 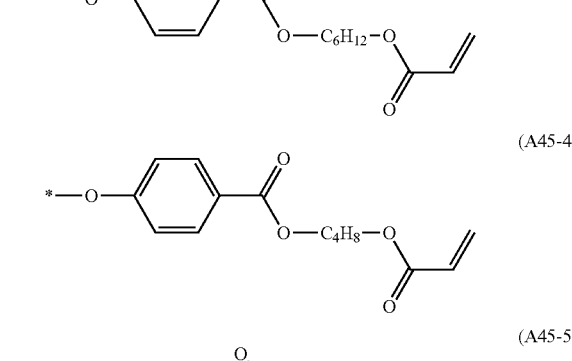
(A45-6) 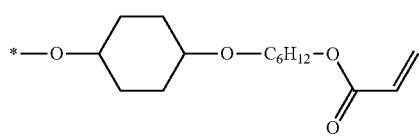
(A45-7) 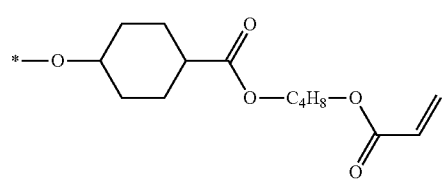
(A45-8) 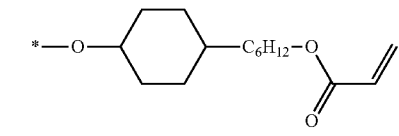
(A45-8) 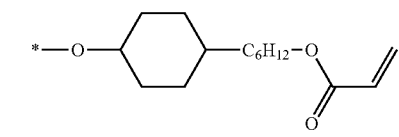
[Chem. 70]
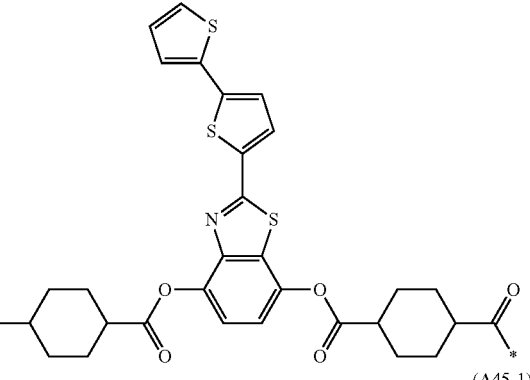
(A45-1) 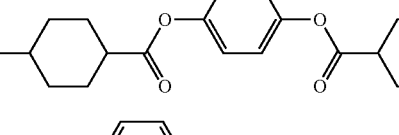
(A45-2) 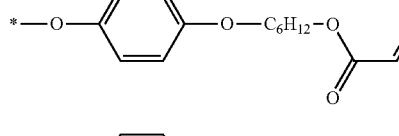
(A45-3) 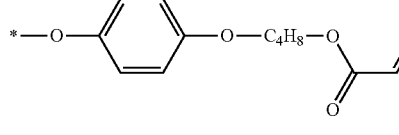

(A45-4)
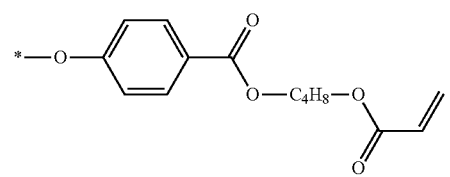
(A45-5)
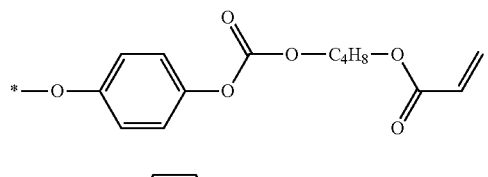
(A45-6)
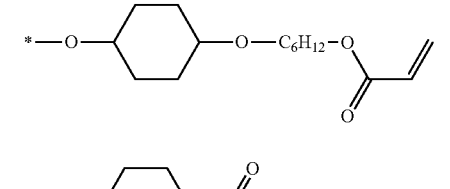
(A45-7)
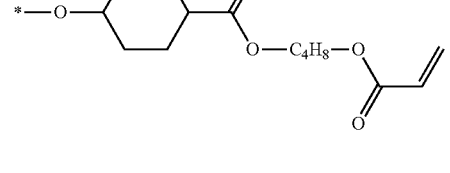
(A45-8)
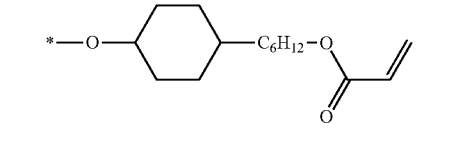
[Chem. 71]
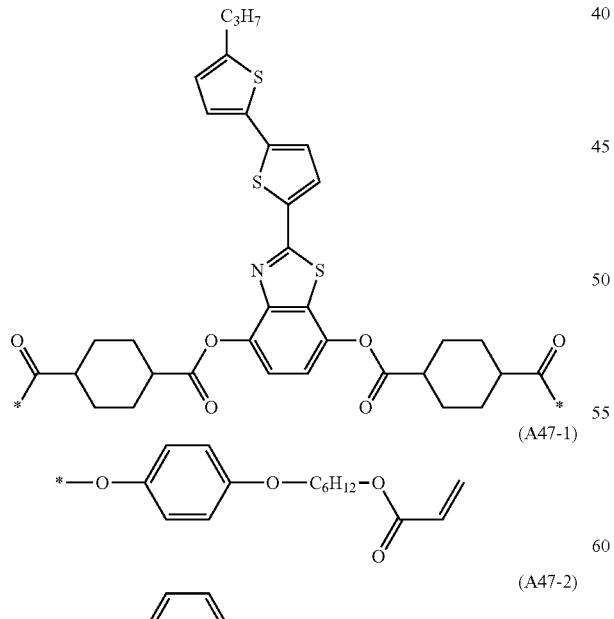
(A47-1)
(A47-2)
(A47-3)
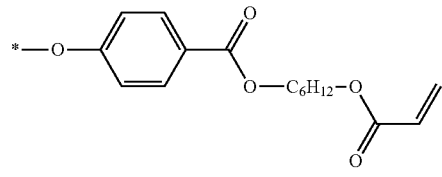
(A47-4)
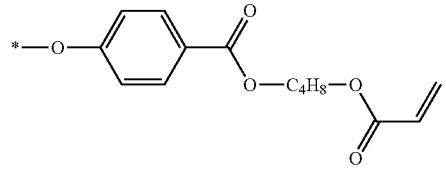
(A47-5)
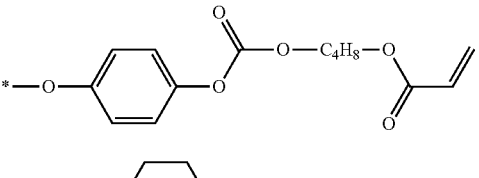
(A47-6)
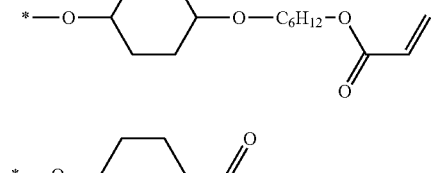
(A47-7)
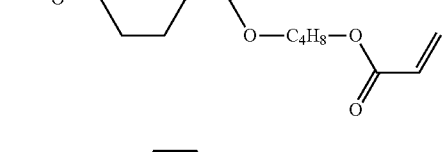
(A47-8)
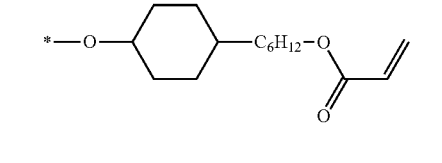
[Chem. 73]
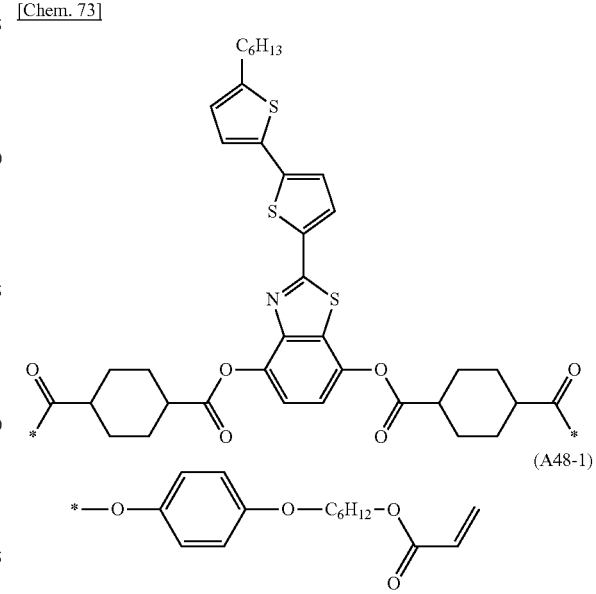
(A48-1)

(A48-2)
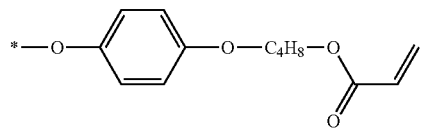
(A48-3)
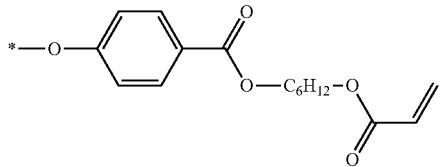
(A48-4)
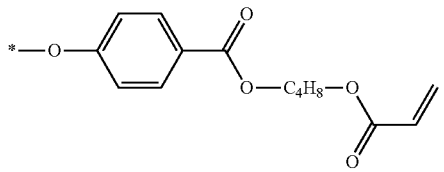
(A48-5)
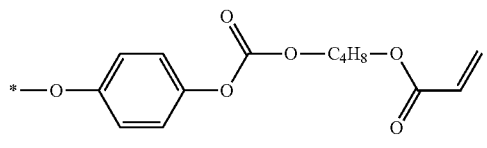
(A48-6)
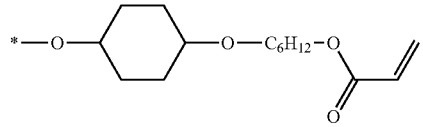
(A48-7)
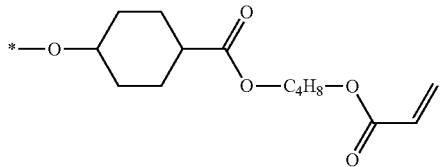
(A48-8)
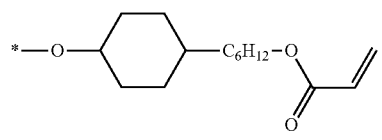
[Chem. 74]
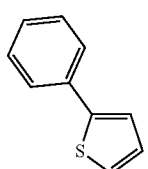
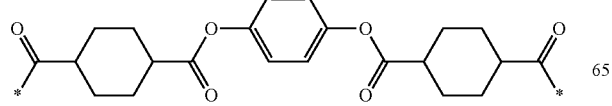
(A49-1)
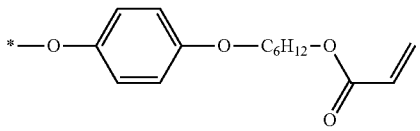
(A49-2)
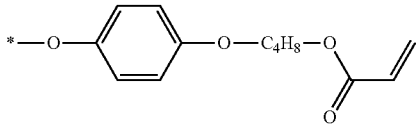
(A49-3)
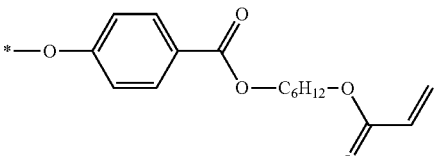
(A49-4)
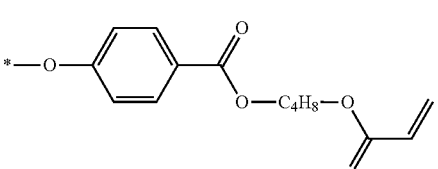
(A49-5)
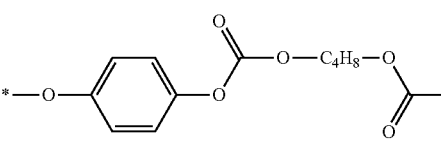
(A49-6)
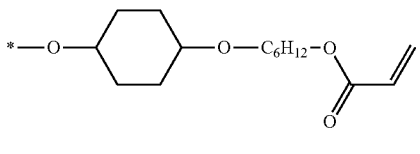
(A49-7)
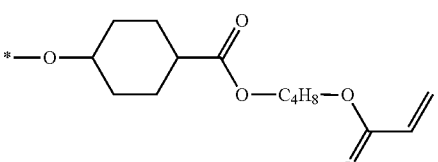
(A49-8)
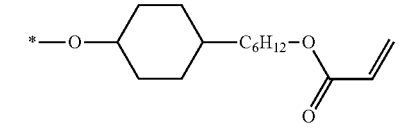

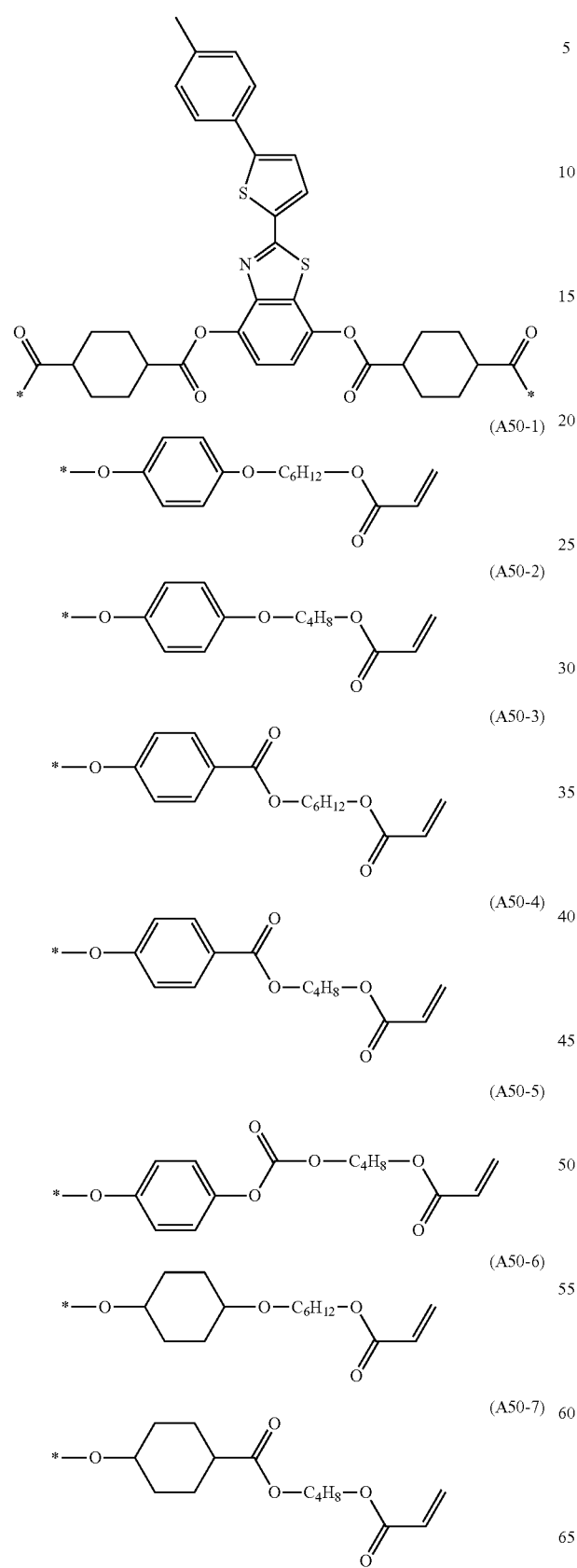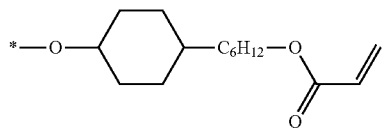

(A51-7) 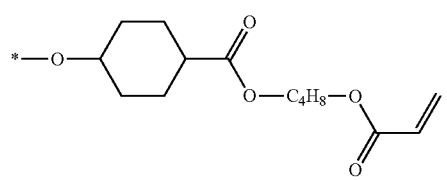
(A51-8) 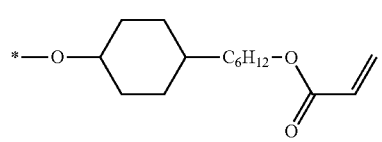
[Chem. 77]
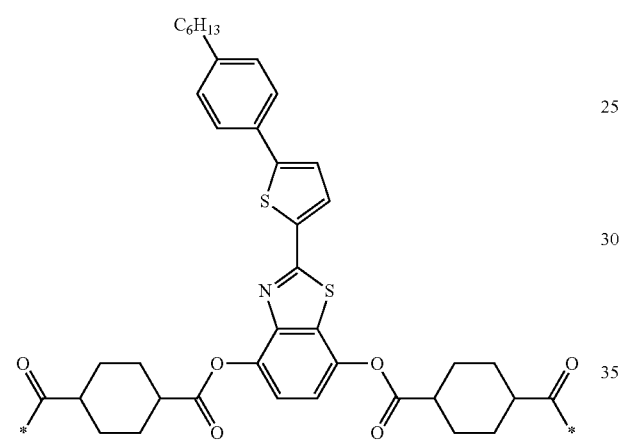
(A52-1) 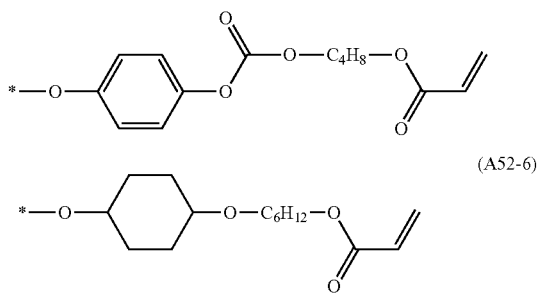
(A52-2)
(A52-3)
(A52-4)
(A52-5) 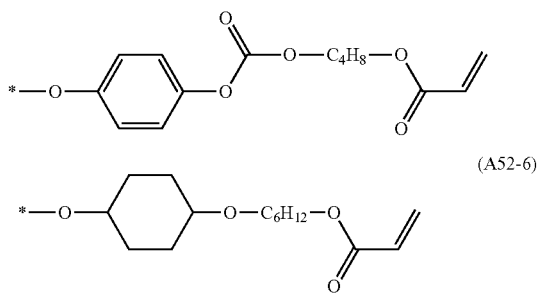
(A52-6) 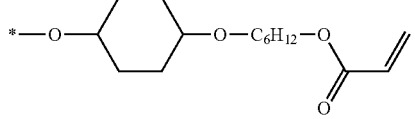
(A52-7) 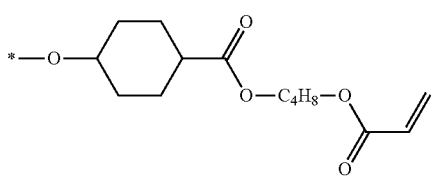
(A52-8) 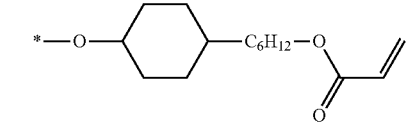
[Chem. 78]
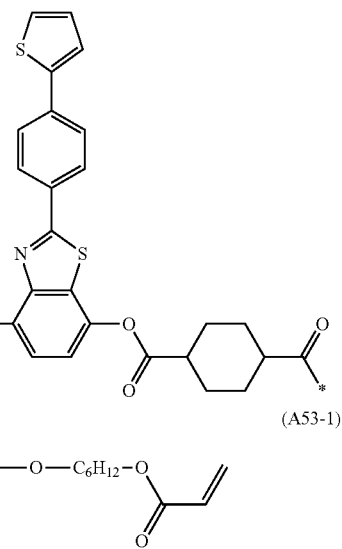
(A53-1) 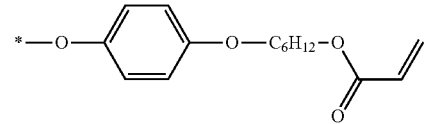
(A53-2) 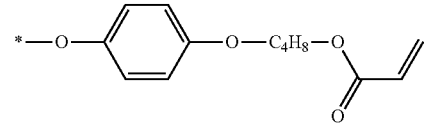
(A53-3) 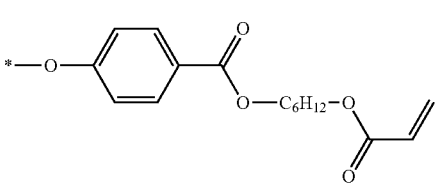

(A53-4)
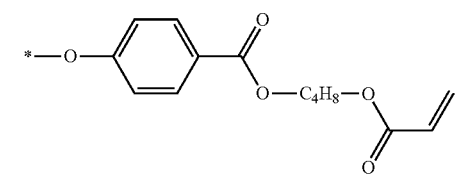
(A53-5)
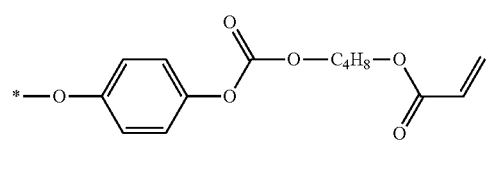
(A53-6)
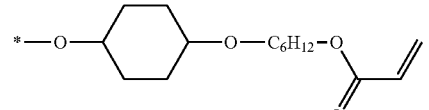
(A53-7)
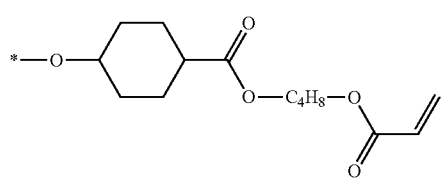
(A53-8)
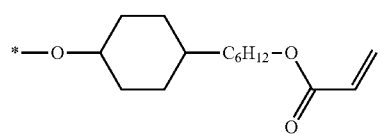
[Chem. 79]
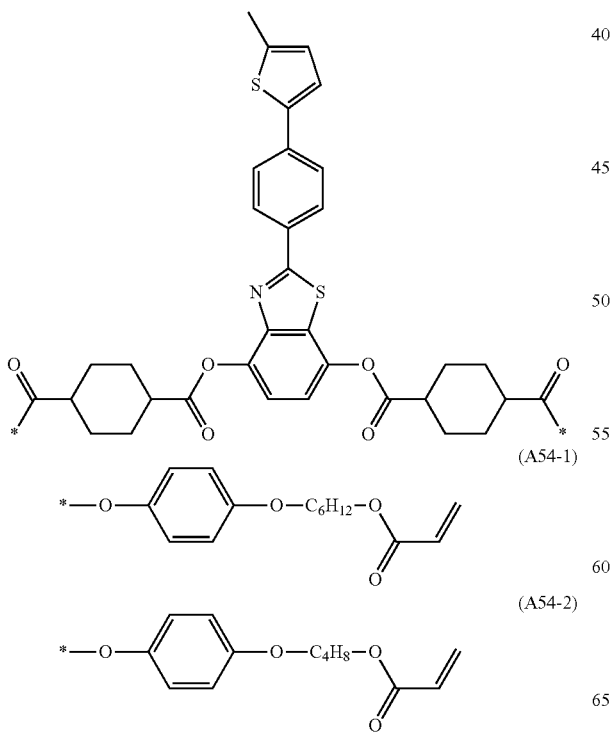
(A54-1)
(A54-2)
(A54-3)
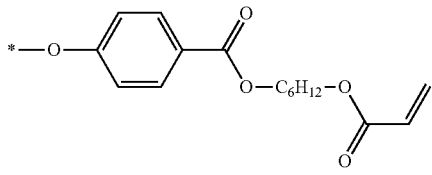
(A54-4)
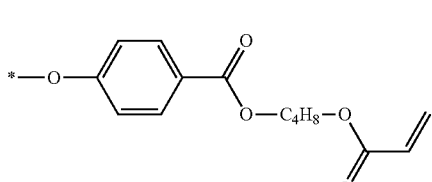
(A54-5)
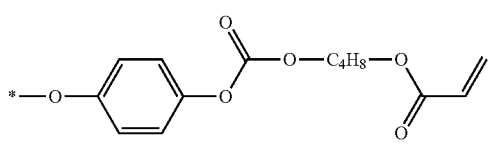
(A54-6)
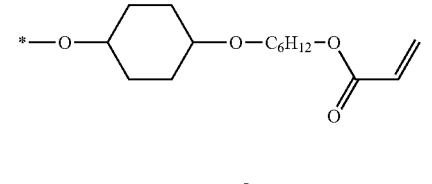
(A54-7)
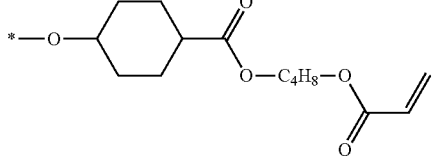
(A54-8)
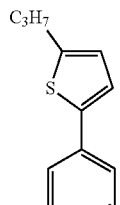
[Chem. 80]
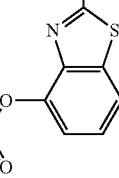

-continued
(A55-1)
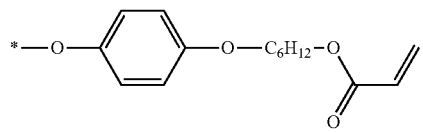
(A55-2)
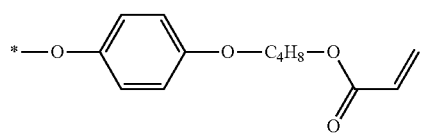
(A55-3)
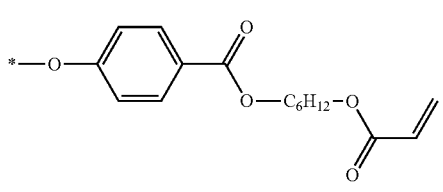
(A55-4)
*—O—⌬—C(=O)—O—C4H8—O—C(=O)—CH=CH2
(A55-5)
*—O—⌬—O—C(=O)—O—C4H8—O—C(=O)—CH=CH2
(A55-6)
*—O—(cyclohexyl)—O—C6H12—O—C(=O)—CH=CH2
(A55-7)
*—O—(cyclohexyl)—C(=O)—O—C4H8—O—C(=O)—CH=CH2
(A55-8)
*—O—(cyclohexyl)—C6H12—O—C(=O)—CH=CH2
[Chem. 81]
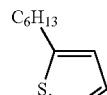
(A56-1)
*—O—⌬—O—C6H12—O—C(=O)—CH=CH2
(A56-2)
*—O—⌬—O—C4H8—O—C(=O)—CH=CH2
(A56-3)
*—O—⌬—C(=O)—O—C6H12—O—C(=O)—CH=CH2
(A56-4)
*—O—⌬—C(=O)—O—C4H8—O—C(=O)—CH=CH2
(A56-5)
*—O—⌬—O—C(=O)—O—C4H8—O—C(=O)—CH=CH2
(A56-6)
*—O—(cyclohexyl)—O—C6H12—O—C(=O)—CH=CH2
(A56-7)
*—O—(cyclohexyl)—C(=O)—O—C4H8—O—C(=O)—CH=CH2

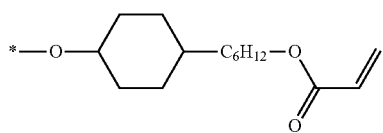
(A56-8)
[Chem. 82]
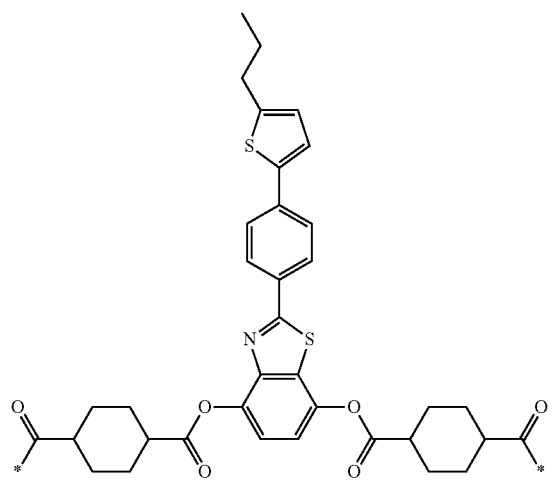
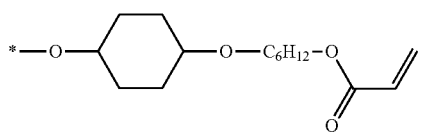
(A57-6)
(A57-8)
(A57-9)
[Chem. 83]
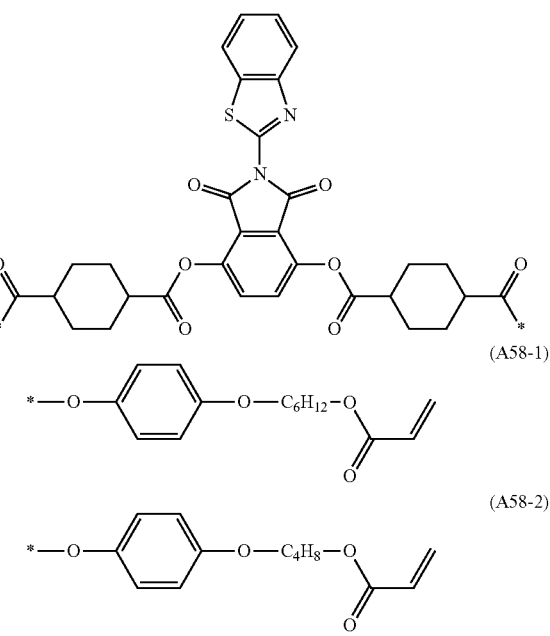
(A58-1)
(A58-2)
(A58-3)
(A58-4)
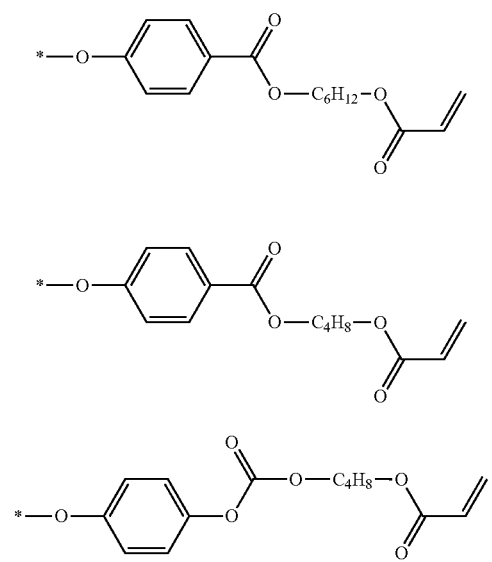
(A57-1)
(A57-2)
(A57-3)
(A57-4)
(A57-5)

[Chem. 84] and [Chem. 85] structural formulae pages with compounds labeled (A58-5), (A58-6), (A58-7), (A58-8), (A59-1), (A59-2), (A59-3), (A59-4), (A59-5), (A59-6), (A59-7), (A59-8), (A60-1), (A60-2).

(A60-3) 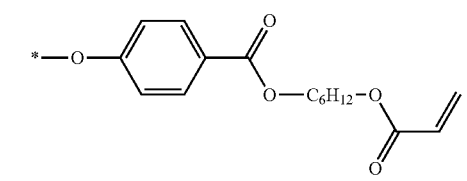
(A60-4) 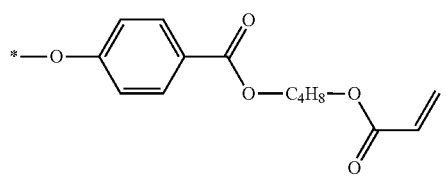
(A60-5) 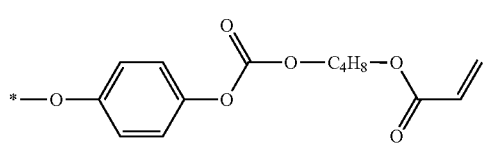
(A60-6) 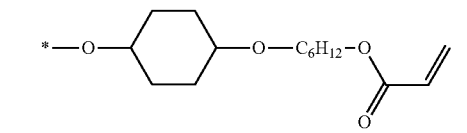
(A60-7) 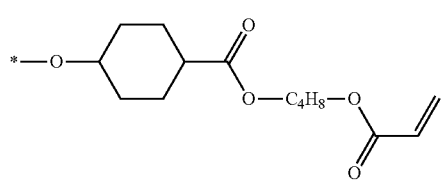
(A60-8) 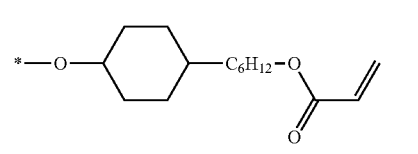
(A61-2) 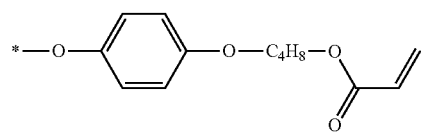
(A61-3) 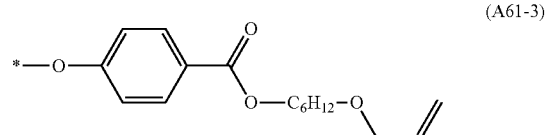
(A61-4) 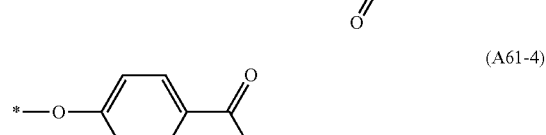
(A61-5) 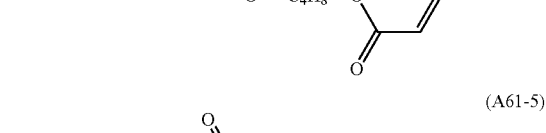
(A61-6) 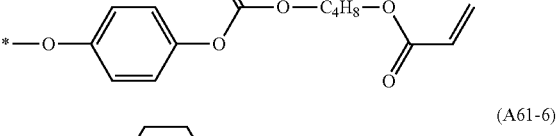
(A61-7) 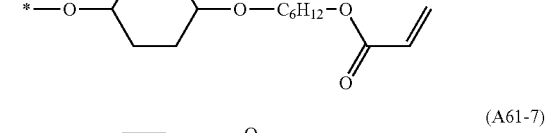
(A61-8) 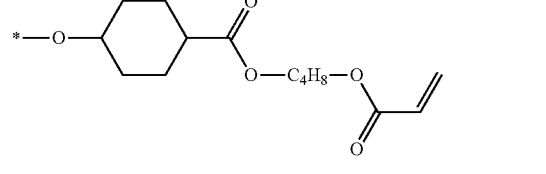
[Chem. 86]
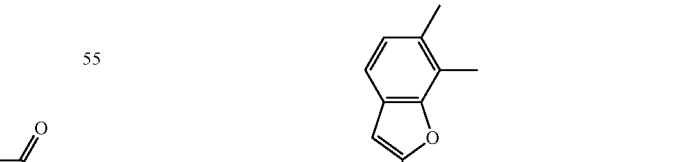
(A61-1) 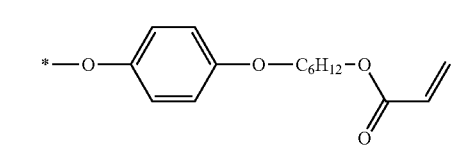
[Chem. 87]
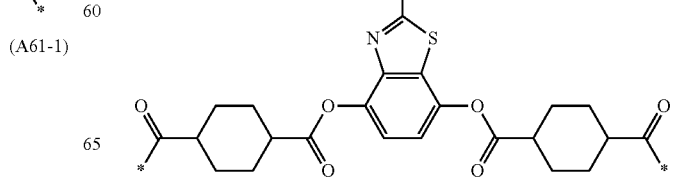

(A62-1)
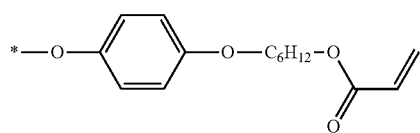
(A62-2)
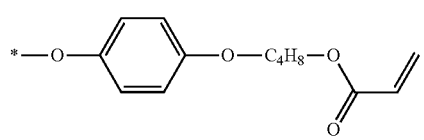
(A62-3)
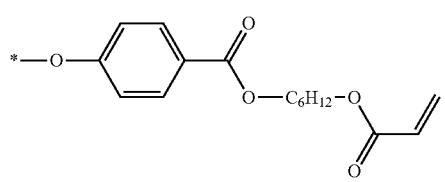
(A62-4)
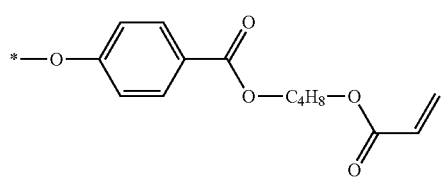
(A62-5)
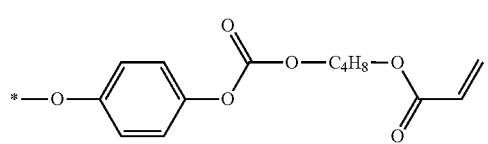
(A62-6)
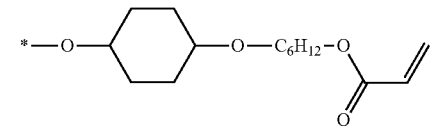
(A62-7)
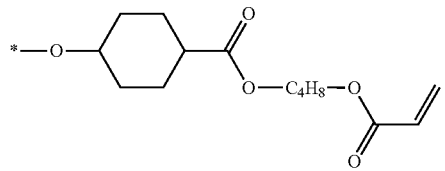
(A62-8)
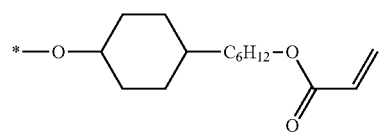
[Chem. 88]
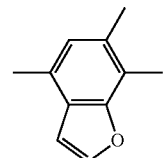
(A63-1)
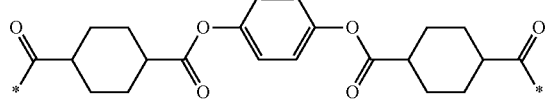
(A63-2)
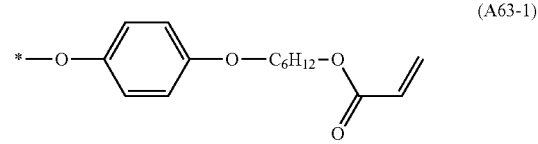
(A63-3)
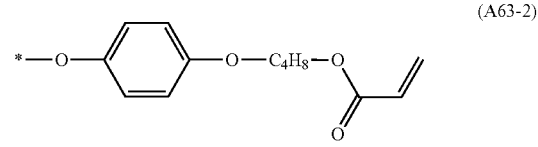
(A63-4)
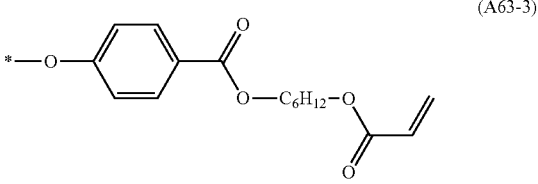
(A63-5)
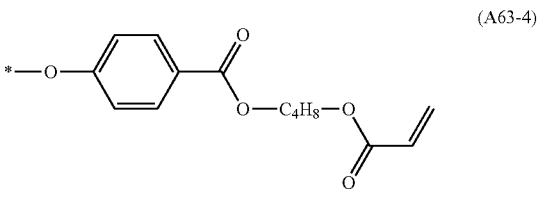
(A63-6)
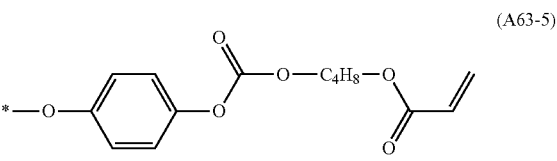
(A63-7)
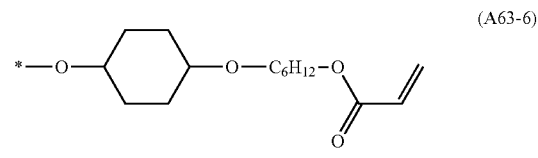

(A63-8) 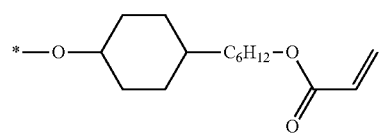
[Chem. 89]
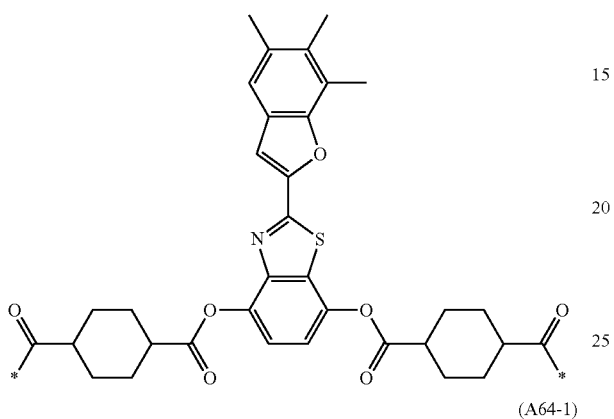
(A64-1) 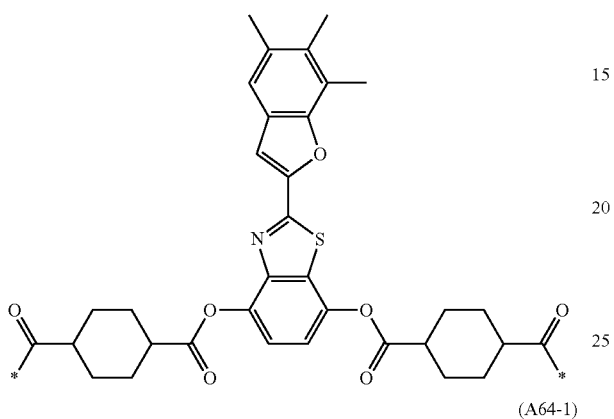
(A64-2)
(A64-3)
(A64-4)
(A64-5)
(A64-6) 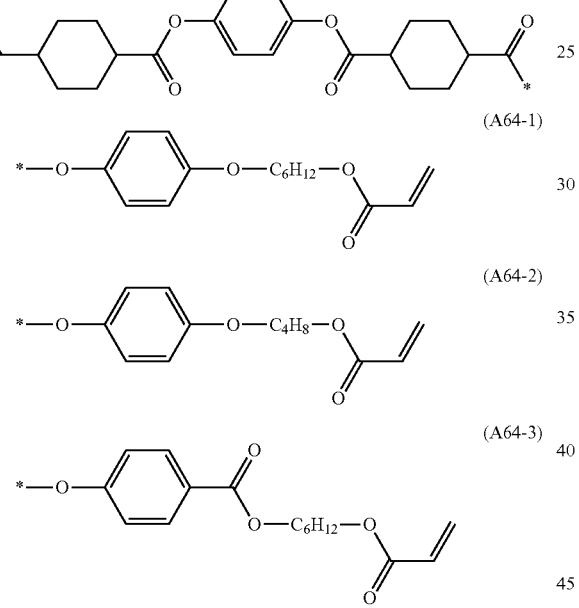
(A64-7) 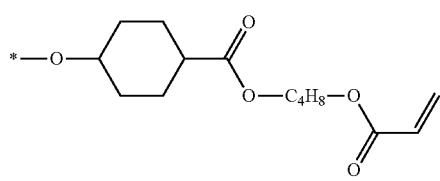
(A64-8)
[Chem. 90]
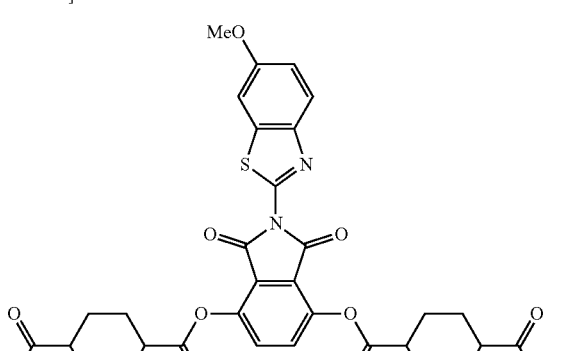
(A66-1) 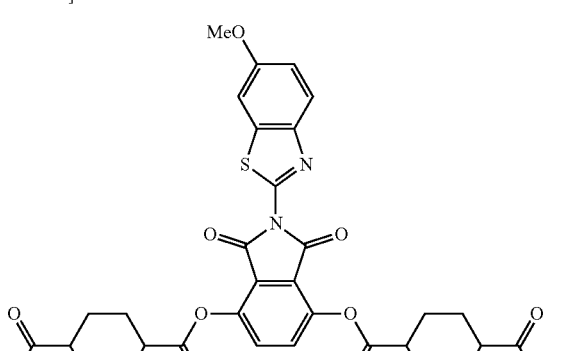
(A66-2)
(A66-3)
(A66-4)
(A66-5) 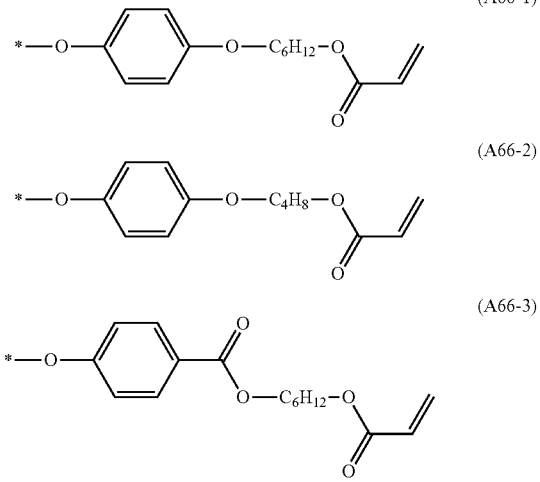

(A66-6)
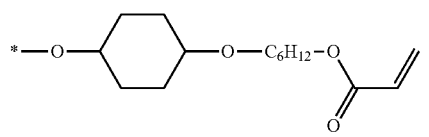
(A66-7)
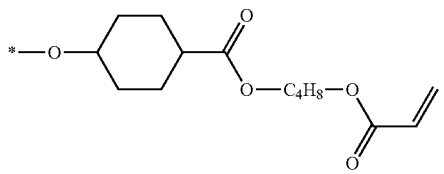
(A66-8)
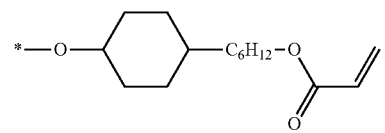
[Chem. 91]
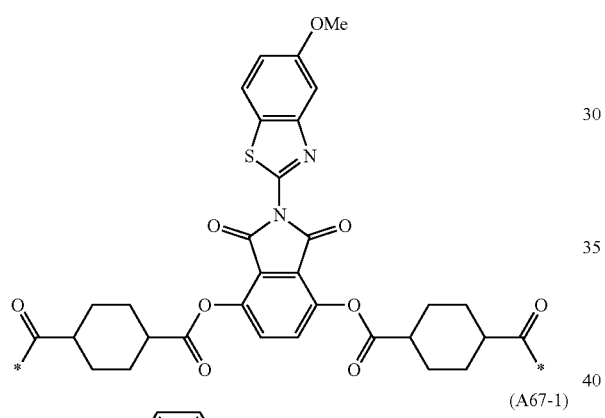
(A67-1)
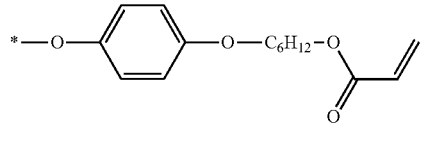
(A67-2)
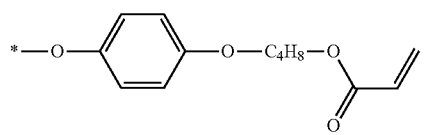
(A67-3)
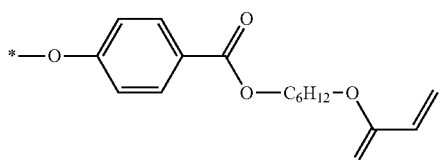
(A67-4)
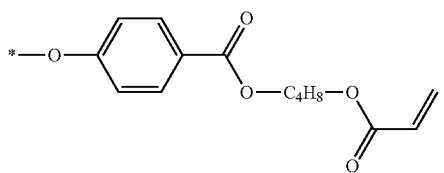
(A67-5)
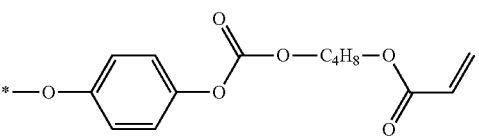
(A67-6)
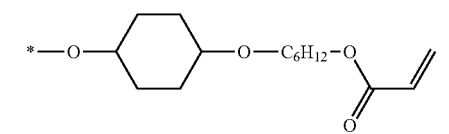
(A67-7)
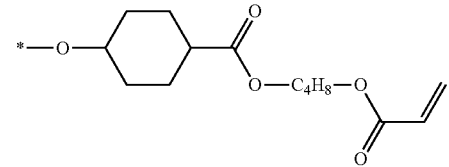
(A67-8)
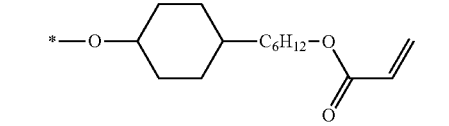
[Chem. 92]
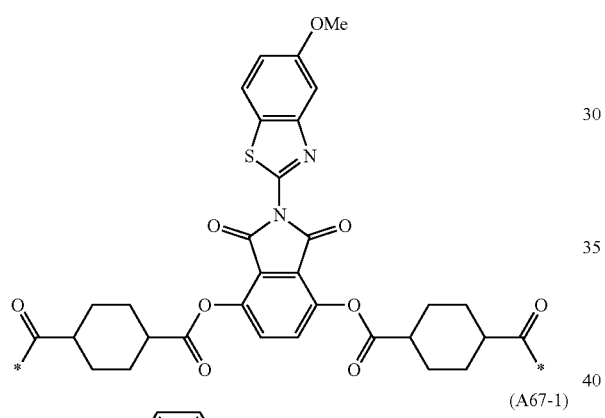
(A68-1)
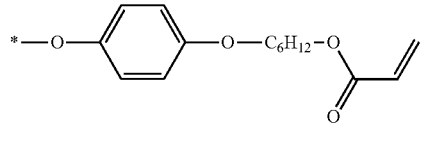
(A68-2)
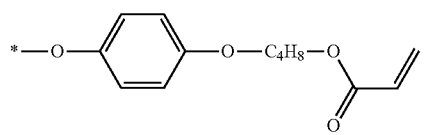
(A68-3)
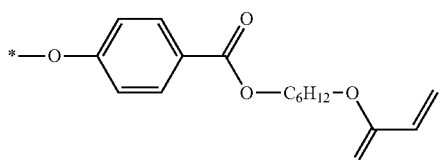

(A68-4)
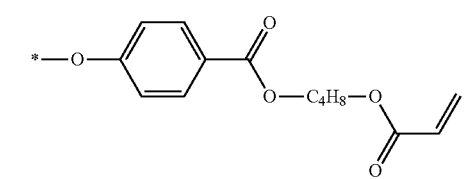
(A68-5)
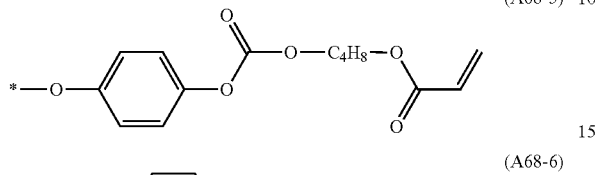
(A68-6)
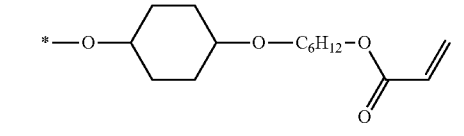
(A68-7)
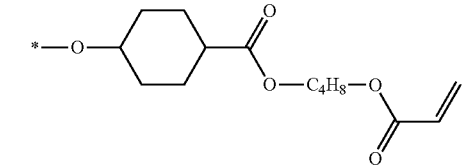
(A68-8)
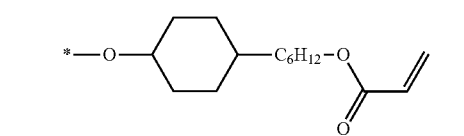
[Chem. 93]
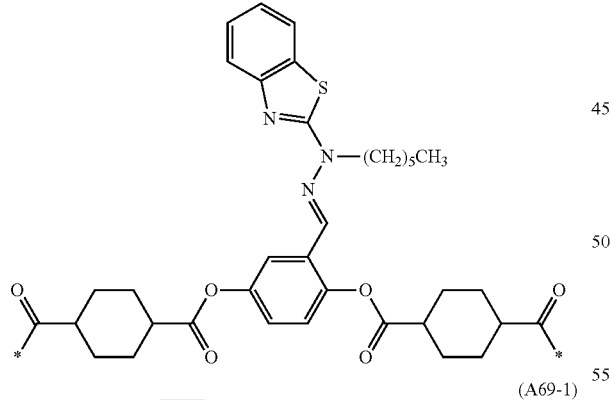
(A69-1)
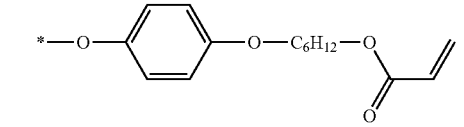
(A69-2)
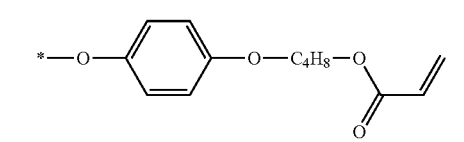
(A69-3)
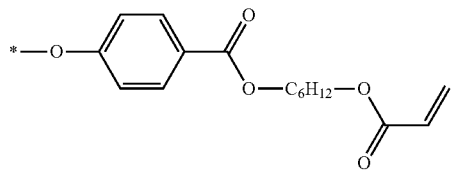
(A69-4)
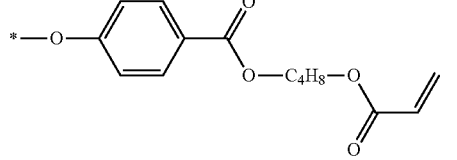
(A69-5)
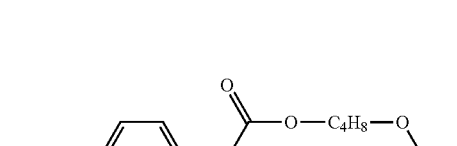
(A69-6)
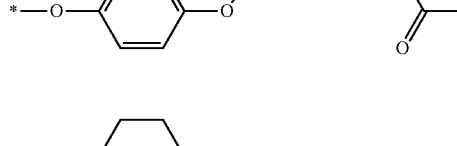
(A69-7)
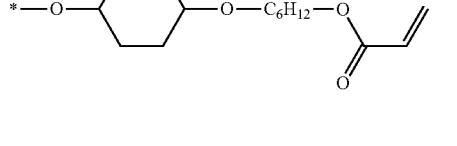
(A69-8)
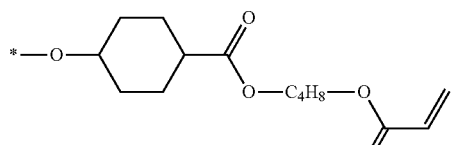
[Chem. 94]
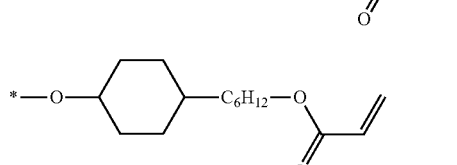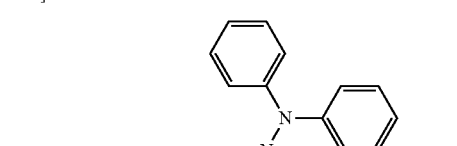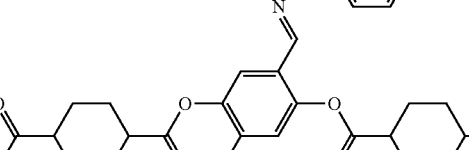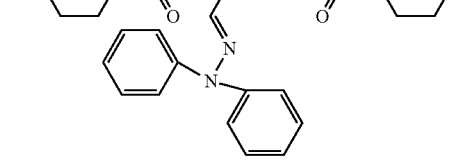

-continued (A70-1) (A70-2) (A70-3) (A70-4) (A70-5) (A70-6) (A70-7) (A70-8)

[Chem. 95]

(A71-1) (A71-2) (A71-3) (A71-4) (A71-5) (A71-6) (A71-7)

-continued

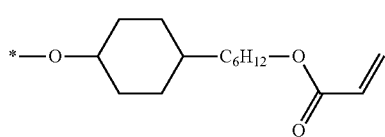
(A71-8)

When a retardation film is produced from a polymer of a polymerizable liquid crystal compound kept in an orientation state, the polymerizable liquid crystal compound or, depending on the situation, a composition (hereinafter also referred to as "composition for forming an optically anisotropic layer") prepared by diluting the polymerizable liquid crystal compound with a solvent is applied to a substrate or an orientation layer formed on the substrate and polymerized after dried to remove the solvent though depending on the situation, to obtain a polymer of a polymerizable liquid crystal compound kept in an orientation state. The polymerization of the polymerizable liquid crystal compound kept in an oriented state enables the preparation of a liquid crystal cured layer kept in an oriented state and this liquid crystal cured layer constitutes a retardation film.

The content of the polymerizable crystal liquid compound in the retardation film is usually 70 to 99.5 parts by mass, preferably 80 to 99 parts by mass, more preferably 80 to 94 parts by mass, and even more preferably 80 to 90 parts by mass based on 100 parts by mass of the solid content of the composition for forming an optically anisotropic layer. The solid content in this description means the total amount of components excluding a solvent from the composition for forming an optically anisotropic layer.

The composition for forming an optically anisotropic layer may contain known components such as a solvent, photopolymerization initiator, polymerization inhibitor, photosensitizer, and leveling agent other than the polymerizable liquid crystal compound.

Solvent

The solvent is preferably an organic solvent capable of dissolving the structural components of the composition for forming an optically anisotropic layer such as the polymerizable liquid crystal compound and more preferably a solvent which can dissolve the structural components of the composition for forming an optically anisotropic layer such as the polymerizable liquid crystal compound and is inert to the polymerization reaction of the polymerizable liquid crystal compound. Examples of the solvent include water; alcohol solvents such as methanol, ethanol, ethylene glycol, isopropyl alcohol, propylene glycol, methyl cellosolve, butyl cellosolve, propylene glycol monomethyl ether, and phenol; ester solvents such as ethyl acetate, butyl acetate, ethylene glycol methyl ether acetate, γ-butyrolactone, propylene glycol methyl ether acetate, and ethyl lactate; ketone solvents such as acetone, methyl ethyl ketone, cyclopentanone, cyclohexanone, methyl amyl ketone, and methyl isobutyl ketone; non-chlorinated aliphatic hydrocarbon solvents such as pentane, hexane, and heptane; non-chlorinated aromatic hydrocarbon solvents such as toluene and xylene; nitrile solvents such as acetonitrile; ether solvents such as tetrahydrofuran and dimethoxyethane; and chlorinated hydrocarbon solvents such as chloroform and chlorobenzene. Two or more types of organic solvents may be used in combinations. Among these solvents, alcohol solvents, ester solvents, ketone solvents, non-chlorinated aliphatic hydrocarbon solvents, and non-chlorinated aromatic hydrocarbon solvents are preferable.

The content of the solvent is preferably 10 to 10000 parts by mass and more preferably 100 to 5000 parts by mass based on 100 parts by mass of the total content of the composition for forming an optically anisotropic layer. The concentration of the solid of the composition for forming an optically anisotropic layer is preferably 2 to 50% by mass and more preferably 5 to 50% by mass. The term "solid content" means the total content of components excluding a solvent from the composition for forming an optically anisotropic layer.

Photopolymerization Initiator

As the photopolymerization initiator, those generating radicals by light irradiation are preferable. Examples of the photopolymerization initiator include benzoin compounds, benzophenone compounds, benzylketal compounds, α-hydroxyketone compounds, α-aminoketone compounds, α-acetophenone compounds, triazine compounds, iodonium salts, and sulfonium salts. Specifically, examples of the photopolymerization initiator include Irgacure (registered trademark) 907, Irgacure 184, Irgacure 651, Irgacure 819, Irgacure 250, and Irgacure 369 (the above products are all manufactured by BASF Japan Ltd.), SEIKUOL (registered trademark) BZ, SEIKUOL Z, and SEIKUOL BEE (the above products are all manufactured by Seiko Chemical Co., Ltd.), Kayacure (registered trademark) BP100 (manufactured by Nippon Kayaku Co., Ltd.) and Kayacure UVI-6992 (manufactured by Dow Chemical Co., Ltd.), ADEKA OPTOMER (registered trademark) SP-152 and ADEKA OPTOMER SP-170 (manufactured by Adeka Corporation), TAZ-A and TAZ-PP (the above products are all manufactured by Siber Hegner Ltd.), and TAZ-104 (manufactured by Sanwa Chemical Co., Ltd.). Among these products, α-acetophenone compounds are preferable. Examples of the α-acetophenone compound include 2-methyl-2-morpholino-1-(4-methylsulfanylphenyl)propan-1-on e, 2-dimethylamino-1-(4-morpholinophenyl)-2-benzylbutan-1-one, and 2-dimethylamino-1-(4-morpholinophenyl)-2-(4-methylphenylmethyl)butan-1-one, and more preferably 2-methyl-2-morpholino-1-(4-methylsulfanylphenyl)propan-1-one and 2-dimethylamino-1-(4-morpholinophenyl)-2-benzylbutan-1-one. Examples of commercially available products of the α-acetophenone compound include Irgacure 369, 379EG, and 907 (manufactured by BASF Japan Ltd.) and SEIKUOL BEE (manufactured by Seiko Chemical Co., Ltd.).

The photopolymerization initiator has a maximum absorption wavelength of preferably 300 nm to 380 nm and more preferably 300 nm to 360 nm because this ensures efficient utilization of the energy emitted from a light source and high productivity.

The content of the polymerization initiator is usually 0.1 to 30 parts by mass and preferably 0.5 to 10 parts by mass based on 100 parts by mass of the polymerizable liquid crystal compound in order to polymerize the polymerizable liquid crystal compound without disturbing the orientation of the polymerizable liquid crystal compound.

Polymerization Inhibitor

The polymerization inhibitor can control the polymerization reaction of the polymerizable liquid crystal compound. Examples of the polymerization inhibitor include hydroquinone, methoquinone, 3,5-di-tert-butyl-4-hydroxytoluene (BHT), and hydroquinones having a substituent such as alkyl ethers; catechols having a substituent such as alkyl ethers, such as butylcatechol; pyrogallols; radical scavengers such as a 2,2,6,6-tetramethyl-1-piperidinyloxy radical; thiophenols; β-naphthylamines, and β-naphthols.

The content of the polymerization inhibitor is usually 0.1 to 30 parts by mass and preferably 0.5 to 10 parts by mass based on 100 parts by mass of the polymerizable liquid crystal compound in order to polymerize the polymerizable liquid crystal compound without disturbing the orientation of the polymerizable liquid crystal compound.

Photosensitizer

Examples of the photosensitizer include xanthones such as xanthone and thioxanthone; anthracene and anthracenes having a substituent such as alkyl ethers; phenothiazine; rubrene.

When the photosensitizer is used, the photopolymerization initiator can be highly sensitized. The content of the photosensitizer is usually 0.1 to 30 parts by mass and preferably 0.5 to 10 parts by mass based on 100 parts by mass of the polymerizable liquid crystal compound.

Leveling Agent

Examples of the leveling agent include organic-modified silicone oil type, polyacrylate type, or perfluoroalkyl type leveling agents. Specifically, examples of the leveling agent include DC3PA, SH7PA, DC11PA, SH28PA, SH29PA, SH30PA, ST80PA, ST86PA, SH8400, SH8700, and FZ2123 (manufactured by Dow Corning Toray Co., Ltd.), KP321, KP323, KP324, KP326, KP340, KP341, X22-161A, and KF6001 (manufactured by Shin-Etsu Chemical Co., Ltd.), TSF400, TSF401, TSF410, TSF4300, TSF4440, TSF4445, TSF-4446, TSF4452, and TSF4460 (the above products are all manufactured by Momentive Performance Materials Inc.), Fluorinert (registered trademark) FC-72, FC-40, FC-43, and FC-3283 (the above products are all manufactured by Sumitomo 3M Limited), Megafac (registered trademark) R-08, R-30, R-90, F-410, F-411, F-443, F-445, F-470, F-477, F-479, F-482, and F-483 (the above products are all manufactured by DIC Corporation), F-Top (tradename) EF301, EF303, EF351, and EF352 (manufactured by Mitsubishi Materials Electronic Chemicals Co., Ltd.), Surflon (registered trademark) S-381, S-382, S-383, S-393, SC-101, SC-105, KH-40 and SA-100 (the above products are all manufactured by AGC Seimi Chemical Co., Ltd.), E1830 and E5844 (tradename, manufactured by Daikin Fine Chemical Research Institute), and BM-1000, BM-1100, BYK-352, BYK-353, and BYK-361N (trade name, manufactured by BM Chemie. Com.). Two or more types of leveling agents may be combined.

The use of the leveling agent enables the formation of an optically anisotropic layer having more smoothness. Also, the use of the leveling agent ensures that in the process of producing the optical film having the optically anisotropic layer, the fluidity of the composition for forming an optically anisotropic layer can be controlled and the crosslinking density of the retardation film can be regulated. The content of the leveling agent is usually 0.1 to 30 parts by mass and preferably 0.1 to 10 parts by mass based on 100 parts by mass of the polymerizable liquid crystal compound.

Furthermore, products obtained by applying a protection film to these optical films may also be used as the optical film. A transparent resin film is used as the protection film. Examples of the transparent resin include acetyl cellulose type resins typified by triacetyl cellulose and diacetyl cellulose, methacrylic resins typified by polymethylmethacrylate, polyester resins, polyolefin type resins, polycarbonate resins, polyether ether ketone resins, and polysulfone resins. A film added with a usual UV absorber, for example, a salicylate type compound, benzophenone type compound, benzotriazole type compound, triazine type compound, cyanoacrylate type compound, and nickel complex salt type compound is preferable as the resin constituting the protection film. This film can optimally reduce the deterioration of a display device by a synergetic effect with the effect of the invention of the optical laminate of this case. An acetyl cellulose type resin film such as a triacetyl cellulose film is preferably used as the protecting film.

The surface of the protection film to which surface a polarizing plate and a retardation film are not applied may be provided with a surface treating layer and may be provided with, for example, a hard coat layer, antiglare layer, antireflection layer, and antistatic layer.

Among the above optical films, many linearly polarizing plates are used in the situation where a protection film is applied to one surface or both surfaces of a polarizer constituting the polarizing plate, for example, a polarizer made from a polyvinyl alcohol resin. Usually, a pressure-sensitive adhesive layer is formed on one of the surfaces. Also, many elliptically polarizing plates obtained by laminating a polarizing plate and a retardation film are put in the condition where they are each provided with a protection film applied to one or both surfaces thereof. When a pressure-sensitive adhesive layer is formed on such an elliptically polarizing plate, it is usually formed on the surface on which a retardation film is formed. Also, a protect film which is to be peeled and removed after it is applied to a display device may be applied to a surface reverse to the surface on which the pressure-sensitive adhesive layer of the polarizing plate is formed, for the purpose of protecting the surface of the optical film from damages and dirt.

Also, in the optical laminate of the present invention, it is preferable to apply a releasable film to the surface of the pressure-sensitive adhesive layer for temporal adhering protection until it is used. The releasable film used here may be one obtained by using, as its substrate, various resins such as polyethylene terephthalate, polybutylene terephthalate, polycarbonate, and polyarylate and by performing release treatment such as silicone treatment on the interface between the substrate and the pressure-sensitive adhesive layer.

The optical laminate of the present invention may be produced by, for example, a method in which a pressure-sensitive adhesive composition like those mentioned above is applied to a releasable film like those mentioned above to form a pressure sensitive adhesive layer and an optical film is further laminated on the obtained pressure-sensitive adhesive layer or a method in which a pressure-sensitive adhesive composition is applied to an optical film to form a pressure-sensitive adhesive layer and a releasable film is applied to the pressure-sensitive adhesive layer to protect, thereby making an optical laminate.

The thickness of the optical laminate of the present invention is preferably 50 to 500 µm, more preferably 50 to 300 µm, and even more preferably 50 to 100 µm from the viewpoint of layer-thinning. In a preferred embodiment of the present invention, a thin-layer optical laminate can be provided without forming any protection film by formulating a light-selective absorption compound in the pressure-sensitive adhesive layer.

In another embodiment, the present invention provides a display device including the optical laminate of the present invention. Since the display device of the present invention includes the optical laminate of the present invention, it exhibits high absorption selectivity to a wavelength range around 400 nm and hence has high light fastness. This reduces the deterioration of structural members such as an optical film constituting the display device. Because light having a wavelength range around 420 nm is scarcely absorbed, on the other hand, blue light having a wavelength range exceeding 420 nm is not hindered, exhibiting excellent color expression and therefore, better display characteristics can be provided to the display device.

EXAMPLES

The present invention will be explained in more detail by way of examples and comparative examples, in which all designations of "%" and "parts" indicate "% by mass" and "parts by mass", respectively, unless otherwise noted.

In the following examples, the measurement of weight average molecular weight and number average molecular weight was made by using a gel permeation chromatography (hereinafter abbreviated as GPC) apparatus (GPC-8120, manufactured by Tosoh Corporation), five columns in total as the column (four columns "TSK gel XL, manufactured by Tosoh Corporation" and one column "Shodex GPC KF-802, manufactured by Showa Denko K.K.") which were arranged by connecting these columns in series, and tetrahydrofuran as the eluent in the conditions that the concentration of a sample was 5 mg/mL, the amount of a sample to be introduced was 100 μL, the temperature was 40° C., and the flow rate was 1 mL/min, to calculate the results in terms of standard polystyrene.

<Preparation of Acrylic Resin>

Acrylic resins (A) and (B) were prepared according to the compositions shown in Table 1 by the following method.

Polymerization Example 1

Preparation of Acrylic Resin (A)

A reaction container equipped with a cooling tube, a nitrogen introduction tube, a temperature gage, and a stirrer was charged with a mixture solution containing 81.8 parts of ethyl acetate as a solvent, 70.4 parts of butyl acrylate, 20.0 parts of methyl acrylate, and 8.0 parts of 2-phenoxyethyl acrylate as a monomer (A-1), 1.0 part of 2-hydroxyethyl acrylate as a monomer (A-2), and 0.6 parts of acrylic acid as a monomer (A-3) and the inside temperature was raised to 55° C. while the air inside the reaction container was replaced with nitrogen gas to exclude oxygen. Then, a solution prepared by dissolving 0.14 parts of azobisisobutyronitrile (polymerization initiator) in 10 parts of ethyl acetate was all added to the mixture. This temperature was kept for 1 hour after the initiator was added and then, ethyl acetate was successively added at an addition rate of 17.3 parts/hr to the inside of the reaction container while keeping the inside temperature of 54 to 56° C. The addition of ethyl acetate was stopped when the concentration of acrylic resin was 35% and further, the reaction mixture was kept at this temperature until 12 hours passed since the start of addition of ethyl acetate. Finally, ethyl acetate was added to adjust the concentration of acrylic resin to 20%, thereby preparing an ethyl acetate solution of acrylic resin. The obtained acrylic resin had an average molecular weight Mw of 1420000 in terms of polystyrene and had a Mw/Mn of 5.2 as measured by GPC. This acrylic resin was named an acrylic resin (A).

Polymerization Example 2

Preparation of Acrylic Resin (B)

A reaction container equipped with a cooling tube, a nitrogen introduction tube, a temperature gage, and a stirrer was charged with a mixture solution containing 81.8 parts of ethyl acetate as a solvent, 96.0 parts of butyl acrylate as a monomer (A-1) and 4.0 parts of acrylic acid as a monomer (A-3) and the inside temperature was raised to 55° C. while the air inside the reaction container was replaced with nitrogen gas to exclude oxygen. Then, a solution prepared by dissolving 0.14 parts of azobisisobutyronitrile (polymerization initiator) in 10 parts of ethyl acetate was all added to the mixture. This temperature was kept for 1 hour after the initiator added and then, ethyl acetate was successively added at an addition rate of 17.3 parts/hr to the inside of the reaction container while keeping the inside temperature of 54 to 56° C. The addition of ethyl acetate was stopped when the concentration of acrylic resin was 35% and further, the reaction mixture was kept at this temperature until 12 hours passed since the start of addition of ethyl acetate. Finally, ethyl acetate was added to adjust the concentration of acrylic resin to 20%, thereby preparing an ethyl acetate solution of acrylic resin. The obtained acrylic resin had an average molecular weight Mw of 756000 in terms of polystyrene and had a Mw/Mn of 4.1 as measured by GPC. This acrylic resin was named an acrylic resin (B).

TABLE 1

| Acrylic resin | | Monomer composition (parts by mass) | | | | Molecular weight (Mw) | Molecular weight distribution (Mw/Mn) |
|---|---|---|---|---|---|---|---|
| | | (A-1) | | | (A-2) | (A-3) | | |
| | | BA | MA | PEA | HEA | AA | | |
| Polymerization Example 1 | A | 70.4 | 20.0 | 8.0 | 1.0 | 0.6 | 1420000 | 5.2 |
| Polymerization Example 2 | B | 96.0 | | | | 4.0 | 756000 | 4.1 |

In Table 1, the symbols in the column of the monomer composition mean the following monomers respectively.

Monomer (A-1)
  BA: Butyl acrylate
  MA: Methyl acrylate
  PEA: 2-phenoxyethyl acrylate
Monomer (A-2)
  HEA: 2-Hydroxyethyl acrylate
Monomer (A-3)
  AA: Acrylic acid The acrylic resins produced above were used to prepare pressure-sensitive adhesive compositions, which were used to manufacture optical films of Examples and Comparative Examples. The following compounds were used as a crosslinking agent, silane compound, and light-selective absorption compound respectively.

Crosslinking Agent (B)

Coronate L: an ethyl acetate solution of a trimethylolpropane adduct of tolylene diisocyanate (solid concentration: 75%), manufactured by Nippon Polyurethane Co., Ltd.

Takenate D-110N: an ethyl acetate solution of a trimethylolpropane adduct of xylylene diisocyanate (solid concentration: 75%), manufactured by Mitsui Chemicals, Inc., (hereinafter abbreviated as "D110N")

Silane Compound

KBM-403: 3-glycidoxypropyltrimethoxysilane, liquid, manufactured by Shin-Etsu Chemical Co., Ltd., (hereinafter abbreviated as "KBM-403")

Light-Selective Absorption Compound

KEMISORB 111: 2,2'-dihydroxy-4-methoxybenzophenone, solid, manufactured by Chemipro Kaseikaisha Ltd., (hereinafter abbreviated as "KEMISORB 111")

KEMISORB 73: 2-(3,5-di-tert-amyl-2-hydroxyphenyl) benzotriazole, solid, manufactured by Chemipro Kaseikaisha Ltd., (hereinafter abbreviated as "KEMISORB 73")

SUMISORB 300: 2-(3-tert-butyl-2-hydroxy-5-methylphenyl)-5-chlorobenzotriazole, solid, manufactured by Sumitomo Chemical Co., Ltd., (hereinafter abbreviated as "SUMISORB 300")

KEMISORB 10: 2,4-dihydroxybenzophenone, solid, manufactured by Chemipro Kaseikaisha Ltd., (hereinafter abbreviated as "KEMISORB 10")

KEMISORB 11: 2-hydroxy-4-methoxybenzophenone, solid, manufactured by Chemipro Kaseikaisha Ltd., (hereinafter abbreviated as "KEMISORB 11")

KEMISORB 12: 2-hydroxy-4-n-octyloxybenzophenone, solid, manufactured by Chemipro Kaseikaisha Ltd., (hereinafter abbreviated as "KEMISORB 12")

Tinuvin 460: 2,4-bis[2-hydroxy-4-butoxyphenyl]-6-(2,4-dibutoxyphenyl)-1, 3,-5-triazine, solid, manufactured by BASF Japan Ltd. (hereinafter abbreviated as "Tinuvin 460")

Tinuvin 477: solid, manufactured by BASF Japan Ltd. (hereinafter abbreviated as "Tinuvin 477")

Tinuvin 479: solid, manufactured by BASF Japan Ltd. (hereinafter abbreviated as "Tinuvin 479")

Synthesis of a Light-Selective Absorption Compound

Synthetic Example 1

[Chem. 96]

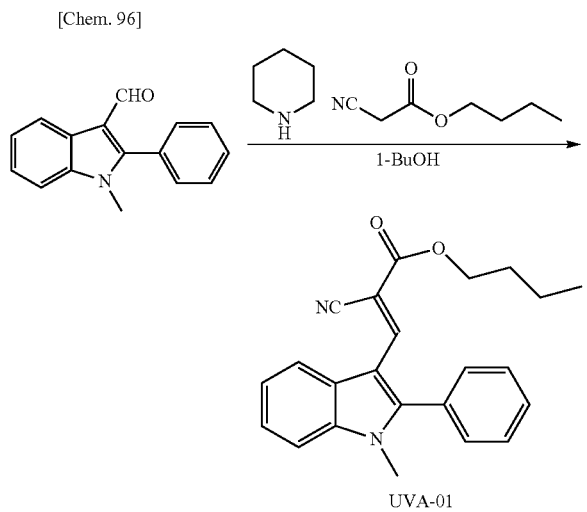

UVA-01

A 100 mL-four-neck flask equipped with a Dimroth cooling tube and a temperature gage, in which the inside atmosphere was replaced with a nitrogen atmosphere was charged with 2.0 g of 2-phenyl-1-methylindole-3-carboxyaldehyde, 0.72 g of piperidine (manufactured by Wako Pure Chemical Industries, Ltd.), 1.3 g of butyl cyanoacetate (manufactured by Tokyo Chemical Industry Co., Ltd.), and 8 g of 1-butanol and the mixture was stirred by a magnetic stirrer. The mixture was heated in an oil bath and kept at an inside temperature of 80° C. for 18 hours. After the reaction was completed, the reaction mixture was cooled to ambient temperature and the precipitated crystals was collected by filtration, followed by drying the crystals under reduced pressure at 60° C., to obtain 2.7 g of UVA-01 as yellow powder. The yield was 87%. Also, maximum absorption wave length (λmax) was measured using a spectrophotometer UV-3150 (manufactured by Shimadzu Corporation), to find that λmax=386 nm (in 2-butanone), the value of ε(400) was 59 L/(g·cm), and the value of ε(420)/ε(400) was 0.15.

$^1$H-NMR analysis was made, and as a result, the following peaks were observed, to thereby confirm that the compound UVA-01 was produced.

$^1$H-NMR (CDCl3) δ: 0.94 (t, 3H), 1.42 (sext, 2H), 1.69 (quin, 2H), 3.71 (s, 3H), 4.23 (t, 2H), 7.40-7.43 (m, 5H), 7.56-7.58 (m, 3H), 8.14 (s, 1H), 8.45-8.47 (m, 1H)

Synthetic Example 2

[Chem. 97]

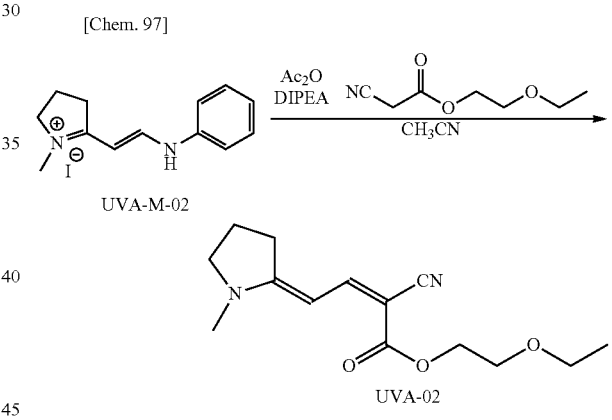

UVA-02

A 200 mL-four-neck flask equipped with a Dimroth cooling tube and a temperature gage in which the inside atmosphere was replaced with a nitrogen atmosphere was charged with 10 g of UVA-M-02 powder synthesized with reference to Patent Document (JP-A-2014-194508), 3.7 g of acetic acid anhydride (manufactured by Wako Pure Chemical Industries, Ltd.), 5.8 g of 2-ethoxyethyl cyanoacetate (manufactured by Tokyo Chemical Industry Co., Ltd.), and 60 g of acetonitrile (manufactured by Wako Pure Chemical Industries, Ltd.) and the mixture was stirred by a magnetic stirrer. 4.7 g of N,N-diisopropylethylamine (hereinafter abbreviated as DIPEA, manufactured by Tokyo Chemical Industry Co., Ltd.) was added dropwise to the mixture from a dropping funnel for 1 hour and the mixture was then kept at an inside temperature of 25° C. for further 2 hours after the addition was finished. After the reaction was completed, acetonitrile was removed from the mixture by using a vacuum evaporator and insoluble components generated by adding toluene to the obtained oily material were removed by filtration. The filtrate was concentrated again by using a vacuum evaporator, the concentrated solution was purified by column chromatography (silica gel), and the obtained product was recrystallized from toluene to obtain a target product. The obtained crystals were dried under reduced pressure at 60° C. to obtain 5.2 g of UVA-02 as yellow powder. The yield was 65%. Also, maximum absorption wavelength (λmax) was measured using a spectrophotometer UV-3150 (manufactured by Shimadzu Corporation), to find that λmax=389 nm (in 2-butanone), the value of ε(400) was 125 L/(g·cm), and the value of ε(420)/ε(400) was 0.015.

$^1$H-NMR analysis was made, and as a result, the following peaks were observed, to thereby confirm that the compound UVA-02 was produced.

$^1$H-NMR (CDCl3) δ: 1.21 (t, 3H), 2.10 (quin, 2H), 2.98-3.04 (m, 5H), 3.54-3.72 (m, 6H), 4.31 (t, 2H), 5.53 (d, 2H), 7.93 (d, 2H)

Synthetic Example 3

[Chem. 98]

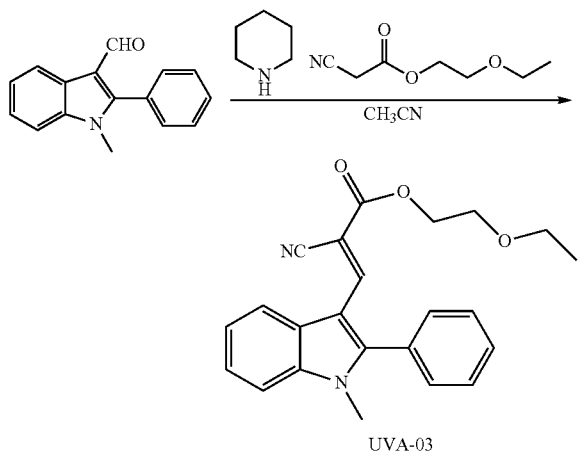

A 100 mL-four-neck flask equipped with a Dimroth cooling tube and a temperature gage in which the inside atmosphere was replaced with a nitrogen atmosphere was charged with 3.0 g of 2-phenyl-1-methylindole-3-carboxyaldehyde, 1.2 g of piperidine (manufactured by Wako Pure Chemical Industries, Ltd.), 2.2 g of 2-ethoxyethyl cyanoacetate (manufactured by Tokyo Chemical Industry Co., Ltd.), and 12 g of acetonitrile (manufactured by Wako Pure Chemical Industries, Ltd.) and the mixture was stirred by a magnetic stirrer. The mixture was heated in an oil bath and kept at an inside temperature of 80° C. for 18 hours. After the reaction was completed, the reaction mixture was cooled to ambient temperature to remove acetonitrile by a vacuum evaporator. The obtained crude crystals were dissolved in toluene and the toluene solution was liquid-washed totally two times with 1% hydrochloric acid in a separatory funnel and, in succession, separately washed with pure water until the pH of the water layer >6. After the washed toluene solution was dried by mirabilite, toluene was removed by a vacuum evaporator and the obtained crystals were dried under reduced pressure at 60° C. to obtain 4.0 g of UVA-03 as yellow powder. The yield was 84%. Also, maximum absorption wavelength (λmax) was measured using a spectrophotometer UV-3150 (manufactured by Shimadzu Corporation), to find that λmax=386 nm (in 2-butanone), the value of ε(400) was 51 L/(g·cm), and the value of ε(420)/ε(400) was 0.17.

$^1$H-NMR analysis was made, and as a result, the following peaks were observed, to thereby confirm that the compound UVA-03 was produced.

$^1$H-NMR (CDCl3) δ: 1.21 (t, 3H), 3.56 (q, 2H), 3.69-3.73 (m, 5H), 4.37 (m, 2H), 7.36-7.44 (m, 5H), 7.56-7.58 (m, 3H), 8.42-8.46 (m, 1H)

Synthetic Example 4

[Chem. 99]

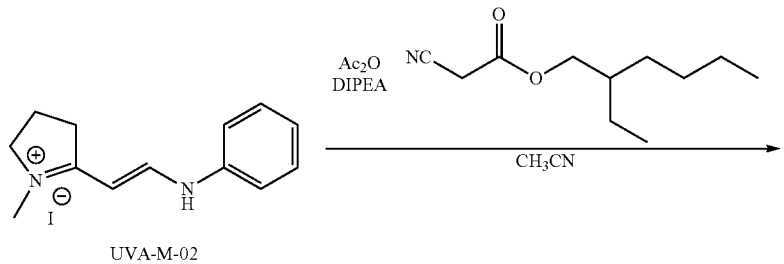

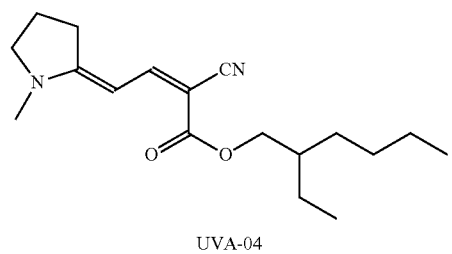

A 200 mL-four-neck flask equipped with a Dimroth cooling tube and a temperature gage in which the inside atmosphere was replaced with a nitrogen atmosphere was charged with 10 g of UVA-M-02 powder synthesized with reference to Patent Document (JP-A-2014-194508), 3.6 g of acetic acid anhydride (manufactured by Wako Pure Chemical Industries, Ltd.), 6.9 g of 2-ethylhexyl cyanoacetate (manufactured by Tokyo Chemical Industry Co., Ltd.), and 60 g of acetonitrile (manufactured by Wako Pure Chemical Industries, Ltd.) and the mixture was stirred by a magnetic stirrer. 4.5 g of DIPEA (manufactured by Tokyo Chemical Industry Co., Ltd.) was added dropwise to the mixture from a dropping funnel for 1 hour and the mixture was then kept at an inside temperature of 25° C. for 2 hours after the addition was finished. After the reaction was completed, acetonitrile was removed from the mixture by using a vacuum evaporator and the obtained product was purified by column chromatography (silica gel) and a solvent was removed from the effluent containing UVA-04 to obtain yellow crystals. The crystals were dried under reduced pressure at 60° C. to obtain 4.6 g of UVA-04 as yellow powder. The yield was 50%. Also, maximum absorption wavelength ($\lambda$max) was measured using a spectrophotometer UV-3150 (manufactured by Shimadzu Corporation), to find that $\lambda$max=389 nm (in 2-butanone), the value of $\epsilon(400)$ was 108 L/(g·cm), and the value of $\epsilon(420)/\epsilon(400)$ was 0.013.

$^1$H-NMR analysis was made, and as a result, the following peaks were observed, to thereby confirm that the compound UVA-04 was produced.

$^1$H-NMR (CDCl3) $\delta$: 0.87-0.94 (m, 6H), 1.32-1.67 (m, 8H), 1.59-1.66 (m, 2H), 2.09 (quin, 2H), 3.00 (m, 5H), 3.64 (t, 2H), 4.10 (dd, 2H), 5.52 (d, 2H), 7.87 (d, 2H)

Synthetic Example 5

[Chem. 100]

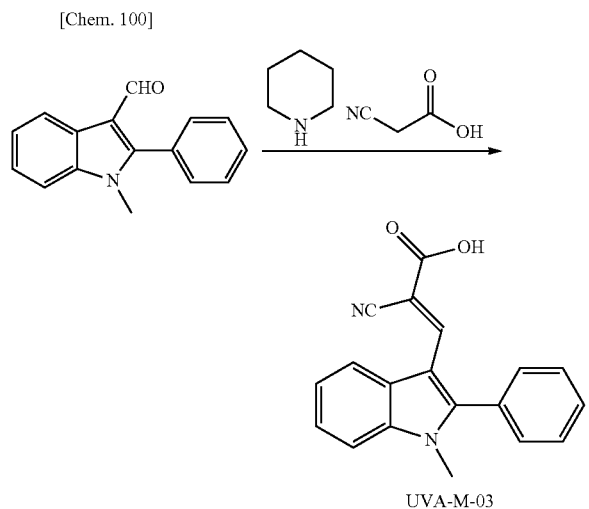

UVA-M-03

A 200 mL-four-neck flask equipped with a Dimroth cooling tube and a temperature gage in which the inside atmosphere was replaced with a nitrogen atmosphere was charged with 10.0 g of 2-phenyl-1-methylindole-3-carboxyaldehyde, 3.6 g of piperidine (manufactured by Wako Pure Chemical Industries, Ltd.), 4.0 g of cyanoacetic acid (manufactured by Tokyo Chemical Industry Co., Ltd.), and 40 g of ethanol (manufactured by Wako Pure Chemical Industries, Ltd.) and the mixture was stirred by a magnetic stirrer. The mixture was heated in an oil bath and kept at an inside temperature of 80° C. for 24 hours. After the reaction was completed, the reaction mixture was cooled to ambient temperature to collect the precipitated crystals by filtration and then the crystals were dried under reduced pressure at 60° C. to obtain 10 g of UVA-M-03 as yellow powder. The yield was 78%.

$^1$H-NMR analysis was made, and as a result, the following peaks were observed, to thereby confirm that the compound UVA-M-03 was produced.

$^1$H-NMR (DMSO-d6) $\delta$3.71 (s, 3H), 7.34-7.42 (m, 2H), 7.51-7.95 (m, 6H), 8.26-8.29 (m, 1H)

Synthetic Example 6

[Chem. 101]

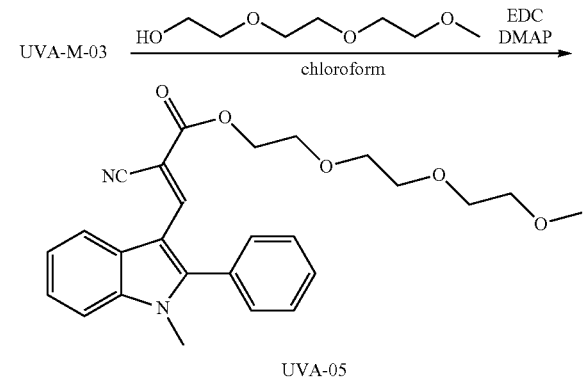

UVA-05

A 100 mL-four-neck flask equipped with a Dimroth cooling tube and a temperature gage in which the inside atmosphere was replaced with a nitrogen atmosphere was charged with 2.0 g of UVA-M-03 powder obtained in Synthetic Example 5, 1.2 g of triethylene glycol monomethyl ether (manufactured by Tokyo Chemical Industry Co., Ltd.), 20 mg of N,N-dimethyl-4-aminopyridine (DMAP, manufactured by Tokyo Chemical industry Co., Ltd.), and 8 g of chloroform and the mixture was stirred by a magnetic stirrer and cooled to an inside temperature of 0° C. in an ice bath. 1.4 g of 1-ethyl-3-(3-dimethylaminopropyl)carbodiimide hydrochloride (EDC, manufactured by Tokyo Chemical Industry Co., Ltd.) was dissolved in 2.0 g of chloroform and this solution was added dropwise to the inside of the flask kept at 0° C. from a dropping funnel for 2 hours. The obtained mixture was kept at 0° C. for further 6 hours after the addition was finished. After the reaction was finished, chloroform was removed from the mixture by a vacuum evaporator. The obtained oily product was dissolved in ethyl acetate to separately washed with 10% dilute sulfuric acid in a separatory funnel and, in succession, the ethyl acetate solution was separately washed with pure water until the pH of the water layer >6. The washed organic layer was dried by mirabilite and ethyl acetate was removed by a vacuum evaporator after removing mirabilite to obtain 2.5 g of target compound UVA-05 as a yellow oily product. The yield was 83%. Also, maximum absorption wavelength ($\lambda$max) was measured using a spectrophotometer UV-3150 (manufactured by Shimadzu Corporation), to find that $\lambda$max=387 nm (in 2-butanone), the value of $\epsilon(400)$ was 51 L/(g·cm), and the value of $\epsilon(420)/\epsilon(400)$ was 0.16.

¹H-NMR analysis was made, and as a result, the following peaks were observed, to thereby confirm that the compound UVA-05 was produced.

¹H-NMR (CDCl3) δ: 1.26 (t, 1H), 2.04 (s, 1H), 3.37 (s, 3H), 3.64-3.71 (m, 12H), 4.37 (dd, 2H), 7.35-7.46 (m, 5H), 7.54-7.59 (m, 3H), 8.42-8.46 (m, 1H)

Synthetic Example 7

[Chem. 102]

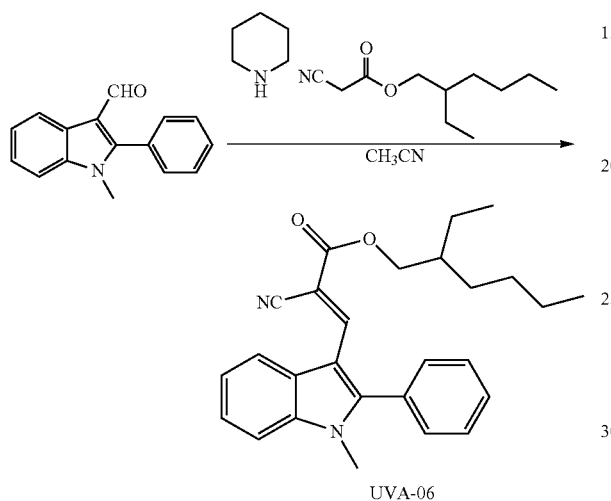

A 100 mL-four-neck flask equipped with a Dimroth cooling tube and a temperature gage in which the inside atmosphere was replaced with a nitrogen atmosphere was charged with 3.0 g of 2-phenyl-1-methylindole-3-carboxyaldehyde, 1.2 g of piperidine (manufactured by Wako Pure Chemical Industries, Ltd.), 2.8 g of 2-ethylhexyl cyanoacetate (manufactured by Tokyo Chemical Industry Co., Ltd.), and 12 g of acetonitrile (manufactured by Wako Pure Chemical Industries, Ltd.) and the mixture was stirred by a magnetic stirrer. The mixture was heated in an oil bath and kept at an inside temperature of 80° C. for 18 hours. After the reaction was completed, the reaction mixture was cooled to ambient temperature to remove acetonitrile by a vacuum evaporator. The obtained oily product was dissolved in ethyl acetate and the ethyl acetate solution was separately washed totally two times with 1% hydrochloric acid in a separatory funnel and, in succession, separately washed with pure water until the pH of the water layer >6. After the washed ethyl acetate solution was dried by mirabilite, ethyl acetate was removed by a vacuum evaporator to obtain 5.5 g of UVA-06 as an orange oily product. The yield was 104%. Also, maximum absorption wavelength (λmax) was measured using a spectrophotometer UV-3150 (manufactured by Shimadzu Corporation), to find that λmax=386 nm (in 2-butanone), the value of ε(400) was 43 L/(g·cm), and the value of ε(420)/ε(400) was 0.14.

¹H-NMR analysis was made, and as a result, the following peaks were observed, to thereby confirm that the compound UVA-06 was produced.

¹H-NMR (CDCl3) δ: 0.90 (t, 6H), 1.03-1.62 (m, 10H), 2.35 (s, 1H), 3.72 (s, 3H), 4.13 (q, 2H), 7.16-7.26 (m, 1H), 7.36-7.44 (m, 4H), 7.56-7.58 (m, 2H), 8.44-8.49 (m, 1H)

Synthetic Example 8

[Chem. 103]

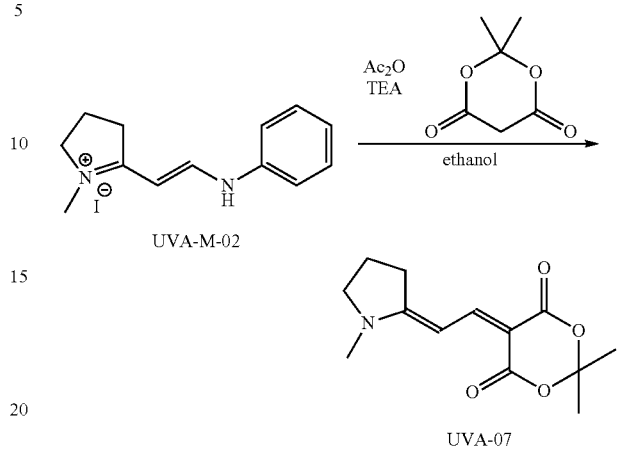

A 200 mL-four-neck flask equipped with a Dimroth cooling tube and a temperature gage in which the inside atmosphere was replaced with a nitrogen atmosphere was charged with 10 g of UVA-M-02 powder synthesized with reference to Patent Document (JP-A-2014-194508), 6.3 g of acetic acid anhydride (manufactured by Wako Pure Chemical Industries, Ltd.), 4.4 g of Meldrum's acid (manufactured by Tokyo Chemical industry Co., Ltd.), 6.3 g of triethylamine (manufactured by Wako Pure Chemical Industries, Ltd.), and 130 g of acetonitrile (manufactured by Wako Pure Chemical industries, Ltd.) and the mixture was stirred by a magnetic stirrer. The mixture was heated to an inside temperature of 78° C. by using an oil bath and kept at this temperature for 30 min. After the reaction was completed, the inside temperature was cooled to ambient temperature and acetonitrile was removed from the mixture by using a vacuum evaporator. The obtained oily product was purified by column chromatography (silica gel). A solvent was removed again by a vacuum evaporator from the column eluate including a target compound to obtain yellow crystals. The crystals were dried under reduced pressure at 60° C. to obtain 1.5 g of UVA-07 as yellow powder. The yield was 20%. Also, maximum absorption wavelength (λmax) was measured using a spectrophotometer UV-3150 (manufactured by Shimadzu Corporation), to find that λmax=389 nm (in 2-butanone), the value of ε(400) was 129 L/(g·cm), and the value of ε(420)/ε(400) was 0.039.

¹H-NMR analysis was made, and as a result, the following peaks were observed, to thereby confirm that the compound UVA-07 was produced.

¹H-NMR (CDCl3) δ: 1.70 (s, 6H), 2.16 (quin, 2H), 3.15-3.22 (m, 5H), 3.77 (t, 2H), 6.95 (d, 2H), 8.10 (d, 2H)

Synthetic Example 9

[Chem. 104]

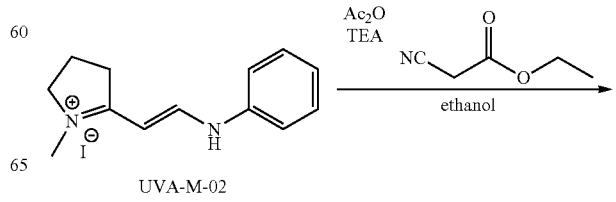

-continued

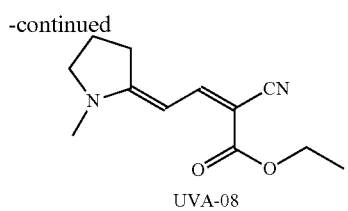
UVA-08

UVA-M-02 was synthesized according to the method described in Patent Document (DE101 09 243 A1). The purification was performed by using column chromatography (silica gel). Maximum absorption wavelength (λmax) was measured using a spectrophotometer UV-3150 (manufactured by Shimadzu Corporation), to find that λmax=389 nm (in 2-butanone), the value of ε(400) was 151 L/(g·cm), and the value of ε(420)/ε(400) was 0.019.

$^1$H-NMR analysis was made, and as a result, the following peaks were observed, to thereby confirm that the compound UVA-08 was produced.

$^1$H-NMR (CDCl3) δ: 1.31 (t, 3H), 2.09 (quin, 2H), 3.01 (m, 5H), 3.64 (t, 2H), 4.23 (q, 2H), 5.52 (d, 1H), 7.92 (d, 1H)

Synthetic Example 10

[Chem. 105]

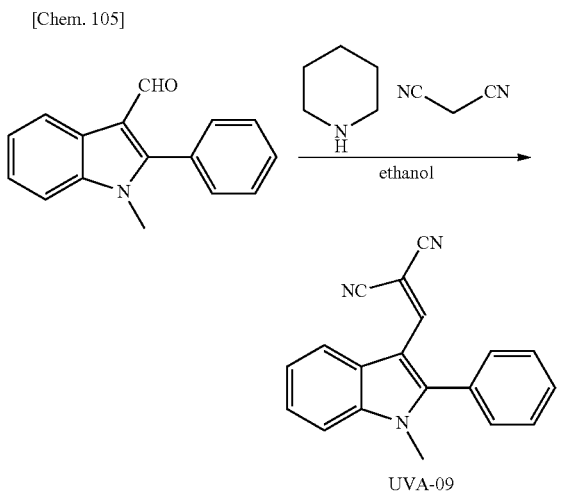

A 100 mL-four-neck flask equipped with a Dimroth cooling tube and a temperature gage in which the inside atmosphere was replaced with a nitrogen atmosphere was charged with 5.0 g of 2-phenyl-1-methylindole-3-carboxyaldehyde, 1.8 g of piperidine (manufactured by Wako Pure Chemical Industries, Ltd.), 1.5 g of malononitrile (manufactured by Tokyo Chemical Industry Co., Ltd.), and 20 g of ethanol (manufactured by Wako Pure Chemical Industries, Ltd.) and the mixture was stirred by a magnetic stirrer. The mixture was heated in an oil bath and kept at an inside temperature of 80° C. for 18 hours. After the reaction was completed, the reaction mixture was cooled to ambient temperature to collect the precipitated crystals by filtration and the crystals were dried at 60° C. under reduced pressure to obtain 4.9 g of UVA-09 as yellow powder. The yield was 82%. Also, maximum absorption wavelength (λmax) was measured using a spectrophotometer UV-3150 (manufactured by Shimadzu Corporation), to find that λmax=392 nm (in 2-butanone), the value of ε(400) was 115 L/(g·cm), and the value of ε(420)/ε(400) was 0.21.

$^1$H-NMR analysis was made, and as a result, the following peaks were observed, to thereby confirm that the compound UVA-09 was produced.

$^1$H-NMR (CDCl3) δ: 3.71 (s, 3H), 7.34-7.38 (m, 2H), 7.44-7.47 (m, 4H), 7.60-7.63 (m, 3H), 8.37-8.40 (m, 1H)

Synthetic Example 11

[Chem. 106]

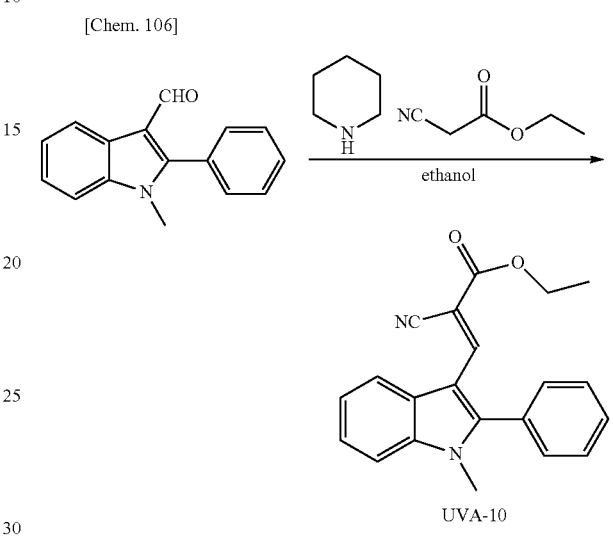
UVA-10

A 100 mL-four-neck flask equipped with a Dimroth cooling tube and a temperature gage in which the inside atmosphere was replaced with a nitrogen atmosphere was charged with 3.0 g of 2-phenyl-1-methylindole-3-carboxyaldehyde, 1.1 g of piperidine (manufactured by Wako Pure Chemical Industries, Ltd.), 1.6 g of ethyl cyanoacetate (manufactured by Tokyo Chemical Industry Co., Ltd.), and 12 g of ethanol (manufactured by Wako Pure Chemical Industries, Ltd.) and the mixture was stirred by a magnetic stirrer. The mixture was heated in an oil bath and kept at an inside temperature of 80° C. for 18 hours. After the reaction was completed, the reaction mixture was cooled to ambient temperature to collect the precipitated crystals by filtration and the crystals were dried at 60° C. under reduced pressure to obtain 3.6 g of UVA-10 as yellow powder. The yield was 85%. Also, maximum absorption wavelength (λmax) was measured using a spectrophotometer UV-3150 (manufactured by Shimadzu Corporation), to find that λmax=386 nm (in 2-butanone), the value of ε(400) was 66 L/(g·cm), and the value of ε(420)/ε(400) was 0.15.

$^1$H-NMR analysis was made, and as a result, the following peaks were observed, to thereby confirm that the compound UVA-10 was produced.

$^1$H-NMR (CDCl3) δ: 1.34 (t, 3H), 3.72 (s, 3H), 4.29 (q, 2H), 7.38-7.43 (m, 5H), 7.56-7.58 (m, 3H), 8.15 (s, 1H), 8.41-8.47 (m, 1H)

<Preparation of Pressure-Sensitive Adhesive Compositions and Pressure-Sensitive Adhesive Sheets>

(a) Preparation of Pressure-sensitive adhesive compositions (Production Examples 1 to 39)

An acrylic resin, light-selective absorption compound (UV absorber), crosslinking agent, and silane compound described in the following Table 2 were mixed to manufacture a pressure-sensitive adhesive composition. In this case, the amount of each component in Table 2 is parts by mass based on 100 parts by mass of the solid content of the acrylic resin manufactured in the aforementioned Polymerization Examples 1 to 11. Also, the crosslinking agent and light-selective absorption compound were each added in the form of a 2-butanone solution to the acrylic resin.

(a-1) Preparation of Pressure-Sensitive Adhesive Compositions of Production Examples 1 to 24

A crosslinking agent, silane compound, and light-selective absorption compound were each added in the amount described in Table 2 based on 100 parts by mass of the solid content of the acrylic resin (A) according to the formulation shown in Table 2. Moreover, 2-butanone was added such that the concentration of the solid content was 14% and these ingredients were mixed at 300 rpm for 30 min with stirring using a stirrer (Three-One Motor, manufactured by YAMATO POLYMER CO., LTD.) to prepare each pressure-sensitive adhesive composition.

(a-2) Preparation of Pressure-Sensitive Adhesive Compositions of Production Examples 25 to 39

Each pressure-sensitive adhesive composition was prepared in the same method as in the Production Examples 1 to 24 according to the formulations shown in Table 2 except that the acrylic resin (A) was altered to the acrylic resin (B).

(b) Production of Pressure-Sensitive Adhesive Sheets

Each pressure-sensitive adhesive composition prepared in the above (a) was applied to the releasably treated surface of a polyethylene terephthalate film (SP-PLR382050, manufactured by Lintec Corporation, hereinafter abbreviated as "separator") by an applicator such that the thickness of the dried pressure-sensitive adhesive layer was 20 μm, followed by drying at 100° C. for 1 min to manufacture a pressure-sensitive adhesive sheet.

<Production of Optical Laminates (Examples 1 to 31, Comparative Examples 1 to 6, and Reference Examples 1 and 2>

The polymer film, apparatuses, and measurement methods used to make the optical laminates are as follows.

ZF-14 manufactured by Zeon Corporation was used as the cycloolefin polymer (COP).

AGF-B10 manufactured by Kasuga Electric Works Ltd. was used as the corona treatment apparatus.

Corona treatment was performed once using the above corona treatment apparatus in the condition of an output of 0.3 kW and treating rate of 3 m/min.

SPOT CURE SP-7 with a polarizer unit manufactured by USHIO INC. was used as the polarized UV irradiation apparatus.

TABLE 2

| | | Composition of Pressure-sensitive adhesive composition | | | | | |
|---|---|---|---|---|---|---|---|
| | | Light-selective absorption compound (UV absorber) | | Crosslinking agent | | Silane compound | |
| Production Example | Acrylic resin Name | Name | Amount (parts by mass) | Name | Amount (parts by mass) | Name | Amount (parts by mass) |
| 1 | A | None | None | Coronate L | 0.50 | KBM-403 | 0.50 |
| 2 | A | UVA-01 | 1.10 | Coronate L | 0.50 | KBM-403 | 0.50 |
| 3 | A | UVA-02 | 0.61 | Coronate L | 0.50 | KBM-403 | 0.50 |
| 4 | A | UVA-03 | 1.20 | Coronate L | 0.50 | KBM-403 | 0.50 |
| 5 | A | UVA-03 | 1.70 | Coronate L | 0.50 | KBM-403 | 0.50 |
| 6 | A | UVA-04 | 1.20 | Coronate L | 0.50 | KBM-403 | 0.50 |
| 7 | A | UVA-05 | 1.20 | Coronate L | 0.50 | KBM-403 | 0.50 |
| 8 | A | UVA-05 | 1.70 | Coronate L | 0.50 | KBM-403 | 0.50 |
| 9 | A | UVA-06 | 1.50 | Coronate L | 0.50 | KBM-403 | 0.50 |
| 10 | A | UVA-06 | 2.00 | Coronate L | 0.50 | KBM-403 | 0.50 |
| 11 | A | UVA-07 | 0.69 | Coronate L | 0.50 | KBM-403 | 0.50 |
| 12 | A | UVA-08 | 0.75 | Coronate L | 0.50 | KBM-403 | 0.50 |
| 13 | A | UVA-09 | 0.50 | Coronate L | 0.50 | KBM-403 | 0.50 |
| 14 | A | UVA-09 | 0.70 | Coronate L | 0.50 | KBM-403 | 0.50 |
| 15 | A | UVA-10 | 0.95 | Coronate L | 0.50 | KBM-403 | 0.50 |
| 16 | A | KEMISORB 111 | 7.00 | Coronate L | 0.50 | KBM-403 | 0.50 |
| 17 | A | KEMISORB 73 | 6.20 | Coronate L | 0.50 | KBM-403 | 0.50 |
| 18 | A | SUMISORB 300 | 5.00 | Coronate L | 0.50 | KBM-403 | 0.50 |
| 19 | A | KEMISORB 10 | 10.0 | Coronate L | 0.50 | KBM-403 | 0.50 |
| 20 | A | KEMISORB 111 | 10.0 | Coronate L | 0.50 | KBM-403 | 0.50 |
| 21 | A | KEMISORB 12 | 10.0 | Coronate L | 0.50 | KBM-403 | 0.50 |
| 22 | A | Tinuvin 460 | 10.0 | Coronate L | 0.50 | KBM-403 | 0.50 |
| 23 | A | Tinuvin 477 | 10.0 | Coronate L | 0.50 | KBM-403 | 0.50 |
| 24 | A | Tinuvin 479 | 10.0 | Coronate L | 0.50 | KBM-403 | 0.50 |
| 25 | B | なし | なし | Coronate L | 0.50 | KBM-403 | 0.50 |
| 26 | B | UVA-01 | 1.10 | Coronate L | 0.50 | KBM-403 | 0.50 |
| 27 | B | UVA-02 | 0.61 | Coronate L | 0.50 | KBM-403 | 0.50 |
| 28 | B | UVA-03 | 1.20 | Coronate L | 0.50 | KBM-403 | 0.50 |
| 29 | B | UVA-03 | 1.70 | Coronate L | 0.50 | KBM-403 | 0.50 |
| 30 | B | UVA-04 | 1.20 | Coronate L | 0.50 | KBM-403 | 0.50 |
| 31 | B | UVA-05 | 1.20 | Coronate L | 0.50 | KBM-403 | 0.50 |
| 32 | B | UVA-05 | 1.70 | Coronate L | 0.50 | KBM-403 | 0.50 |
| 33 | B | UVA-06 | 1.50 | Coronate L | 0.50 | KBM-403 | 0.50 |
| 34 | B | UVA-06 | 2.00 | Coronate L | 0.50 | KBM-403 | 0.50 |
| 35 | B | UVA-07 | 0.69 | Coronate L | 0.50 | KBM-403 | 0.50 |
| 36 | B | UVA-08 | 0.75 | Coronate L | 0.50 | KBM-403 | 0.50 |
| 37 | B | UVA-09 | 0.50 | Coronate L | 0.50 | KBM-403 | 0.50 |
| 38 | B | UVA-09 | 0.70 | Coronate L | 0.50 | KBM-403 | 0.50 |
| 39 | B | UVA-10 | 0.95 | Coronate L | 0.50 | KBM-403 | 0.50 |

LEXT manufactured by Olympus Corporation was used as the laser microscope.

UNICURE VB-15201BY-A was used as the high-pressure mercury lamp.

Inplane retardation amount was measured using a birefringence measurement apparatus (KOBRA-WR, manufactured by Oji Scientific Instruments).

The layer thickness was measured using Ellipsometer M-220 manufactured by JASCO Corporation.

In the production of the optically anisotropic layer, laminate, and the like, the following "Composition for forming a photo-orientation layer", "Rubbing orientation polymer composition", "Composition including a polymerizable liquid crystal compound", and "Polarizing plate" were used.

<Preparation of Composition for Forming a Photo-Orientation Layer>

5 parts of a photo-orientation material having the following structure and 95 parts of cyclopentanone (solvent) were mixed as the components and the obtained mixture was stirred at 80° C. for 1 hour to obtain a composition for forming a photo-orientation layer. The following photo-orientation materials were synthesized by the method disclosed in JP-A-2013-33248.

[Chem. 107]

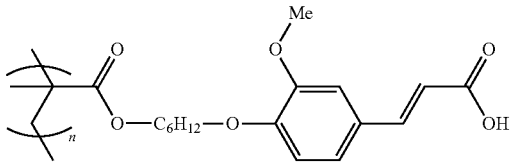

<Preparation of Composition A Containing a Polymerizable Liquid Crystal Compound>

A polymerizable liquid crystal compound A having the following structure, a polyacrylate compound (leveling agent) (BYK-361N; manufactured by BYK-Chemie. Com.), and the following polymerizable initiator and solvent were mixed as the components to obtain a composition containing a polymerizable liquid crystal compound.

Polymerizable Liquid Crystal Compound A (12.0 Parts):

[Chem. 108]

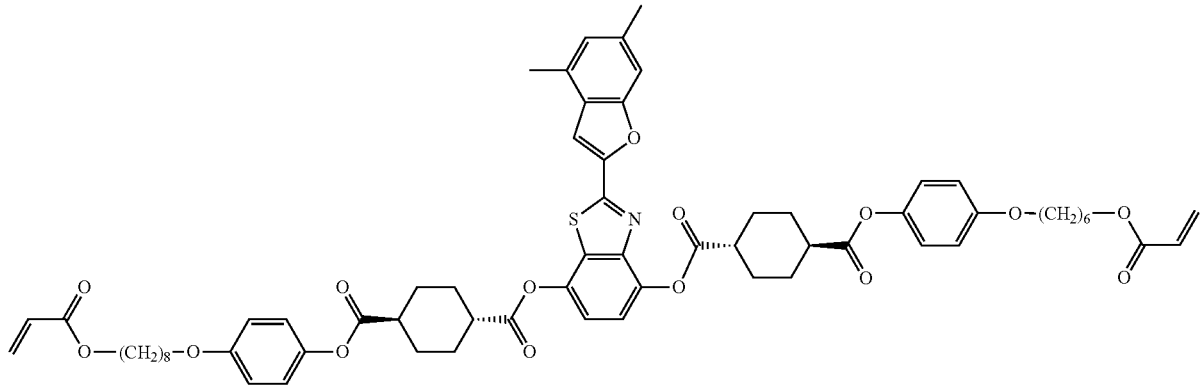

The polymerizable liquid crystal compound A was synthesized by the method described in JP-A-2010-31223. The maximum absorption wavelength λmax (LC) of the polymerizable liquid crystal compound was 350 nm.

Polymerization Initiator (0.72 Parts):

2-dimethylamino-2-benzyl-1-(4-morpholinophenyl)butan-1-one (Irgacure 369; manufactured by Ciba Specialty Chemicals Inc.)

Leveling agent (0.12 parts): Polyacrylate compound (BYK-361N; manufactured by BYK-Chemie. Com.)

Solvent: Cyclopentanone (100 parts)

Example 1

<Production of Polarizing Plate>

A polyvinyl alcohol film (average polymerization degree: about 2400, degree of saponification: 99.9 mol % or more) having a thickness of 30 μm was uniaxially stretched at a stretch ratio of 4 by dry stretching. Further, the stretched film was dipped in 40° C. pure water for 40 seconds with keeping its tensional state and then, dipped at 28° C. for 30 seconds in an aqueous dye solution containing iodine/potassium iodide/water in a ratio by weight of 0.044/5.7/100 to carry out dyeing treatment. After that, the film was dipped at 70° C. for 120 seconds in an aqueous boric acid solution containing potassium iodide/boric acid/water in a ratio by weight of 11.0/6.2/100. In succession, the film was washed with 8° C. pure water for 15 seconds and then, dried at 60° C. for 50 seconds and then, at 75° C. for 20 seconds with keeping it under a tension of 300 N to obtain a 12-μm-thick polarizer in which iodine is adsorbed to and oriented on a polyvinyl alcohol film.

The obtained polarizer and a cycloolefin polymer film (COP; ZF-4, manufactured by Zeon Corporation, non-UV absorption ability, 30 μm) were applied to each other by a nip roll after an aqueous adhesive was poured into a space between the both. The obtained laminate was dried at 60° C. for 2 minutes with keeping it under a tension of 430 N/m to obtain a 42-μm-thick polarizing plate formed with a cycloolefin film as a protection film on one surface. In this case, the above aqueous adhesive was prepared by adding 3 parts of carboxyl group-modified polyvinyl alcohol (KURARAY POVAL KL318, manufactured by Kuraray Co., Ltd.) and 1.5 parts of a water-soluble polyamide epoxy resin (Sumirez Resin 650, manufactured by Sumika Chemtex Co., Ltd., aqueous solution having a solid concentration of 30%) in 100 parts of water.

The degree of polarization Py and single transmittance Ty of the obtained polarizing plate were measured in the following manner.

The single transmittance ($T^1$) in the direction of transmission axis and the single transmittance ($T^2$) in the direction of absorption axis were measured using an apparatus structured by setting a folder with a polarizer to a spectrophotometer (UV-3150, manufactured by Shimadzu Corporation) in a wavelength range from 380 to 680 nm, with a 2-nm step according to a double beam method. The single transmittance and degree of polarization at each wavelength were calculated using the following formulae (p) and (q) and also, these results were corrected by luminous correction using 2° visual field (C light source) according to JIS Z8701 to calculate a luminous transmittance (Ty) and luminous degree of polarization (Py). As a result, an absorption type polarizing plate was obtained which had a luminous transmittance (Ty) of 43.0% and a luminous degree of polarization (Py) of 99.99%.

Single transmittance $Ty$ (%)=$\{(T^1+T^2)/2\}\times 100$ (p)

Degree of polarization $Py$ (%)=$\{(T^1-T^2)/(T^1+T^2)\}\times 100$ (q)

<Production of Optically Anisotropic Layer>

A cycloolefin polymer film (COP; ZF-14, manufactured by Zeon Corporation) was treated once using a corona treatment apparatus (AGF-B10 manufactured by Kasuga Electric Works Ltd.) in the condition of an output of 0.3 kW and treating rate of 3 m/min. The composition for forming a photo-orientation layer was applied, using a bar coater, to the surface treated by corona treatment, dried at 80° C. for 1 min, and exposed to polarized UV light at an integral dose of light of 100 J/cm$^2$ by using a polarized UV irradiation apparatus (SPOT CURE SP-7; manufactured by USHIO INC.). The layer thickness of the obtained orientation film was measured by an Ellipsometer, to find that it was 100 nm.

In succession, a coating solution consisting of a composition A containing the previously prepared polymerizable liquid crystal compound was applied to the orientation layer by a bar coater and dried at 120° C. for 1 min. Then, using a high-pressure mercury lamp (Unicure VB-15201 BY-A, manufactured by USHIO INC.), the orientation layer was irradiated with ultraviolet rays (in a nitrogen atmosphere, integral dose of light at a wavelength of 313 nm: 500 mJ/cm) from the surface to which the composition containing the polymerizable liquid crystal compound was applied to thereby form an optical film including the optically anisotropic layer 1. The layer thickness of obtained optically anisotropic layer 1 was measured by a laser microscope, to find that it was 2 µm.

The pressure-sensitive adhesive composition manufactured in Production Example 2 was applied to the optically anisotropic layer 1 side surface of the obtained optical film and then, the optical film was applied to the polarizing plate which was treated once using a corona treatment apparatus (AGF-B10 manufactured by Kasuga Electric Works Ltd.) in the condition of an output of 0.3 kW and treating rate of 3 m/min. At this time, the optical film was laminated in such a manner that the slow axis of the optically anisotropic layer formed at an angle of 45° with the absorption axis of the polarizing plate to form a circularly polarizing plate. Then, the COP film of the substrate was peeled off to thereby obtain an optical laminate 1 (circularly polarizing plate 1) in which the optically anisotropic layer 1 was transferred to the polarizing plate. The thickness of the obtained optical laminate 1 was 64 µm.

The optical laminate 1 was transferred to glass to manufacture a measurement sample for the purpose of measuring the optical characteristics of the optical laminate 1. The retardation amounts of the sample at wavelengths of 450 nm, 550 nm, and 630 nm were measured using a birefringence measurement apparatus (KOBRA-WR, manufactured by Oji Scientific Instruments) and the transmittances of the sample at wavelengths of 400 nm and 420 nm by a spectral photometer (UV-3150; manufactured by Shimadzu Corporation). In this case, a polarizing prism was disposed on the light source side to make completely linearly polarized light and the measuring sample was irradiated with this linearly polarized light to measure. At this time, the absorbance A (400) of the optical laminate at a wavelength of 400 nm in the direction of the transmission of the polarizing plate and the absorbance A (420) of the optical laminate at a wavelength of 420 nm in the direction of the transmission of the polarizing plate were measured by allowing the linearly polarized light to be incident to the optical laminate in parallel to the transmission axis of the polarizing plate side of the optical laminate. The results are shown in Table 3. The optical laminate 1 exhibited all the characteristics represented by the following formulae (8) to (12).

$A(400) \geq 0.50$ (8)

$A(420)/A(400) \leq 0.30$ (9)

$100\ nm \leq Re(550) \leq 170\ nm$ (10)

$Re(450)/Re(550) \leq 1.00$ (11)

$1.00 \leq Re(630)/Re(550)$ (12)

Examples 2 to 31, Reference Examples 1 and 2, and Comparative Examples 1 to 6

Each optical laminate (circularly polarized plate) to which an optically anisotropic layer was transferred was manufactured using the pressure-sensitive adhesive composition described in the following Table 3 in the same manner as in Example 1. The optical characteristics of obtained optical laminate (circularly polarizing plate) were measured in the same method as in Example 1.

TABLE 3

|  |  | Pressure-sensitive adhesive composition | | Optical characteristics of Optical laminate (circularly polarizing plate) | | | | | |
| --- | --- | --- | --- | --- | --- | --- | --- | --- | --- |
|  | Production Example | Light-selective absorption compound (UV absorbent) | Amount (parts by mass) | A (400) | A (420) | A (420)/ A (400) | Re (450) | Re (550) | Re (630) |
| Reference Example 1 | 1 | None | None | 0.39 | 0.13 | 0.34 | 126 | 137 | 139 |
| Reference Example 2 | 25 | None | None | 0.39 | 0.11 | 0.28 | 126 | 137 | 139 |
| Example 1 | 2 | UVA-01 | 1.10 | 2.0 | 0.48 | 0.24 | 123 | 135 | 137 |
| Example 2 | 3 | UVA-02 | 0.61 | 2.1 | 0.21 | 0.10 | 125 | 136 | 138 |
| Example 3 | 4 | UVA-03 | 1.20 | 1.7 | 0.45 | 0.26 | 125 | 137 | 139 |
| Example 4 | 5 | UVA-03 | 1.70 | 2.3 | 0.58 | 0.25 | 126 | 136 | 139 |
| Example 5 | 6 | UVA-04 | 1.20 | 3.4 | 0.25 | 0.07 | 126 | 138 | 140 |
| Example 6 | 7 | UVA-05 | 1.20 | 1.7 | 0.46 | 0.27 | 126 | 137 | 139 |

TABLE 3-continued

| | | Pressure-sensitive adhesive composition | | Optical characteristics of Optical laminate (circularly polarizing plate) | | | | | |
|---|---|---|---|---|---|---|---|---|---|
| | Production Example | Light-selective absorption compound (UV absorbent) | Amount (parts by mass) | A (400) | A (420) | A (420)/ A (400) | Re (450) | Re (550) | Re (630) |
| Example 7 | 8 | UVA-05 | 1.70 | 2.0 | 0.54 | 0.27 | 126 | 138 | 139 |
| Example 8 | 9 | UVA-06 | 1.50 | 1.7 | 0.43 | 0.25 | 125 | 136 | 138 |
| Example 9 | 10 | UVA-06 | 2.00 | 2.1 | 0.50 | 0.24 | 126 | 138 | 140 |
| Example 10 | 11 | UVA-07 | 0.69 | 1.4 | 0.18 | 0.13 | 124 | 136 | 137 |
| Example 11 | 26 | UVA-01 | 1.10 | 2.0 | 0.46 | 0.23 | 123 | 134 | 136 |
| Example 12 | 27 | UVA-02 | 0.61 | 2.1 | 0.20 | 0.09 | 124 | 136 | 138 |
| Example 13 | 28 | UVA-03 | 1.20 | 1.7 | 0.44 | 0.26 | 125 | 137 | 139 |
| Example 14 | 29 | UVA-03 | 1.70 | 2.3 | 0.58 | 0.26 | 125 | 138 | 139 |
| Example 15 | 30 | UVA-04 | 1.20 | 3.4 | 0.23 | 0.07 | 126 | 138 | 139 |
| Example 16 | 31 | UVA-05 | 1.20 | 1.7 | 0.44 | 0.26 | 126 | 137 | 139 |
| Example 17 | 32 | UVA-05 | 1.70 | 2.0 | 0.55 | 0.27 | 125 | 137 | 139 |
| Example 18 | 33 | UVA-06 | 1.50 | 1.7 | 0.42 | 0.24 | 125 | 136 | 138 |
| Example 19 | 34 | UVA-06 | 2.00 | 2.1 | 0.49 | 0.24 | 126 | 138 | 139 |
| Example 20 | 35 | UVA-07 | 0.69 | 1.4 | 0.19 | 0.14 | 124 | 138 | 137 |
| Example 21 | 12 | UVA-08 | 0.75 | 2.8 | 0.23 | 0.08 | 128 | 139 | 141 |
| Example 22 | 13 | UVA-09 | 0.50 | 1.4 | 0.38 | 0.27 | 123 | 135 | 137 |
| Example 23 | 14 | UVA-09 | 0.70 | 1.8 | 0.49 | 0.26 | 124 | 136 | 137 |
| Example 24 | 15 | UVA-10 | 0.95 | 2.0 | 0.52 | 0.26 | 122 | 134 | 136 |
| Example 25 | 36 | UVA-08 | 0.75 | 2.8 | 0.21 | 0.08 | 128 | 139 | 141 |
| Example 26 | 37 | UVA-09 | 0.50 | 1.4 | 0.39 | 0.27 | 124 | 135 | 137 |
| Example 27 | 38 | UVA-09 | 0.70 | 1.8 | 0.48 | 0.26 | 124 | 135 | 138 |
| Example 28 | 39 | UVA-10 | 0.95 | 2.0 | 0.52 | 0.26 | 123 | 134 | 137 |
| Example 29 | 16 | KEMISORB 111 | 7.00 | 0.93 | 0.21 | 0.23 | 126 | 137 | 139 |
| Example 30 | 17 | KEMISORB 73 | 6.20 | 0.91 | 0.20 | 0.22 | 126 | 138 | 139 |
| Example 31 | 18 | SUMISORB 300 | 5.00 | 0.95 | 0.20 | 0.21 | 125 | 137 | 139 |
| Comparative Example 1 | 19 | KEMISORB 10 | 10.0 | 0.53 | 0.25 | 0.48 | 126 | 138 | 139 |
| Comparative Example 2 | 20 | KEMISORB 111 | 10.0 | 0.56 | 0.27 | 0.47 | 125 | 137 | 139 |
| Comparative Example 3 | 21 | KEMISORB 12 | 10.0 | 0.53 | 0.25 | 0.47 | 125 | 137 | 139 |
| Comparative Example 4 | 22 | Tinuvin 460 | 10.0 | 0.60 | 0.25 | 0.42 | 125 | 137 | 139 |
| Comparative Example 5 | 23 | Tinuvin 477 | 10.0 | 0.65 | 0.25 | 0.39 | 126 | 138 | 139 |
| Comparative Example 6 | 24 | Tinuvin 479 | 10.0 | 0.54 | 0.25 | 0.47 | 125 | 137 | 139 |

<Evaluation of Optical Laminate>

With regard to each of the optical laminates obtained above, an optical durability test, heat resistance test, humidity heat resistance test, and heat shock resistance test were made to evaluate. In this case, each test was made according to the following method.

The optical durability test (expressed by "SWOM" in Table 4): The optical laminate was placed in SUNSHINE WEATHER METER (Model Number: SUNSHINE WEATHER METER S80, manufactured by Suga Instruments Co., Ltd.), irradiated with light for 100 hours to measure retardation amounts at wavelengths 450 nm, 550 nm, and 630 nm. The optical laminate was evaluated from variations in retardation amount before and after the optical durability test according to the standard shown below. The results are shown in Table 4.

Standard of evaluation of optical durability test
A: The variation of Re before and after the optical durability test is less than 5.
B: The variation of Re before and after the optical durability test is 5 or more and less than 10.
C: The variation of Re before and after the optical durability test is 10 or more.

Heat resistance test (expressed as "Heat resistance" in Table 4): The optical laminate was placed in a thermostat (Model Number: PL-3KT, manufactured by ESPEC CORPORATION) and allowed to stand in a dry condition at 85° C. for 250 hours and 500 hours respectively. Then, the appearance of the optical laminate was visually observed to evaluate according to the following standard of evaluation. The results are shown in Table 4.

Standard of evaluation of heat resistance test
A: Almost no variation in appearance such as lifting, delamination, and foaming is observed in the sample after 500 hours.
B: Almost no variation in appearance such as lifting, delamination, and foaming is not almost observed in the sample after 250 hours.
C: Significant variation in appearance such as lifting, delamination, and foaming is observed in the sample after 250 hours.

Humidity heat resistance test (expressed as "Humidity heat resistance" in Table 4): The optical laminate was placed in a thermostat (Model Number: PH-4KT, manufactured by ESPEC CORPORATION) and allowed to stand at 60° C. under a relative humidity of 90% for 250 hours and 500 hours respectively. Then, the appearance of the optical laminate was visually observed to evaluate according to the following standard of evaluation. The results are shown in Table 4.

Standard of evaluation of optical durability test
A: Almost no variation in appearance such as lifting, delamination, and foaming is observed in the sample after 500 hr.

B: Almost no variation in appearance such as lifting, delamination, and foaming is observed in the sample after 250 hr.

C: Significant variation in appearance such as lifting, delamination, and foaming is observed in the sample after 250 hr.

Heat shock resistance test (expressed as "HS resistance" in Table 4): The optical laminate was placed in a hot-cold shock testing device (Model Number: TSA-71L-A), manufactured by ESPEC CORPORATION) to begin cycle testing involving repeating, 500 and 100 times respectively, a temperature cycle in which the inside temperature was dropped to −40° C. from 70° C. and then, raised to 70° C. in one cycle (30 min). Then, the appearance of the optical laminate was visually observed to evaluate according to the following standard of evaluation. The results are shown in Table 4.

Standard of evaluation of heat shock resistance test

A: Almost no variation in appearance such as lifting, delamination, and foaming is observed in the sample after 100 cycles.

B: Almost no variation in appearance such as lifting, delamination, and foaming is observed in the sample after 50 cycles.

C: Significant variation in appearance such as lifting, delamination, and foaming is observed in the sample after 50 cycles.

In Reference Examples 1 and 2 in which no light-selective absorption compound was added, the value of Re(450) after the optical durability test was largely changed by 10 or more, and, for example, lifting, delamination, and forming were caused which were regarded as the variation of appearance in each optical durability test. Also, in Comparative Examples 1 to 6 containing, as the light-selective absorption compound (LUV absorber), a compound having a value of $\varepsilon(420)/\varepsilon(400)$ exceeding 0.3, the value of Re(450) after the optical durability test was largely changed by 10 or more. On the other hands, with regard to the optical laminates (Examples 1 to 31) which satisfied the requirements that A(400) was 0.5 or more and A(420)/A(400) was 0.3 or less, the variation of Re (450) before and after the optical durability test was less than 5, showing that the optical laminate of the present invention was improved. In, particularly, the optical laminates (Examples 1 to 20) including a light-selective compound having a specific structure, lifting, delamination, foaming, and the like were not caused after each durability test and no variation in appearance was observed, to find that the optical laminate of the present invention was improved in durability.

Then, the transmittance of a manufactured optical laminate was measured by a spectrophotometer to estimate light-extraction efficiency in an OLED display. The results are shown in Table 5.

TABLE 4

| | | Optical durability test | | | Heat resistance test | Humidity heat resistance test | H5 resistance test |
|---|---|---|---|---|---|---|---|
| | | Re (450) | Re (550) | Re (630) | | | |
| Reference Example | 1 | C | B | A | A | A | A |
| | 2 | C | B | A | A | A | A |
| Example | 1 | A | A | A | A | A | A |
| | 2 | A | A | A | A | A | A |
| | 3 | A | A | A | A | A | A |
| | 4 | A | A | A | A | A | A |
| | 5 | A | A | A | A | A | A |
| | 6 | A | A | A | A | A | A |
| | 7 | A | A | A | A | A | A |
| | 8 | A | A | A | A | A | A |
| | 9 | A | A | A | A | A | A |
| | 10 | A | A | A | A | A | A |
| | 11 | A | A | A | A | A | A |
| | 12 | A | A | A | A | A | A |
| | 13 | A | A | A | A | A | A |
| | 14 | A | A | A | A | A | A |
| | 15 | A | A | A | A | A | A |
| | 16 | A | A | A | A | A | A |
| | 17 | A | A | A | A | A | A |
| | 18 | A | A | A | A | A | A |
| | 19 | A | A | A | A | A | A |
| | 20 | A | A | A | A | A | A |
| | 21 | A | A | A | A | A | B |
| | 22 | A | A | A | A | A | B |
| | 23 | A | A | A | A | A | B |
| | 24 | A | A | A | A | A | B |
| | 25 | A | A | A | A | A | B |
| | 26 | A | A | A | A | A | B |
| | 27 | A | A | A | A | A | B |
| | 28 | A | A | A | A | A | B |
| | 29 | B | A | A | B | A | B |
| | 30 | B | A | A | B | A | B |
| | 31 | B | A | A | B | A | B |
| Comparative Example | 1 | C | A | A | C | C | C |
| | 2 | C | A | A | C | C | C |
| | 3 | C | A | A | C | C | C |
| | 4 | C | A | A | C | C | C |
| | 5 | C | A | A | C | C | C |
| | 6 | C | A | A | C | C | C |

It is to be noted that the light-extraction efficiency was calculated based on the OLED emission spectrum and transmission spectrum of the optical laminate according to the following formula.

The light-extractive efficiency to extract blue, green, or red are light-extractive efficiencies at wavelengths of 420 to 560 nm, 480 to 655 nm, and 535 to 755 nm.

TABLE 5

| | | OLED light-extractive efficiency (%) | | |
|---|---|---|---|---|
| | | Blue | Green | Red |
| Reference | 1 | 43 | 46 | 46 |
| Example | 2 | 43 | 46 | 46 |
| Example | 1 | 43 | 46 | 46 |
| | 2 | 43 | 46 | 46 |
| | 3 | 43 | 46 | 46 |
| | 4 | 43 | 46 | 46 |
| | 5 | 43 | 46 | 46 |
| | 6 | 43 | 46 | 46 |
| | 7 | 43 | 46 | 46 |
| | 8 | 43 | 46 | 46 |
| | 9 | 43 | 46 | 46 |
| | 10 | 43 | 46 | 46 |
| | 11 | 43 | 46 | 46 |
| | 12 | 43 | 46 | 46 |
| | 13 | 43 | 46 | 46 |
| | 14 | 43 | 46 | 46 |
| | 15 | 43 | 46 | 46 |
| | 16 | 43 | 46 | 46 |
| | 17 | 43 | 46 | 46 |
| | 18 | 43 | 46 | 46 |
| | 19 | 43 | 46 | 46 |
| | 20 | 43 | 46 | 46 |
| | 21 | 43 | 46 | 46 |
| | 22 | 43 | 46 | 46 |
| | 23 | 43 | 45 | 46 |
| | 24 | 43 | 45 | 46 |
| | 25 | 43 | 46 | 46 |
| | 26 | 43 | 46 | 46 |
| | 27 | 43 | 45 | 46 |
| | 28 | 43 | 45 | 46 |
| | 29 | 42 | 45 | 45 |
| | 30 | 43 | 45 | 45 |
| | 31 | 42 | 45 | 45 |
| Comparative | 1 | 36 | 38 | 39 |
| Example | 2 | 36 | 38 | 39 |
| | 3 | 36 | 38 | 39 |
| | 4 | 36 | 38 | 39 |
| | 5 | 36 | 38 | 39 |
| | 6 | 36 | 38 | 38 |

It was found that the optical laminates (Examples 1 to 31) according to the present invention had the same light-extractive efficiency as Reference Examples 1 and 2 to which no light-selective absorption compound was added and was therefore not reduced in resistance to damages to display characteristics. It was also found that the optical laminates (Comparative Examples 1 to 6) which had a large value of A(420)/A(400) and was therefore inferior in light absorption selectivity had low light-extractive efficiency.

What is claimed is:

1. An optical laminate comprising at least one polarizing plate and at least one pressure-sensitive adhesive layer and satisfying the following formulae (1) and (2):

$$A(400) \geq 0.5 \quad (1)$$

$$A(420)/A(400) \leq 0.3 \quad (2)$$

where A(400) represents the absorbance of the optical laminate at a wavelength of 400 nm in the transmission direction of the polarizing plate and A(420) represents the absorbance of the optical laminate at a wavelength of 420 nm in the transmission direction of the polarizing plate, wherein the at least one pressure-sensitive adhesive layer contains a light-selective absorption compound, represented by the formula (I):

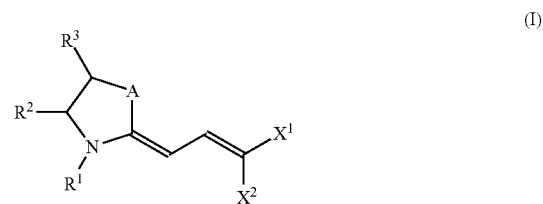

(I)

wherein;

$R^1$ represents a hydrogen atom or an alkyl group having 1 to 10 carbon atoms provided that when the alkyl group has at least one methylene group, at least one of these methylene groups is optionally substituted with an oxygen atom or a sulfur atom, and $R^2$ and $R^3$ independently from each other represent a hydrogen atom or an alkyl group having 1 to 12 carbon atoms; and A represents a methylene group, a secondary amino group, an oxygen atom, or a sulfur atom; and $X^1$ and $X^2$ independently from each other represent an electron attractive group provided that $X^1$ and $X^2$ may be combined to form a ring structure wherein the electron attractive group is selected from a cyano group, a nitro group, a halogen atom, an alkyl group substituted with a halogen atom, and —$Y^1$—$R^4$, wherein $R^4$ represents a hydrogen atom, an alkyl group having 2 to 50 carbon atoms, or an alkyl group having at least one methylene group and 2 to 50 carbon atoms, provided that at least one methylene group is substituted with an oxygen atom and a substituent may be combined with a carbon atom on the alkyl group, and $Y^1$ represents —CO—, —COO—, —OCO—, $NR^5CO$—, or —$CONR^6$, wherein $R^5$ and $R^6$ independently represent a hydrogen atom, an alkyl group having 1 to 6 carbon atoms, or a phenyl group, wherein the at least one pressure-sensitive adhesive layer includes a pressure-sensitive adhesive composition containing:

(A) an acrylic resin which is a copolymer having a weight average molecular weight of 500000 to 2000000 and including, as structural components;

(A-1) 50 to 99.9% by mass of two or more (meth)acrylate monomers represented by the formula (A-1):

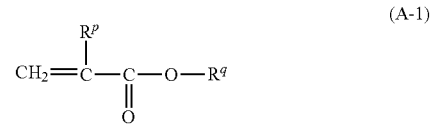

(A-1)

wherein $R^p$ represents a hydrogen atom or a methyl group, $R^q$ represents an alkyl group having 1 to 20 carbon atoms or an aralkyl group in which hydrogen atoms constituting the alkyl group or aralkyl group are optionally substituted with —O—$(C_2H_4O)_n$—$R^r$ (n denotes an integer from 0 to 4 and R″ represents an alkyl group having 1 to 12 carbon atoms or an aryl group having 1 to 12 carbon atoms); and (A-2) 0.1 to 50% by mass of an unsaturated monomer having a polar functional group, based on the total solid content of the acrylic resin;

(B) 0.01 to 10 parts by mass of a crosslinking agent based on 100 parts by mass of the acrylic resin; and (C) the light-selective absorption compound satisfies the following formula (3):

$$\varepsilon(420)/\varepsilon(400) \leq 0.3 \qquad (3)$$

where ε(400) L/(g·cm) represents a gram absorption coefficient at a wavelength of 400 nm and ε(420) L/(g·cm) represents a gram absorption coefficient at a wavelength of 420 nm.

2. The optical laminate according to claim 1, wherein the light-selective absorption compound satisfies following formulae (4) and (5):

$$\lambda\text{max} < 420 \text{ nm} \qquad (4)$$

$$\varepsilon(400) \geq 40 \qquad (5)$$

where λmax represents the maximum absorption wavelength of the light-selective absorption compound.

3. The optical laminate according to claim 1, wherein the light-selective absorption compound is contained in an amount of 0.01 to 10 parts by mass based on 100 parts by mass of the acrylic resin (A).

4. The optical laminate according to claim 1, wherein; the light-selective absorption compound contains at least one type selected from the group consisting of compounds represented by the formula (I-II):

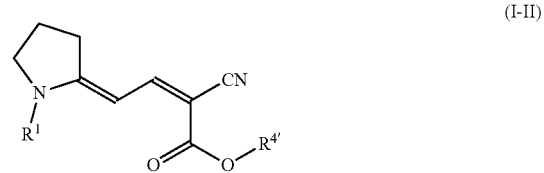

(I-II)

wherein $R^{4'}$ represents a hydrogen atom or an alkyl group having 2 to 20 carbon atoms provided that when the alkyl group has at least one methylene group, at least one of these methylene groups is optionally substituted with an oxygen atom.

5. The optical laminate according to claim 1, the optical laminate comprising at least one retardation film.

6. The optical laminate according to claim 5, wherein the retardation film is a layer constituted of a polymer of a polymerizable liquid crystal compound kept in an orientation state.

7. The optical laminate according to claim 1, the optical laminate having a thickness of 50 to 500 μm.

8. A display device comprising the optical laminate as claimed in claim 1.

* * * * *